(12) United States Patent
Kondo et al.

(10) Patent No.: US 8,064,522 B2
(45) Date of Patent: Nov. 22, 2011

(54) MOTION-VECTOR DETECTING DEVICE, MOTION-VECTOR DETECTING METHOD, AND COMPUTER PROGRAM

(75) Inventors: Tetsujiro Kondo, Tokyo (JP); Kenji Takahashi, Kanagawa (JP); Kazushi Yoshikawa, Tokyo (JP); Takanori Ishikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1486 days.

(21) Appl. No.: 11/467,777

(22) Filed: Aug. 28, 2006

(65) Prior Publication Data

US 2006/0285596 A1    Dec. 21, 2006

(30) Foreign Application Priority Data

Mar. 1, 2004   (JP) .................................. 2004-056255
Mar. 1, 2004   (JP) .................................. 2004-056256
Mar. 1, 2004   (JP) .................................. 2004-056257

(51) Int. Cl.
   *H04N 7/12*   (2006.01)
(52) U.S. Cl. ............................. 375/240.16; 375/240.12
(58) Field of Classification Search ............... 375/240, 375/240.01, 240.12, 240.16
   See application file for complete search history.

(56) References Cited

U.S. PATENT DOCUMENTS

| 4,677,476 A | 6/1987 | Kondo |
| 6,532,264 B1 * | 3/2003 | Kahn ................. 375/240.16 |

FOREIGN PATENT DOCUMENTS

| JP | 7-118784 | 12/1995 |
| JP | 08-275179 | 10/1996 |
| JP | 2001-061152 | 3/2001 |
| JP | 2001-61152 | 3/2001 |
| JP | 2002-290977 | 10/2002 |
| JP | 2003-078807 | 3/2003 |
| JP | 2003-78807 | 3/2003 |

OTHER PUBLICATIONS

Japanese Office Action for corresponding JP2004-056256, issued on Mar. 9, 2010.
Japanese Office Action for corresponding JP2004-056255, issued on Mar. 9, 2010.
Japanese Office Action for corresponding JP2004-056257, issued on Mar. 9, 2010.

* cited by examiner

*Primary Examiner* — Allen Wong
(74) *Attorney, Agent, or Firm* — K&L Gates LLP

(57) ABSTRACT

A device and method that serve to generate an accurate evaluation-value table and to detect a correct motion vector are provided. A weight coefficient W is calculated on the basis of correlation information of a representative-point pixel and flag-correlation information based on flag data corresponding to pixel-value difference data between a subject pixel and a pixel in a neighboring region of the subject pixel. A confidence index is generated on the basis of the weight coefficient W calculated and an activity A as an index of complexity of image data, or a confidence index is generated on the basis of similarity of motion between the representative point and a pixel neighboring the representative point, and an evaluation value corresponding to the confidence index is accumulated to generate an evaluation-value table. Furthermore, correlation is checked on the basis of positions or pixel values of feature pixels neighboring the subject pixel to determine a motion vector.

26 Claims, 42 Drawing Sheets

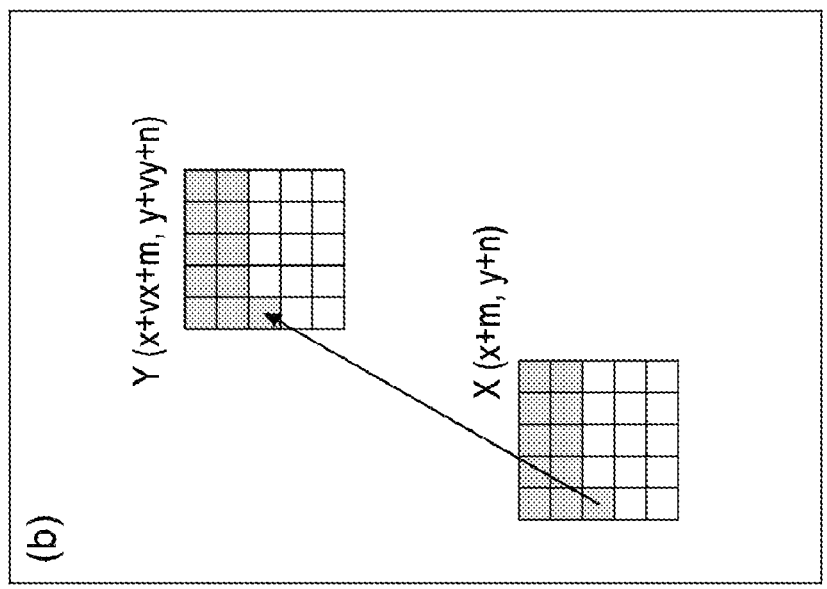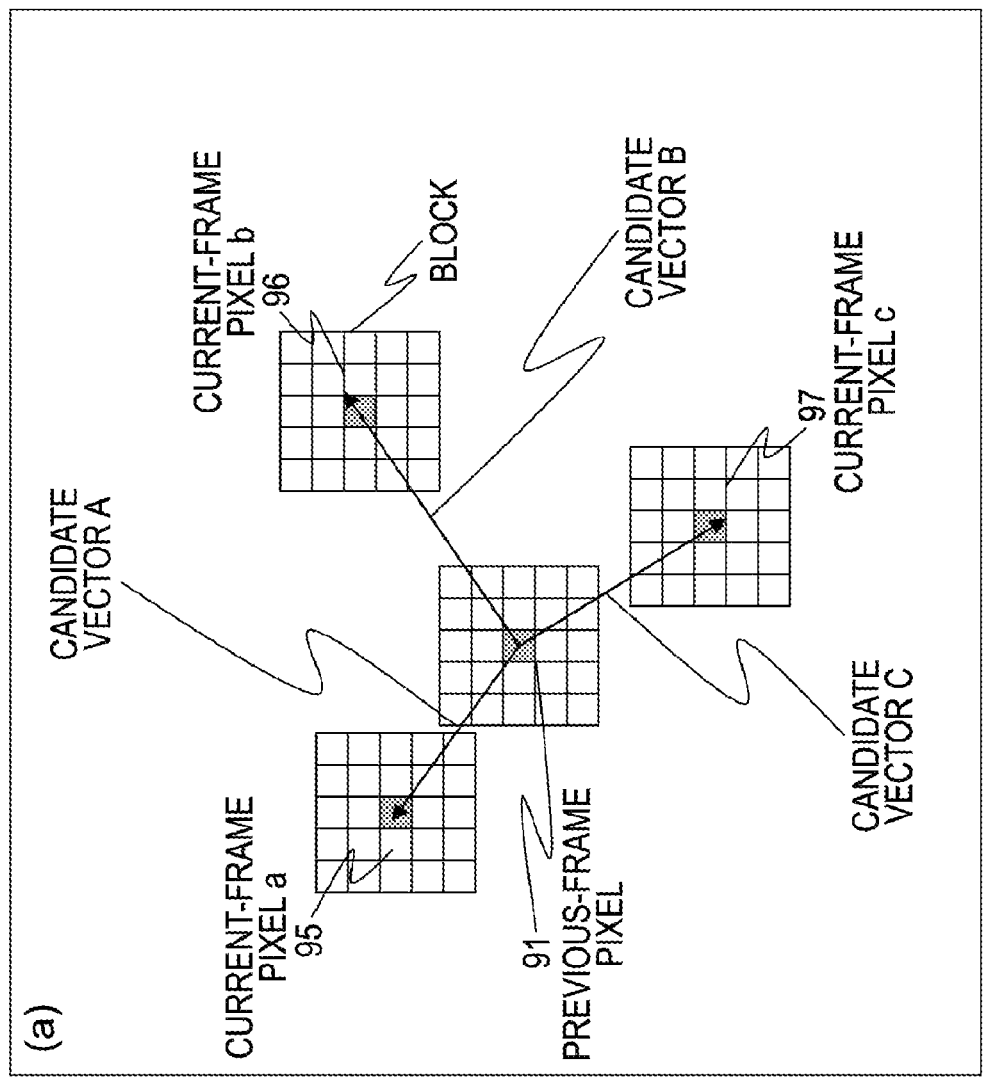
FIG. 5

FIG. 18
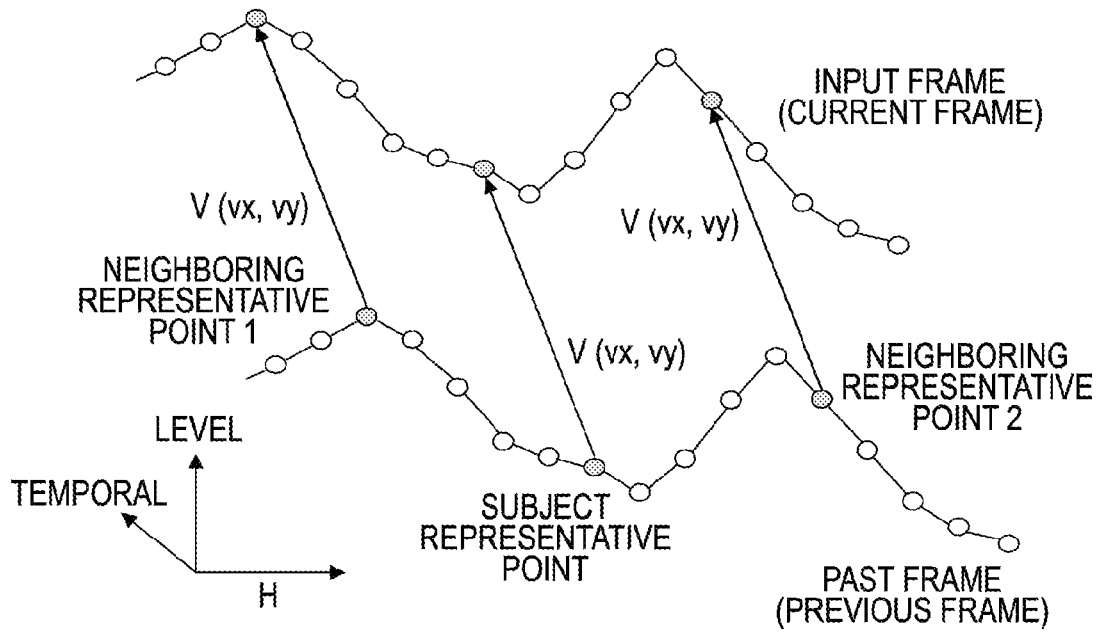
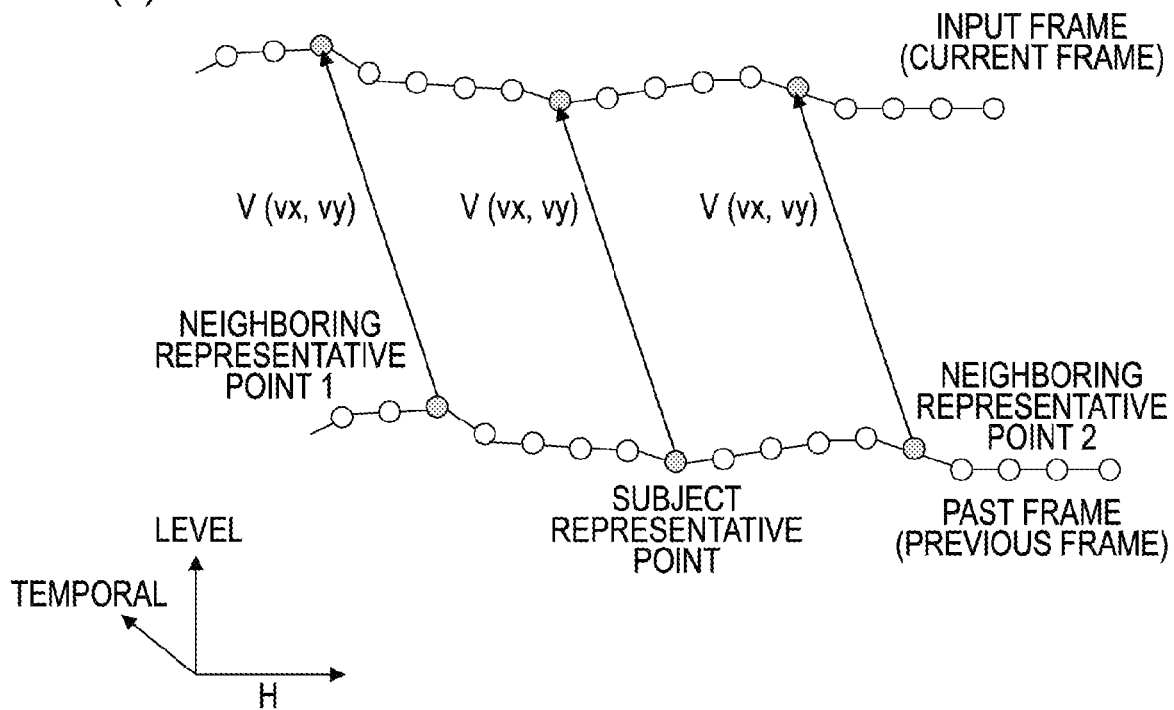

MOTION-VECTOR DETECTING DEVICE, MOTION-VECTOR DETECTING METHOD, AND COMPUTER PROGRAM

CROSS REFERENCE TO RELATED APPLICATIONS

The present application claims priority to PCT/JP05/002786 filed Feb. 22, 2005, which also claims priority to Japanese Patent Document Nos. P2004-056255 filed on Mar. 1, 2004; P2004-056256 filed on Mar. 1, 2004; and P2004-056257 filed on Mar. 1, 2004, the disclosure of which are herein incorporated by reference.

BACKGROUND

The present invention relates to motion-vector detecting devices, motion-vector detecting methods, and computer programs. More specifically, the present invention relates to a motion-vector detecting device, a motion-vector detecting method, and a computer program for detecting a motion vector from moving-picture data.

In accordance with the recent improvement in the functions of information processing apparatuses and communication terminals, development of high-speed communication infrastructures, and spread of high-density recording media such as DVDs and Blu-ray discs, distribution of moving-picture data via networks, storage and playback of moving-picture data using high-density recording media, and so forth are in active practice. In accordance with this situation, improvement in the efficiency or speed of data processing of moving-picture data, such as encoding, is desired.

For example, in motion-compensated image encoding in high-efficiency encoding of moving-picture data, detection of moving objects or detection of speed by a vision sensor of a traffic monitoring system or an autonomous traveling vehicle, detection of a direction and magnitude (velocity) of movement of each object included in image data, i.e., detection of a motion vector, is needed.

For example, MPEG (Moving Picture Coding Experts Group) encoding, which is an international standard of high-efficiency encoding of moving pictures, has been proposed as an example of motion-compensated image encoding. The MPEG encoding executes encoding by a combination of DCT (Discrete Cosine Transform) and motion-compensated predictive coding. In motion-compensated predictive coding, correlation of image-signal levels between successive frames of moving-picture data, i.e., a current frame and an immediately previous frame, is detected, motion vectors are detected on the basis of the correlation detected, and the moving picture is corrected on the basis of the motion vectors detected, so that efficient encoding is achieved.

As a method of detecting a motion vector, block matching is known. An overview of block matching will be described with reference to FIG. 1. Temporally successive frame images of a moving picture, e.g., a current frame $[F_t]$ 20 at time (t) and a previous frame $[F_{t-1}]$ 10 at time (t−1) in the figure, are extracted. One screen of the frame image is divided into small regions (hereinafter referred to as blocks) of m pixels×n lines composed of a plurality of pixels.

Using the current frame $[F_t]$ 20 as a reference frame, a check block By 21 of the reference frame is moved within a certain search area 22, and a check block having a minimum pixel-value difference, i.e., having a highest degree of matching (highest correlation) of pixel value, with a reference block Bx 11 of the previous frame $[F_{t-1}]$ 10 is detected. It is estimated that the reference block Bx 11 of the previous frame $[F_{t-1}]$ 10 has moved to the position of the highly correlated check block detected from the current frame $[F_t]$ 20. On the basis of a vector representing the estimated motion, a motion vector for each pixel is calculated. As described above, in block matching, a motion vector is determined by checking correlation (matching) between frames on a basis of individual blocks having a predetermined size (m×n).

In block matching, motion vectors are determined on a block-by-block basis. As an evaluation value representing correlation of each block, i.e., a degree of matching, for example, a sum of absolute values of frame differences, obtained by calculating frame differences by subtracting values between a plurality of pixels in the reference block Bx and a plurality of pixels at spatially corresponding positions in the check block By and accumulating absolute values of the frame differences calculated, is used. Alternatively, for example, a sum of squares of frame differences may be used.

In the block matching described above, however, since complete searching is executed to compare all the data in the search area, disadvantageously, the number of times of comparison needed for detection is very large, so that it takes a long time for motion detection.

Furthermore, when a moving portion and a still portion are included in a block, motion detected on a block basis does not accurately corresponding to motion of individual pixels in the block. Although this problem can be alleviated by setting of the block size, for example, when the block size is increased, the amount of calculation increases, and the problem of a plurality of motions in the block is likely to occur. Conversely, when the block size is decreased, since the area for checking of matching becomes smaller, the problem of reduced accuracy of motion detection arises. That is, when block matching is performed, a large number of check bocks similar to the reference block, i.e., check blocks having high correlation with the reference block, is likely to occur. This is because blocks not due to motion are included. This reduces the accuracy of motion detection. For example, when text telop moves horizontally or vertically, the effect of a pattern of repetition is likely to occur. In the case of a text pattern of Chinese characters, when the same character is divided into small portions, the same pattern often occurs. Thus, when a plurality of motions exist in a block, it is difficult to determine correct motion.

The applicant of this patent application has proposed a motion-vector detecting method and detecting device in which motion vectors can be detected for individual pixels and incorrect detection is prevented without increasing the amount of calculation, for example in Patent Document 1.

The point of the motion-vector detecting process disclosed in Patent Document 1 is that instead of calculating an evaluation value and determining a motion vector for each pixel or each block, as a first step of processing, a plurality of blocks each composed of a plurality of pixels are set in one frame and representative points of the individual blocks are set, correlation between each of the representative points and each pixel in a search area set in another frame is checked, and evaluation values based on correlation information are calculated to generate an evaluation-value table as correlation information based on evaluation values, and a plurality of candidate vectors are extracted from the evaluation-value table. Then, as a second step of processing, a presumably optimal candidate vector is selected from the extracted candidate vectors and associated with each pixel, thereby determining the candidate vector as a motion vector for each pixel. As described above, motion vectors for individual pixels are determined by:

Generating an evaluation-value table;

Selecting candidate vectors on the basis of the evaluation-value table; and

Associating a candidate vector selected from a plurality of candidate vectors as a motion vector for each pixel This method will hereinafter be referred to as a candidate-vector method.

An advantage of the motion-vector detecting process by the candidate-vector method is that the amount of calculation can be reduced by extracting a limited number of candidate vectors on the basis of an evaluation-value table. Another advantage is that it is possible to determine an optimal motion vector for each pixel from candidate vectors selected in advance even in a region of a boundary of objects, where incorrect detection of a motion vector is likely to occur. Hitherto, it has been the case to determine a motion vector for each pixel by a complete search, i.e., by calculating, for example, a pixel difference between frames as an evaluation value and calculating evaluation values for all the pixels in the frame. In the candidate-vector method, it is possible to determine an optimal motion vector for each pixel from candidate vectors selected in advance. Thus, compared with the complete searching, the possibility of occurrence of the same evaluation value is lower, so that incorrect detection is prevented.

However, in the processing for generating an evaluation-value table, representative points of individual blocks are set, correlation between each of the representative points and each pixel in a search area set in another frame is checked to calculate evaluation values based on correlation information, and the evaluation values are accumulated.

For example, when the absolute value of the difference between a representative-point pixel X and an input pixel Y included in a search area is less than a certain threshold TH, the evaluation value is set as an accumulated evaluation value. That is, when the following expression is satisfied:

$$|X-Y|<TH$$

+1 is counted at the relevant position of the evaluation-value table, and results of calculation of all the representative points in the screen are summed into the evaluation-value table, whereby an evaluation-value table is generated.

In generating the evaluation-value table, correlation is checked only on the basis of the luminance level of the representative point and the luminance levels of input pixels in the search area. Thus, when an evaluation-value table for motion-vector detection is generated using the current frame 31 and the previous frame 30 shown in FIG. 2, a highly correlated pixel corresponding to a representative point 38 in the previous frame 30, i.e., a pixel having substantially the same luminance level, is searched for within the search area 32 set in the current frame 31, and the pixel is accumulated and counted in the evaluation-value table.

In a graph shown on the right side of FIG. 2, pixel levels on one line in an X direction, passing through the representative point 38 in the previous frame 30, and pixel levels on one line in the X direction in the search area 32 of the current frame are shown.

When the search area 38 is searched for pixels having high correlation, i.e., pixels having similar pixel levels, with the pixel level=100 of the representative point 38 of the previous frame, three pixels 35, 36, and 37 are detected. These three pixels all satisfy the condition:

$$|X-Y|<TH$$

so that the pixels are set as accumulated points in the evaluation-value table. Actually, however, only the pixel 36 is associated with a correct motion vector among the three pixels 35, 36, and 37, so that the other two pixels 35 and 37 are incorrectly added as accumulated points in the evaluation-value table.

As described above, in the method of generating an evaluation-value table that has hitherto been used, accumulation based on incorrect information could occur, so that it is not allowed to determine that candidate vectors represented by peaks in an evaluation-value table are all correct. Problems in the evaluation-value-table generating process that has hitherto been used can be summarized as follows:

(a) In the method of counting +1 only on the basis of correlation with representative points detected, the frequency of the evaluation-value table depends on the area of an object in an image. Thus, it is difficult to detect motion vectors of a plurality of objects existing in the screen from the evaluation-value table.

(b) Since the magnitude of a peak in the evaluation-value table depends on the area of an object, the peak corresponding to a candidate vector of an object having a small area but apparent in the image, such as a telop, is small, so that it is difficult to read the candidate vector.

Furthermore, when finally determining a motion vector associated with each pixel on the basis of candidate vectors, block matching is performed. In block matching, pixels neighboring a subject pixel in a previous frame are set as a block, and correlation of a plurality of pixels included in the block is detected as a whole. In order to determine motion vectors correctly through block matching, it is needed to increase the block size so that correlation is checked correctly. When the block size is increased, the amount of calculation of evaluation values for calculating correlation, such as calculation of the sum of absolute values of differences, increases. Thus, the efficiency is reduced, and the size of a memory for holding pixel values must be increased, causing the problem of increased hardware scale.

[Patent Document 1] Japanese Unexamined Patent Application Publication No. 2001-61152

SUMMARY

The present invention has been made in view of the problems described above, and it is an object of the present invention to provide a motion-vector detecting device, a motion-vector detecting method, and a computer program that allow generation of a more accurate evaluation-value table and more accurate detection of motion vectors in generation of an evaluation-value table based on representative-point matching, by checking correlation considering spatial waveforms of levels of pixels neighboring a representative point as well as the representative point.

Furthermore, it is an object of the present invention to provide a motion-vector detecting device, a motion-vector detecting method, and a computer program that allow generation of a more accurate evaluation-value table and more accurate detection of motion vectors in generation of an evaluation-value table based on representative-point matching, by checking correlation by checking whether pixels neighboring a representative point as well as the representative point have similarity of motion with the representative point.

Furthermore, it is an object of the present invention to provide a motion-vector detecting device, a motion-vector detecting method, and a computer program that allow correct determination of motion vectors, for example, in a motion-vector detecting process based on the candidate-vector method, without using block matching in determining a motion vector associated with each pixel from a plurality of candidate vectors.

A first aspect of the present invention is a motion-vector detecting device for detecting a motion vector from moving-picture data, the motion-vector detecting device including:

an evaluation-value-table generator that generates an evaluation-value table on the basis of pixel-value correlation information between different frames on a temporal axis; and a motion-vector determiner that detects a motion vector for a pixel in a frame of moving-picture data on the basis of the evaluation-value table and that associates the motion vector with the pixel;

wherein the evaluation-value-table generator includes:

a pixel-correlation calculator that calculates correlation information between the different frames on the temporal axis on the basis of representative-point matching based on a representative point selected from one of the frames;

a weight calculator that generates a confidence index of motion using at least one of a result of calculation by the pixel-correlation calculator and a result of calculation based on a pixel-value difference between a subject pixel and a pixel neighboring the subject pixel; and an evaluation-value-table calculator that generates an evaluation-value table by accumulating the evaluation value corresponding to the confidence index calculated by the weight calculator.

Furthermore, in an embodiment of the motion-vector detecting device according to the present invention, the motion-vector detecting device further includes a similarity-of-motion detector that detects similarity of motion between the representative point corresponding to the subject pixel and a representative point neighboring the representative point, and the weight calculator generates a confidence index of motion on the basis of a determination that similarity of motion exists between the representative point and the neighboring representative point as a result of detection by the similarity-of-motion detector, in consideration of a pixel-value difference between the representative point and the neighboring representative point.

Furthermore, in an embodiment of the motion-vector detecting device according to the present invention, the weight calculator is configured to calculate the confidence index β according to the following equation on condition that a determination that similarity of motion exists between representative points has been input from the similarity-of-motion detector:

$$\beta = \sum_{n}^{N} |P_m - P_n| \qquad [\text{Eq. 2}]$$

on the basis of a luminance level $P_m$ of a subject representative point and luminance levels $P_n$ of N neighboring representative points determined as having similarity of motion.

Furthermore, in an embodiment of the motion-vector detecting device according to the present invention, the motion-vector detecting device further includes a calculator that receives input of the result of checking of the presence or absence of correlation based on representative-point matching from the pixel-correlation calculator and input of the confidence index from the weight calculator, and the calculator is configured to add or multiply the result of checking of the presence or absence of correlation based on representative-point matching, input from the pixel-correlation calcula-tor, with the confidence index to calculate a final evaluation value, and to output the final evaluation value to the evaluation-value-table calculator.

Furthermore, in an embodiment of the motion-vector detecting device according to the present invention, the weight calculator is configured to calculate the confidence index so that the confidence index reflects at least one of the following parameters:

(a) Number of instances of matching or similarity of motion of neighboring representative points (b) Spatial gradient with a representative point having matching or similar motion (c) Distance between representative points with matching or similar motion on condition that a determination that similarity of motion exists between representative points has been input from the similarity-of-motion detector.

Furthermore, in an embodiment of the motion-vector detecting device according to the present invention, the evaluation-value-table generator further includes a representative-point stillness checker that checks whether the representative point is in a still region, and the weight calculator is configured to set the confidence index to be 0 or a reduced value when it is determined by the representative-point stillness checker that the representative point is in a still region.

Furthermore, in an embodiment of the motion-vector detecting device according to the present invention, the evaluation-value-table generator further includes a flag-data calculator that generates flag data corresponding to pixel-value difference data between a subject pixel and a pixel in a neighboring region of the subject pixel; and a correlation calculator that calculates flag-data correlation information between frames on the basis of the flag data; the weight calculator is configured to calculate a weight coefficient W using at least one of the pixel-correlation information based on a result of calculation by the pixel-correlation calculator and the flag-correlation information based on a result of calculation by the flag-correlation calculator, and to generate a confidence index as a value calculated on the basis of the weight coefficient W, the weight calculator is configured to calculate a new confidence index K on the basis of the confidence index generated in consideration of the pixel-value difference between the representative point and the neighboring representative point and the confidence index calculated as a value based on the weight coefficient W, and the evaluation-value-table calculator is configured to generate an evaluation-value table by accumulating an evaluation value corresponding to the new confidence index K calculated by the weight calculator.

Furthermore, in an embodiment of the motion-vector detecting device according to the present invention, the motion-vector detecting device further includes a flag-data calculator that generates flag data corresponding to pixel-value difference data between the subject pixel and a pixel neighboring the subject pixel; and a flag-correlation calculator that calculates flag-data correlation information between frames on the basis of the flag data; and the weight calculator generates a weight coefficient W using at least one of the pixel-correlation information based on a result of calculation by the pixel-correlation calculator and the flag-correlation information based on a result of calculation by the flag-correlation calculator, and to generate a confidence index as a value calculated on the basis of the weight coefficient W.

Furthermore, in an embodiment of the motion-vector detecting device according to the present invention, the flag-data calculator is configured to calculate flag data corresponding to pixel-value difference data between the subject pixel and the pixel in the neighboring region of the subject pixel so that the flag data has a less number of bits than the pixel-value difference data.

Furthermore, in an embodiment of the motion-vector detecting device according to the present invention, the weight calculator is configured to determine a weight coefficient W as a weight coefficient calculated from the pixel-correlation information based on the result of calculation by the pixel-correlation calculator, the weight coefficient W being a value W that is calculated on the basis of at least differences between a pixel value of a representative-point pixel and pixel values of correlation-checking target pixels including the subject pixel and the pixel neighboring the subject pixel.

Furthermore, in an embodiment of the motion-vector detecting device according to the present invention, the weight calculator is configured to calculate a weight coefficient W as a weight coefficient that is calculated from the pixel-correlation information based on the result of calculation by the pixel-correlation calculator and the flag-correlation information based on the result of calculation by the flag-correlation calculator, the weight coefficient W being a value W that is calculated on the basis of a magnitude of a difference between X and Y, a magnitude of a difference between $X_{f0}$ and $Y_{f0}$, and a magnitude of a difference between $X_{f1}$ and $Y_{f1}$, where X denotes a pixel value of a representative-point pixel, $X_{f0}$ and $X_{f1}$ denote flag data based on difference data between X and pixel values of two pixels adjacent to the representative-point pixel, Y denotes a pixel value of a correlation-checking target pixel, and $Y_{f0}$ and $Y_{f1}$ denote flag data based on difference data between Y and pixel values of two pixels adjacent to the pixel.

Furthermore, in an embodiment of the motion-vector detecting device according to the present invention, the weight calculator is configured to calculate an activity A as an index of complexity of image data, and the weight calculator is configured to calculate a confidence index on the basis of the calculated activity A and a weight coefficient W that is calculated on the basis of at least magnitudes of differences between a pixel value of a representative-point pixel and pixel values of correlation-checking target pixels including the subject pixel and the pixel neighboring the subject pixel.

Furthermore, in an embodiment of the motion-vector detecting device according to the present invention, the motion-vector detecting device further includes a candidate-vector extractor that extracts one or more candidate vectors on the basis of the evaluation-value table, and the motion-vector determiner is configured to select a motion vector that is to be associated with each pixel in the frame of the moving-picture data from the candidate vectors and to associate the motion vector with the pixel.

Furthermore, in an embodiment of the motion-vector detecting device according to the present invention, the motion-vector determiner is configured to extract a feature pixel from a neighboring region of a subject pixel with which a motion vector is to be associated, and to determine a motion vector associated with the subject pixel on the basis of correlation checking based on the feature pixel.

Furthermore, in an embodiment of the motion-vector detecting device according to the present invention, the motion-vector determiner includes a tentative checker that selects only candidate vectors with high correlations from the candidate vectors by checking correlation between a pixel value of the subject pixel with which a motion vector is to be associated and pixel values of pixels specified by the candidate vectors, and the correlation checking based on the feature pixel is executed only regarding the selected candidate vectors selected by the tentative checker.

Furthermore, in an embodiment of the motion-vector detecting device according to the present invention, the motion-vector determiner is configured to extract a feature pixel from the neighboring region of the subject pixel with which a motion vector is to be associated, and to determine a motion vector associated with the subject pixel on the basis of correlation checking based on position information of the feature pixel.

Furthermore, in an embodiment of the motion-vector detecting device according to the present invention, the motion-vector determiner is configured to extract a feature pixel from the neighboring region of the subject pixel with which a motion vector is to be associated, and to determine a motion vector associated with the subject pixel on the basis of correlation checking based on pixel-value information of the feature pixel.

Furthermore, in an embodiment of the motion-vector detecting device according to the present invention, the motion-vector determiner is configured to extract, as a feature pixel, a pixel having a maximum absolute value of pixel-value difference with an adjacent pixel from the neighboring region of the subject pixel with which a motion vector is to be associated, and to determine a motion vector associated with the subject pixel on the basis of correlation checking based on position information of the feature pixel.

Furthermore, in an embodiment of the motion-vector detecting device according to the present invention, the motion-vector determiner is configured to extract, as a feature pixel, a pixel having a maximum absolute value of pixel-value difference with the subject pixel with which a motion vector is to be associated from the neighboring region of the subject pixel, and to determine a motion vector associated with the subject pixel on the basis of correlation checking based on pixel-value information of the feature pixel.

Furthermore, in an embodiment of the motion-vector detecting device according to the present invention, the motion-vector determiner is configured to extract a plurality of feature pixels from the neighboring region of the subject pixel with which a motion vector is to be associated, and to determine a motion vector associated with the subject pixel on the basis of correlation checking based on the plurality of feature pixels.

Furthermore, in an embodiment of the motion-vector detecting device according to the present invention, the motion-vector determiner is configured to extract, as feature pixels, two pixels having maximum and minimum pixel-value differences with the subject pixel with which a motion vector is to be associated from the neighboring region of the subject pixel, and to determine a motion vector associated with the subject pixel on the basis of correlation checking based on the two feature pixels.

Furthermore, in an embodiment of the motion-vector detecting device according to the present invention, the motion-vector determiner is configured to determine a motion vector associated with the subject pixel on the basis of correlation checking based on position information of the two feature pixels.

Furthermore, in an embodiment of the motion-vector detecting device according to the present invention, the motion-vector determiner is configured to extract, as feature pixels, two pixels having maximum and minimum pixel-value differences with the subject pixel with which a motion vector is to be associated from the neighboring region of the subject pixel, and to determine a motion vector associated with the subject pixel on the basis of correlation checking based on three pixels including the two feature pixels and the subject pixel.

Furthermore, in an embodiment of the motion-vector detecting device according to the present invention, the motion-vector determiner is configured to extract two feature pixels from the neighboring region of the subject pixel with which a motion vector is to be associated, and to determine a motion vector associated with the subject pixel on the basis of correlation checking based on pixel values of three pixels including the two feature pixels and the subject pixel.

A second aspect of the present invention is a motion-vector detecting method for detecting a motion vector from moving-picture data, the motion-vector detecting method including:

an evaluation-value-table generating step of generating an evaluation-value table on the basis of pixel-value correlation information between different frames on a temporal axis; and a motion-vector detecting step of detecting a motion vector for a pixel in a frame of moving-picture data on the basis of the evaluation-value table and associating the motion vector with the pixel;

wherein the evaluation-value-table generating step includes:

a pixel-correlation calculating step of calculating correlation information between the different frames on the temporal axis on the basis of representative-point matching based on a representative point selected from one of the frames;

a weight calculating step of generating a confidence index of motion using at least one of a result of calculation in the pixel-correlation calculating step and a result of calculation based on a pixel-value difference between a subject pixel and a pixel neighboring the subject pixel; and an evaluation-value-table calculating step of generating an evaluation-value table by accumulating an evaluation value corresponding to the confidence index calculated.

A third aspect of the present invention is a computer program for detecting a motion vector from moving-picture data, the computer program including:

an evaluation-value-table generating step of generating an evaluation-value table on the basis of pixel-value correlation information between different frames on a temporal axis; and a motion-vector detecting step of detecting a motion vector for a pixel in a frame of moving-picture data on the basis of the evaluation-value table and associating the motion vector with the pixel;

wherein the evaluation-value-table generating step includes:

a pixel-correlation calculating step of calculating correlation information between the different frames on the temporal axis on the basis of representative-point matching based on a representative point selected from one of the frames;

a weight calculating step of generating a confidence index of motion using at least one of a result of calculation in the pixel-correlation calculating step and a result of calculation based on a pixel-value difference between a subject pixel and a pixel neighboring the subject pixel; and an evaluation-value-table calculating step of generating an evaluation-value table by accumulating an evaluation value corresponding to the confidence index calculated.

The computer program according to the present invention is a program that can be provided, for example, via a storage medium or a communication medium that provides the program in a computer-readable form to a computer system that is capable of executing various program codes, for example, a recording medium such as a CD, an FD, or an MO, or a communication medium such as a network. By providing the program in a computer-readable form, processing according to the program is executed on the computer system.

Further objects, features, and advantages of the present invention will become apparent from more detailed description based on embodiments of the present invention described later and accompanying drawings. In this specification, a system refers to a logical combination of a plurality of apparatuses, regardless of whether the constituent apparatuses are disposed within the same case.

According to features of the present invention, when generating an evaluation-value table on the basis of representative-point matching, correlation checking is executed in consideration of spatial waveforms of the levels of pixels neighboring a representative point as well as the representative point. Thus, a more accurate evaluation-value table can be generated, and a motion vector can be detected more correctly.

Furthermore, according to features of the present invention, a weight coefficient W is calculated on the basis of correlation information of a representative-point pixel and flag-correlation information based on flag data corresponding to pixel-value difference data between a subject pixel and a pixel in a neighboring region of the subject pixel, a confidence index $\alpha$ is generated as a value that is calculated on the basis of the weight coefficient W calculated and an activity A as an index of complexity of image data, and an evaluation value corresponding to the confidence index $\alpha$ is accumulated to generate an evaluation-value table. Accordingly, an evaluation-value table based on evaluation values that are weighted in consideration of pixel-value differences between representative points and pixels neighboring the representative point can be generated. Thus, a more accurate evaluation-value table can be generated, and a motion vector can be detected more correctly.

Furthermore, according to features of the present invention, flag data corresponding to pixel-value difference data between a subject pixel and a pixel in a neighboring region of the subject pixel is calculated so that the flag data has a less number of bits than pixel-value difference data, so that flag correlation can be calculated by processing data having a small number of bits. Thus, an accurate evaluation-value table can be generated without reducing the processing speed, and a motion vector can be detected more correctly. Accordingly, by applying the present invention to, for example an image processing apparatus that executes encoding of moving-picture data or the like, a motion vector can be detected efficiently, and reduction in the apparatus size can also be achieved.

Furthermore, according to features of the present invention, when generating an evaluation-value table on the basis of representative-point matching, similarity of motion between a representative point and a pixel neighboring the representative point is checked. When similarity of motion exists, it is determined that the confidence of the result of correlation checking is high. Then, a confidence index $\beta$ is calculated, and an evaluation value based on the confidence index $\beta$ is accumulated to generate an evaluation-value table. Thus, a more accurate evaluation-value table can be generated, and a motion vector can be detected more correctly.

Furthermore, according to features of the present invention, similarity of motion between a representative point and a representative point neighboring the representative point is checked. On condition that it is determined that similarity of motion exists, a confidence index $\beta$ is generated in consideration of pixel-value difference between the representative point and the neighboring representative point, and an evaluation value corresponding to the confidence index $\beta$ is accumulated to generate an evaluation-value table. The confidence index $\beta$ is calculated in consideration of the following parameters:

(a) Number of instances of matching or similarity of motion of neighboring representative points (b) Spatial gradient with a representative point having matching or similar motion (c) Distance between representative points with matching or similar motion and an evaluation value based on the confidence index $\beta$ is accumulated to generate an evaluation-value table. Thus, a more accurate evaluation-value table can be generated, and a motion vector can be detected more correctly.

Furthermore, according to features of the present invention, in addition to the confidence index $\beta$, a weight coefficient W is calculated on the basis of flag-correlation information based on flag data corresponding to pixel-value difference data between a subject pixel and a pixel in a neighboring region of the subject pixel, and a confidence index $\alpha$ is generated as a value that is calculated on the basis of the weight coefficient W calculated and an activity A as an index of complexity of image data, and an evaluation value corresponding to a confidence index $K=\alpha+\beta$ with the confidence index $\alpha$ and the confidence index $\beta$ is accumulated to generate an evaluation-value table. Thus, an evaluation-value table based on evaluation values with pixel-value differences between representative points and neighboring representative points also considered can be generated. Thus, a more accurate evaluation-value table can be generated, and a motion vector can be detected more correctly. Accordingly, by applying the present invention to, for example an image processing apparatus that executes encoding of moving-picture data or the like, a motion vector can be detected efficiently, and reduction in the apparatus size can also be achieved.

Furthermore, according to features of the present invention, in a process of detecting a motion vector from moving-picture data, when selecting and determining a motion vector associated with each pixel from a plurality of candidate vectors, a feature pixel is extracted from a neighboring region of a subject pixel with which a motion vector is to be associated, and correlation is checked on the basis of position information or pixel-value information of the feature pixel to determine a motion vector. Thus, block matching need not be employed, so that the amount of calculation of evaluation values for calculating correlation, such as calculation of the sum of absolute values of differences, can be reduced. Therefore, the efficiency of processing is improved, and the size of a memory for holding pixel values can be reduced, so that reduction in hardware scale can be achieved. Accordingly, by applying the present invention to, for example an image processing apparatus that executes encoding of moving-picture data or the like, a motion vector can be detected more correctly.

Additional features and advantages of the present invention are described in, and will be apparent from, the following Detailed Description and the Figures.

BRIEF DESCRIPTION OF THE FIGURES

FIG. 5 is a diagram for explaining an overview of a process of determining a motion vector from candidate vectors in the motion-vector detecting process.

FIG. 18 is a diagram for explaining processing executed by a weight calculator in the evaluation-value-table generator in the motion-vector detecting device according to the present invention.

DETAILED DESCRIPTION

Now, motion-vector detecting devices, motion-vector detecting methods, and computer programs according to the present invention will be described in detail with reference to the drawings. The description will be given in the following order of topics:

1. Overview of generation of evaluation-value table by representative-point matching and candidate-vector method 2. Overall configuration of motion-vector detecting device and procedure of motion-vector detecting process 3. Details of evaluation-value-table generating process using flags based on differences with neighboring pixels 4. Details of evaluation-value-table generating process with correlation information between representative point and neighboring representative point taken into consideration 5. Specific example of evaluation-value table 6. Details of motion-vector determining process based on feature pixels

[1. Overview of Generation of Evaluation-Value Table by Representative-Point Matching and Candidate-Vector Method]

In a motion-vector detecting process described below, representative-point matching is used. The representative-point matching is described in Japanese Patent No. 2083999 filed earlier by the applicant of this patent application and already granted. That is, the motion-vector detecting process described below is an example in which the candidate-vector method (disclosed in Japanese Unexamined Patent Application Publication No. 2001-61152) described earlier in the section of background art is used and in which representative-point matching is used.

In the following description, an example of a frame-based motion-vector detecting process where one frame of moving-picture data is considered as one screen and a motion vector in the frame is detected by mutual checking between screens (frames) will be described. However, the present invention is not limited to the example process, and may be applied, for example, to a case where one field corresponding to a segment of one frame is considered as one screen and a motion-vector detecting process is executed on a field-by-field basis.

In the following description, although an example of processing moving-picture data based on television signals will be mainly described, the present invention can be applied to various types of moving-picture data other than television signals. Furthermore, when video signals are processed, the video signals may be either interlaced signals or non-interlaced signals.

Figure 3:
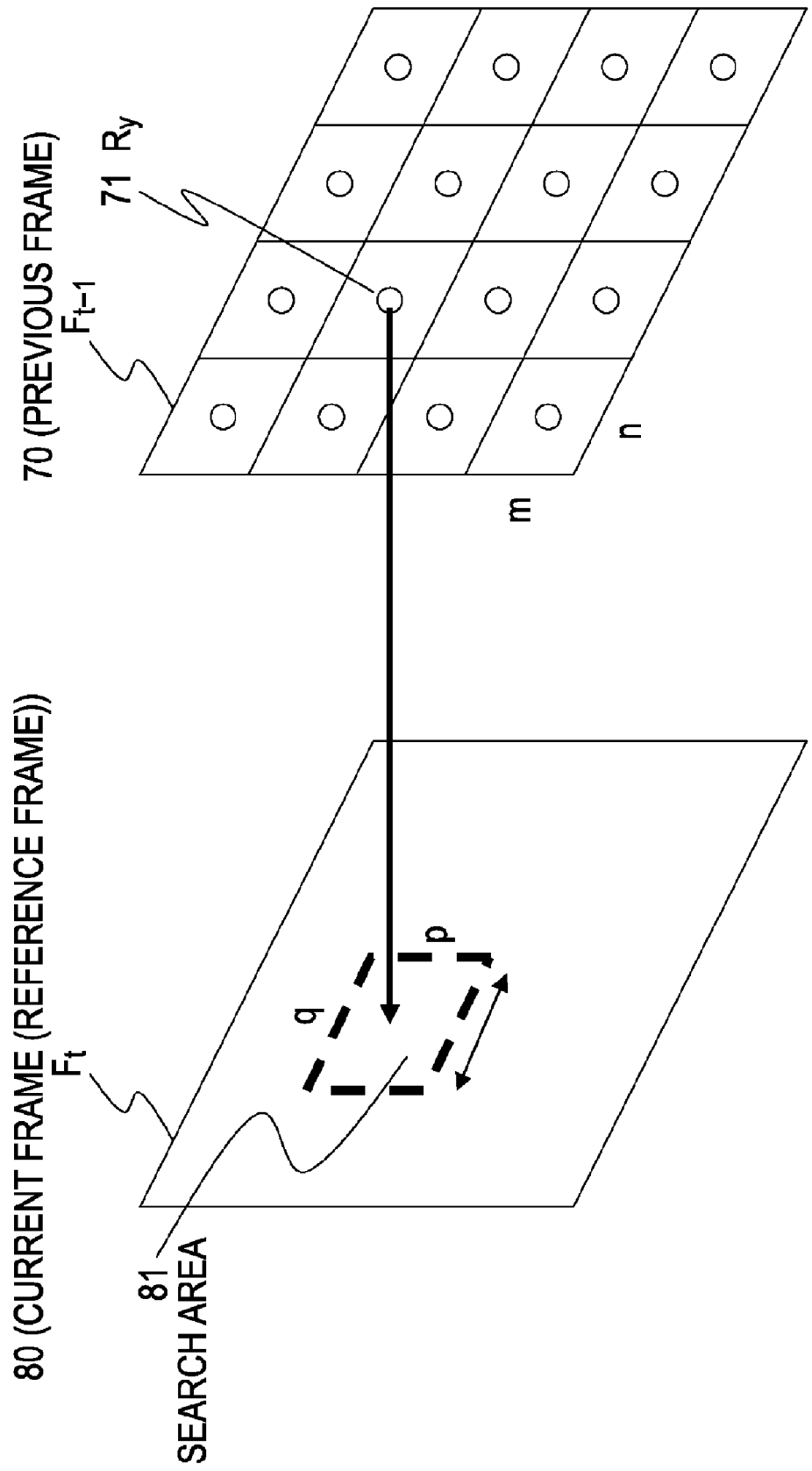
FIG. 3 is a diagram for explaining an overview of representative-point matching that is used in a motion-vector detecting process.
Figure 4:
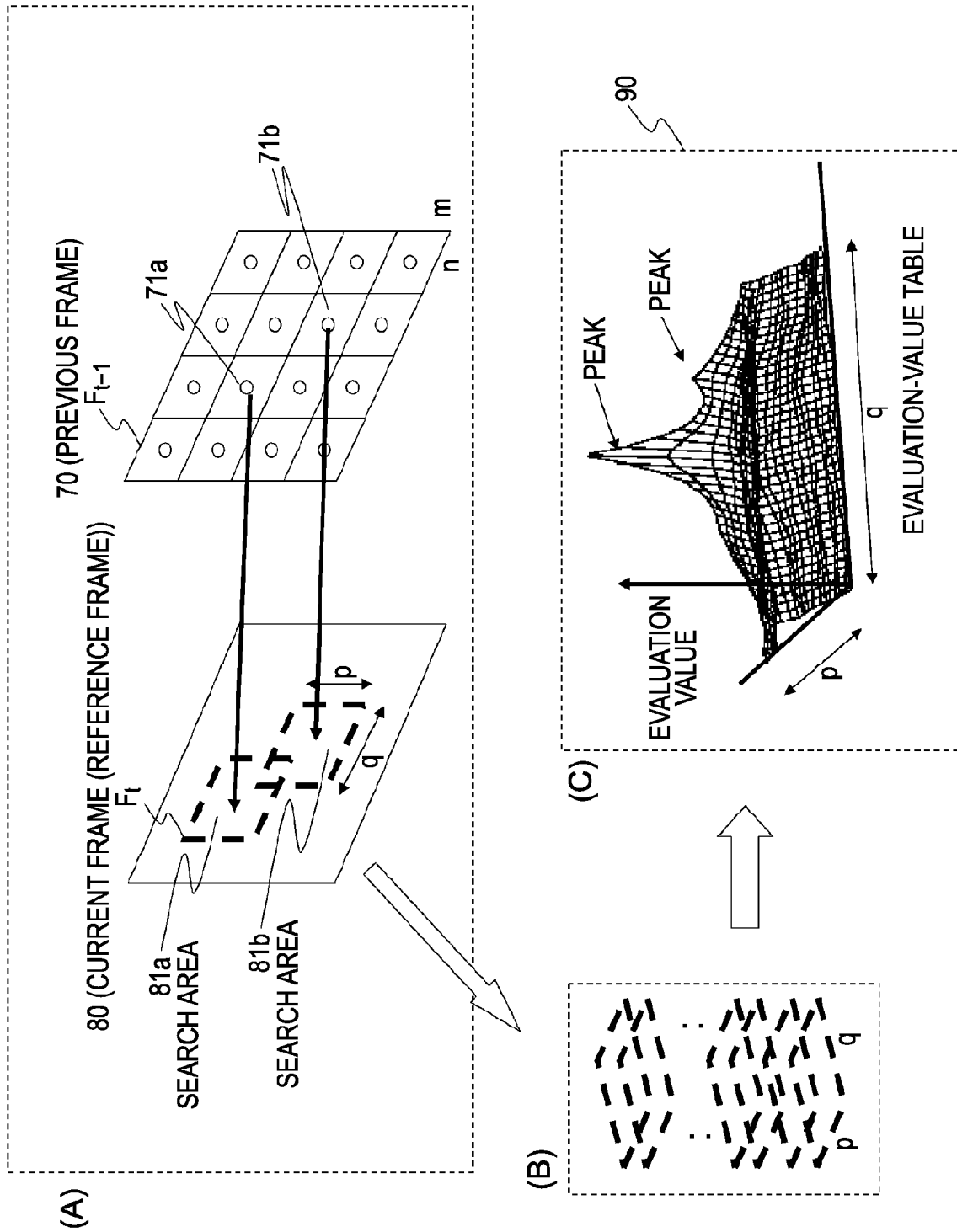
FIG. 4 is a diagram for explaining an overview of creation of an evaluation-value table on the basis of representative-point matching, extraction of candidate vectors on the basis of the evaluation-value table, and setting of motion vectors associated with individual pixels on the basis of the candidate vectors extracted, executed in the motion-vector detecting process.

With reference to FIGS. 3 to 5, an overview of creation of an evaluation-value table by representative-point matching, extraction of candidate vectors on the basis of the evaluation-value table, and setting of motion vectors for individual pixels on the basis of the candidate vectors detected, used in a motion-vector detecting process according to the present invention, will be described.

Temporally successive frame images of a moving picture, for example, a current frame [$F_t$] 80 of time (t) and a previous frame [$F_{t-1}$] 70 of time (t−1) shown in FIG. 3, are extracted.

For example, the current frame [$F_t$] 80 is considered as a reference frame, the previous frame [$F_{t-1}$] 70 is divided into a plurality of blocks each composed of m pixels×n lines, and representative points Ry representing the individual blocks are set. As the representative point of each of the blocks, a pixel value representing the block is associated, for example:

a. Pixel value at the center of the block b. Average of the pixel values of all the pixels in the block c. Median of the pixel values of all the pixels in the block In representative-point matching, a certain search area 81 is set for the current frame [$F_t$] 80 in association with a block representative point Ry 71 set for the previous frame [$F_{t-1}$], and the pixel value of each of the pixels included in the search area 81 is compared with the pixel value of the representative point Ry 71. The search area 81 is set in the form of, for example, a pixel area composed of p pixels×q lines.

That is, the pixel value of each of the pixels in the search area 81 is compared and checked with the pixel values of the representative point according to one of a to c above to calculate an evaluation value (e.g., a frame difference or checking result). The evaluation value is calculated for each deviation (for each pixel position) of the search area 81. A search area is set for the current frame [$F_t$] 80 in association with each block representative point set in the previous frame [$F_{t-1}$] 70, an evaluation value based on comparison between the pixel value of the representative point and the pixel value of each pixel in the associated search area is obtained, and evaluation values for all the representative points in one screen are accumulated. Thus, an evaluation-value table having the same size as the search area is created.

Search areas associated with representative points may be set so that adjacent search areas partially overlap, as shown in FIG. 4(A). FIG. 4(A) shows an example in which a search area is set in the form of an area defined by pxq (pixels or lines). For example, a search area 81a associated with a block representative point 71a set in the previous frame [$F_{t-1}$] 70 and a search area 81b associated with a block representative point 71b set in the previous frame [$F_{t-1}$] 70 are set so as to have an overlap.

As described above, search areas are set in association with individual representative points, comparison is executed between each of the representative points and the pixels in the search area set in association with the representative point, and evaluation values are set on the basis of values of the comparison such that, for example, higher evaluation values are set as the degree of correlation becomes higher (as the degree of matching of pixel values becomes higher), whereby evaluation values associated with the constituent pixels of each of the search areas are set.

The evaluation values for the search areas are accumulated as shown in FIG. 4(B), whereby an evaluation-value 90 shown in FIG. 4(C) is generated. The evaluation-value table includes evaluation values based on comparison between block representative points Ry 1 to n set in, for example, n blocks in the previous frame [$F_{t-1}$] 70 and pixels in search areas associated with the individual representative points Ry 1 to n set in the current frame [$F_t$] 80 serving as a reference frame, for example, calculated as accumulated values of the absolute values of differences, and has the same size as each of the search areas.

In the evaluation-value table 90, a peak (extremum) occurs when correlation between a pixel value at a position of deviation (i, j) in a search area and a representative point is high. A peak that occurs in the evaluation-value table corresponds to movement of an object displayed in a screen of moving-picture data.

For example, when the entire screen (frame) moves in the same way, in the evaluation-value table having the same size as a search area (pxq), a peak occurs at a position corresponding to the endpoint of a vector having the direction and distance of the movement. When two objects in a screen (frame) move in different ways, in the evaluation-value table having the same size as a search area (pxq), two peaks occur at two position corresponding to the endpoints of two vectors having the different directions and distances of movement. When a still portion exists, a peak corresponding to the still portion also occurs.

On the basis of the peaks that occur in the evaluation-value table as described above, candidates of a motion vector (candidate vectors) between the previous frame [$F_{t-1}$] 70 and the current frame [$F_t$] 80 serving as a reference frame are obtained.

After a plurality of candidate vectors are extracted on the basis of the peaks that occur in the evaluation-value table, for each pixel in the frame, a most suitable candidate vector is selected from the candidate vectors selected, which is set as a motion vector associated with the pixel.

A process of setting a motion vector for each pixel on the basis of extracted candidate vectors will be described with reference to FIG. 5.

In FIG. 5(a), a central pixel 91 denotes one pixel in the previous frame [$F_{t-1}$] For example, this pixel has a luminance value (α). Let it be assumed that a plurality of candidate vectors have been extracted on the basis of the peaks that occur in the evaluation-value table described above, these candidate vectors being candidate vectors A, B, and C shown in the figure. It is determined that the pixel 91 in the previous frame [$F_{t-1}$] moves according to one of these candidate vectors and is displayed at a position corresponding to a pixel in the current frame [$F_t$].

In FIG. 5(a), pixels a95, a96, and a97 denote pixels of the current frame [$F_t$] at pixel positions that are estimated as destinations of movement from the pixel 91 in the previous frame [$F_{t-1}$] on the basis of the candidate vectors A, B, and C. Correlation between the pixel values in blocks including these three pixels and the pixel values in the block including the pixel 91 is checked by block matching, a pair with a highest correlation is selected, and the candidate vector set for the selected pair is selected as a motion vector of the pixel 91.

A reason for using block matching is that the following problems occur if correspondence of only one pixel is checked.

(1) When a plurality of pixels having the same or similar correlation with pixels at destinations of motion vectors exist for n candidate vectors in a reference frame in relation to a pixel in a subject frame, it is difficult to determine which motion vector is a correct motion vector only on the basis of the absolute values of differences between pixels (hereinafter referred to as MC residuals) representing degrees of correlation.

(2) If a motion vector is correct, it is presumed that the MC residual with a pixel at the destination of the motion vector is minimum. In actual image data, however, due to the effect of noise or the like, the MC residual with a pixel at the destination of a correct motion vector is not necessarily minimum among candidate vectors.

Because of these problems, the MC residual of a single pixel does not suffice for determination. Thus, a plurality of pixels of a block size are used to check correlation between pixels in a block centered at a subject pixel and pixels in blocks at destinations of candidate vectors.

A specific block matching process will be described with reference to FIG. 5(b). As shown in FIG. 5(b), as an index of correlation among a plurality of pixels included in a block indicated by a candidate vector, the sum of absolute values of differences is calculated according to the following equation:

$$\text{SAD}(v_x, v_y) = \sum^{M \times N} |F_t(x + v_x, y + v_y) - F_{t-1}(x, y)| \quad [\text{Eq. 3}]$$

$F_{t-1}(x, y)$ denotes a luminance level of a subject frame, $F_t(x+v_x, y+v_y)$ denotes a luminance level at a destination of a motion vector in a frame serving as a reference, and M×N denotes a block size used for evaluation.

For example, a method of selecting a candidate vector (vx, vy) that minimizes the sum of absolute values of differences (SAD) calculated according to the above equation as a motion vector of a subject pixel is used. However, in the case of assignment of motion vectors using blocks such as block matching, the block size has to be increased in order to improve the performance of assignment of motion vectors. However, the amount of computation for calculating an evaluation value such as a sum of the absolute values of differences increases so that the hardware scale increases.

A scheme of a motion vector detecting process based on representative-point matching, which overcomes the problems described above, will be described in detail in the section of [6. Details of motion-vector determining process based on feature pixels].

As described earlier, it is possible to set candidate vectors by setting representative points representing individual blocks and calculating evaluation values only for the representative points that have been set. Thus, by calculating evaluation values only for a limited number of representative points, the amount of computation needed for calculating evaluation values can be reduced, so that high-speed processing can be achieved.

[2. Overall Configuration of Motion-Vector Detecting Device and Procedure of Motion-Vector Detecting Process]

Figure 6:
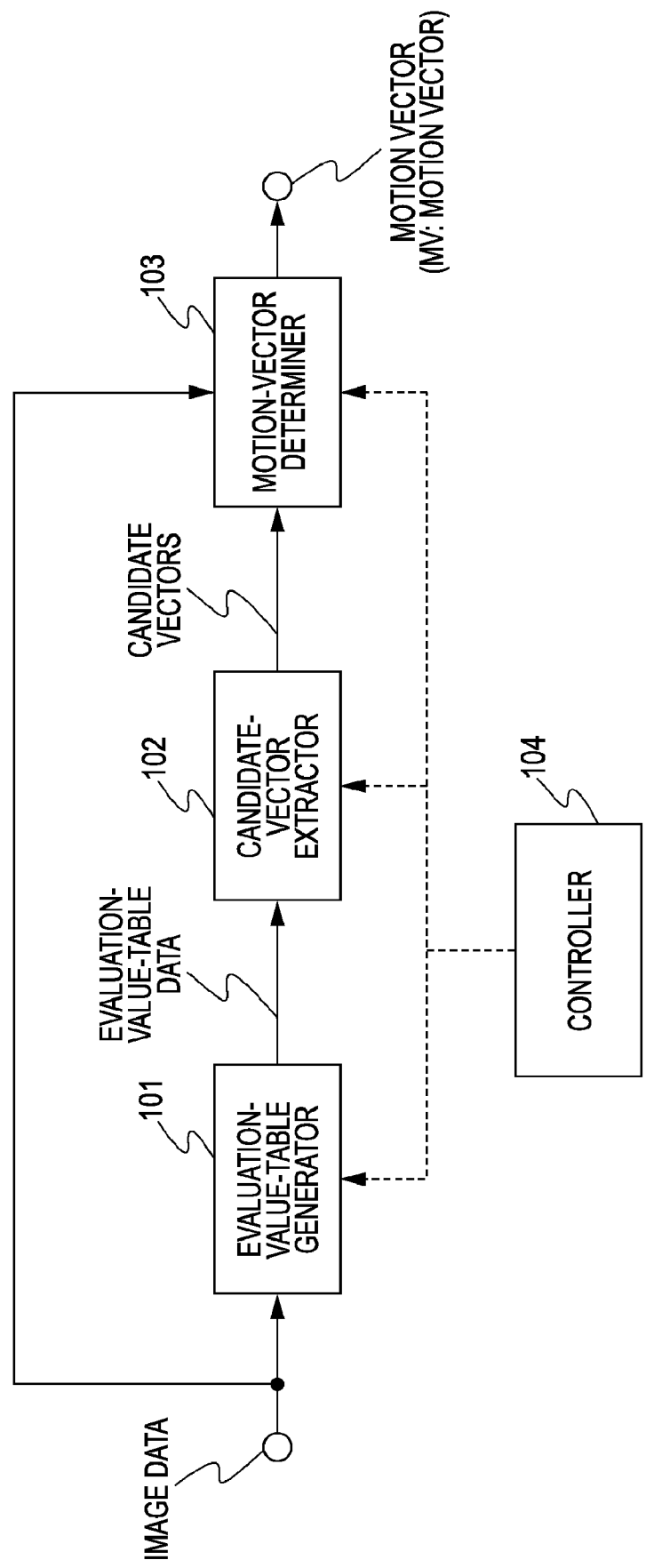
FIG. 6 is a diagram showing a configuration according to an embodiment of a motion-vector detecting device according to the present invention, which executes the motion-vector detecting process.
Figure 7:
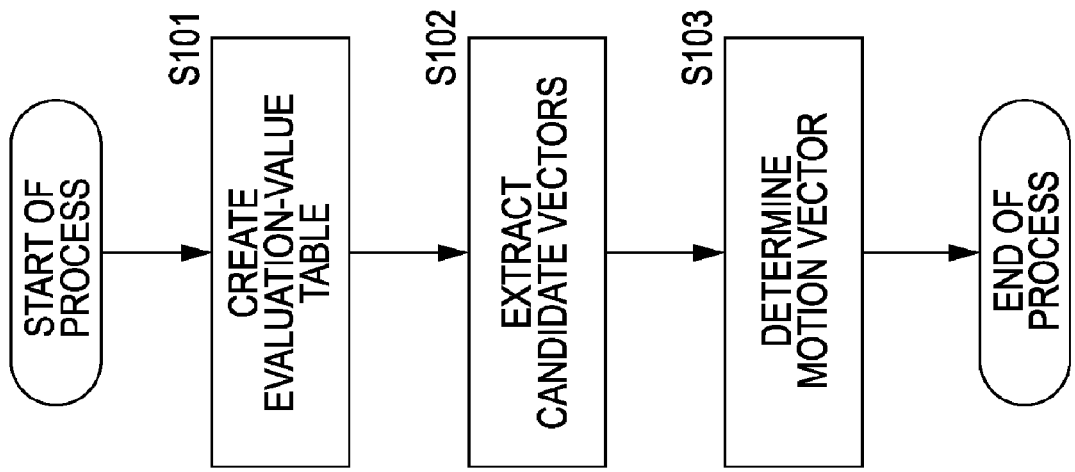
FIG. 7 is a flowchart for explaining a sequence of processing executed by the motion-vector detecting device according to the present invention, which executes the motion-vector detecting process.

FIG. 6 shows a construction according to an embodiment of a motion-vector detecting device according to the present invention, which executes a motion-vector detecting process, and FIG. 7 shows a flowchart of the processing sequence of a motion-vector detecting process.

As shown in FIG. 6, the motion-vector detecting device includes an evaluation-value-table generator 101, a candidate-vector extractor 102, a motion-vector determiner 103, and a controller 104. The evaluation-value-table generator 101 receives input of image data as a subject of the motion-vector detecting process via an input terminal and generates an evaluation-value table. The input image is, for example, image data obtained by raster scanning. The image data includes, for example, luminance signals in component signals of digital color video signals.

The input image data is supplied to the evaluation-value-table generator 101, where an evaluation-value table having the same size as a search area is generated on the basis of the representative-point matching described earlier. This corresponds to processing in step S101 in the flow shown in FIG. 7.

The candidate-vector extractor 102 extracts a plurality of motion vectors as candidate vectors in one screen from the evaluation-value table generated by the evaluation-value-table generator 101. That is, as described earlier, the candidate-vector extractor 102 extracts a plurality of candidate vectors on the basis of peaks that occur in the evaluation-value table. This corresponds to processing in step S102 in the flow shown in FIG. 7.

Regarding the plurality of candidate vectors extracted by the candidate-vector extractor 102, for each of the pixels in all the frames, the motion-vector determiner 103 checks correlation between pixels of frames, the pixels being associated with each other by a candidate vector. Then, the motion-vector determiner 103 sets a candidate vector linking a block with highest correlation as a motion vector associated with the pixel. This corresponds to processing in step S103 in the flow shown in FIG. 7. This processing corresponds to the processing described earlier with reference to FIG. 5.

The motion-vector determiner 103 selects an optimal vector from candidate vectors for each of the pixels included in one screen (frame), thereby determining a motion vector for each of the pixels, and outputs the motion vector determined. For example, for a certain subject pixel, a rectangular block of 9 pixels in total composed of 3 lines×3 pixels is used, and a candidate vector linking a block with highest correlation according to block matching is determined as a motion vector for the subject pixel.

The controller 104 controls timing of processing in the evaluation-value-table generator 101, the candidate-vector extractor 102, and the motion-vector determiner 103, storage and output of intermediate data to and from a memory, and so forth.

The above has described an overview of generation of an evaluation-value table by a motion-vector detecting device based on representative-point matching and a motion-vector detecting process based on the candidate-vector method.

[3. Details of Evaluation-Value Generating Process Using Flags Based on Differences with Neighboring Pixels]

Figure 8:
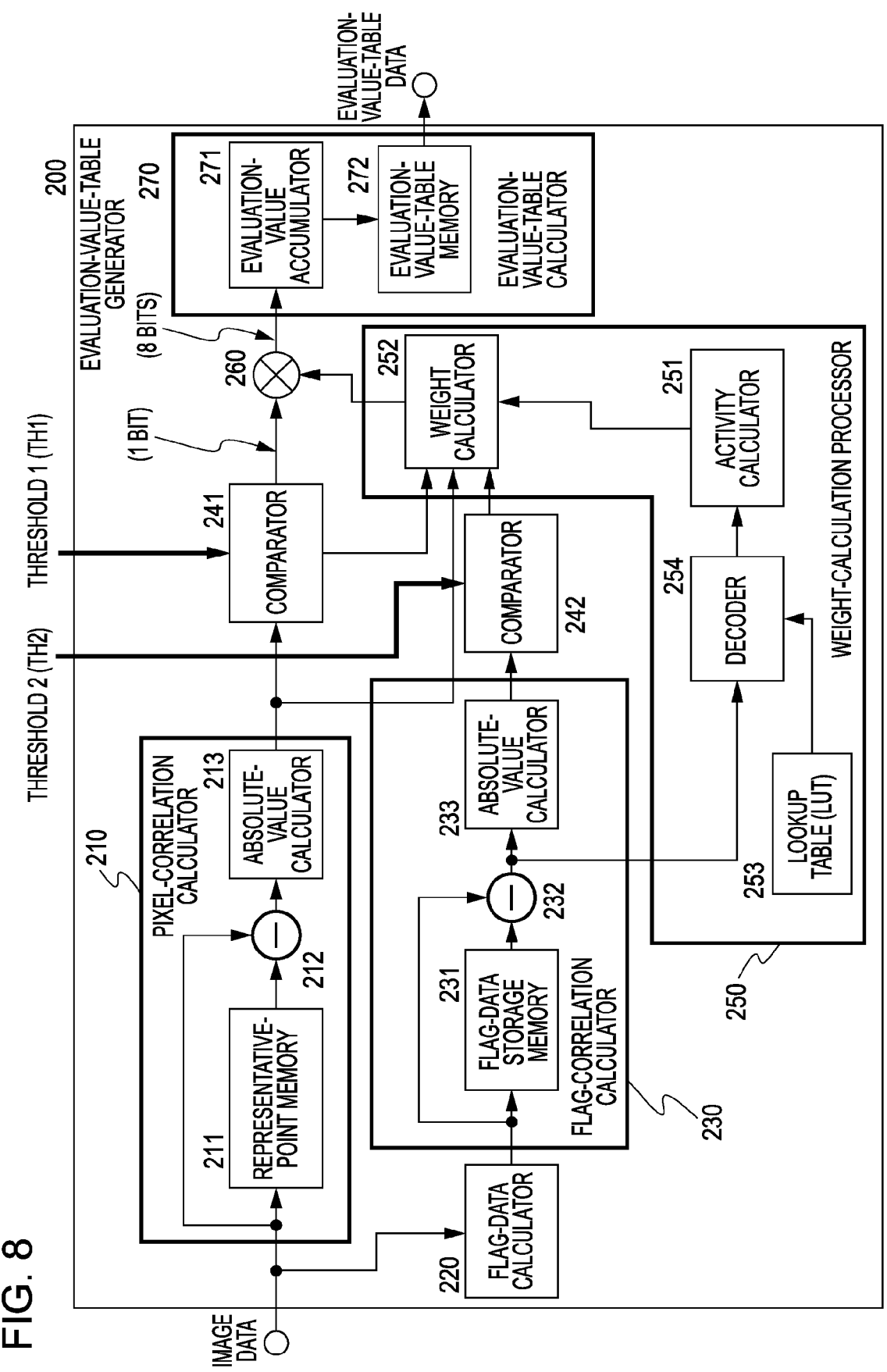
FIG. 8 is a diagram showing a detailed configuration of an evaluation-value-table generator in the motion-vector detecting device according to the present invention.

Next, details of processing executed by the evaluation-value-table generator in the motion-vector detecting device according to the present invention, i.e., details of an evaluation-value-table generating process using flags based on differences with neighboring pixels, will be described. FIG. 8 shows details of the configuration of the evaluation-value-table generator.

As shown in FIG. 8, the evaluation-value-table generator 200 in the motion-vector detecting device according to the present invention includes a pixel-correlation calculator 210, a flag-data calculator 220, a flag-correlation calculator 230, comparators 241 and 242, a weight-calculation processor 250, a calculator 260, and an evaluation-value-table calculator 270.

The pixel-correlation calculator 210 includes a representative-point memory 211, a difference calculator 212 for calculating difference data between pixel values, and an absolute-value calculator for calculating an absolute value of the difference data. The flag-correlation calculator 230 includes a flag-data storage memory 231 for storing flag data calculated by the flag-data calculator 220, a difference calculator 232 for calculating difference data between flag data, and an absolute-value calculator 223 for calculating an absolute value of the difference data.

The weight calculation processor 250 includes an activity calculator 251, a weight calculator 252, a lookup table (LUT) 253, and a decoder 254. The evaluation-value-table calculator 270 accumulates in an evaluation-value accumulator 271 evaluation values each composed of, for example, 8-bit data output from the calculator 260 to generate an evaluation-value table, and stores the evaluation-value table in an evaluation-value-table memory 272.

First, processing executed by the pixel-correlation calculator 210 will be described. The pixel-correlation calculator 210 executes representative-point matching.

Image data is input to the pixel-correlation calculator 210 via the input terminal, for example, on a frame-by-frame basis. The image data input to the pixel-correlation calculator 210 is supplied to the difference calculator 212 and the representative-point memory 211.

The image data stored in the representative-point memory 211 is data of predetermined representative points generated from image data that is input, for example, on a frame-by-frame basis. For example, one representative point is set in each block that is set by dividing the screen as described earlier with reference to FIGS. 3 and 4, the block being composed, for example, by m×n pixels. The representative point is associated with pixel value data representing the block, for example:

a. Pixel value at the center of the block
b. Average of the pixel values of all the pixels in the block
c. Median of the pixel values of all the pixels in the block More specifically, for example, image data (pixel-value data) at pixel positions sampled spatially at regular intervals is selected from an input frame image under timing control based on signals from the controller 104 (refer to FIG. 6), and is stored in the representative-point memory 211 as representative-point data.

Representative-point data of a previous frame, read from the representative-point memory 211, and image data of a current frame are supplied to the difference calculator 212.

The difference calculator 211 calculates a difference between the pixel values at the representative points in the previous frame and the pixel values of pixels in search areas corresponding to representative points set in the image data of the current frame, for example, a frame difference (result of calculation of correlation), and outputs the frame difference to the absolute-value calculator 213.

The absolute-value calculator 213 receives input of the frame difference (result of correlation checking) based on representative-point data of the previous frame, input from the difference calculator 211 and image data of the current frame, and calculates the absolute value of the frame difference.

The absolute value of the frame difference is input to the comparator 241 and is compared with a predetermined threshold 1 (TH1). When the absolute value of the frame difference is less than the threshold 1 (TH1), it is determined that correlation exists, so that bit data (e.g., [1]) indicating the presence of correlation is output from the comparator 241. When the absolute value of the frame difference is greater than or equal to the threshold 1 (TH1), it is determined that correlation does not exist, so that bit data (e.g., [0]) indicating the absence of correlation is output from the comparator 241.

Hitherto, it has been the case to use the values output from the comparator 241 directly as accumulated points in generating an evaluation-value table. That is, it has been the case to generate an evaluation value table by accumulating results of calculating correlation for all the representative points in one screen, and to extract candidate vectors on the basis of peaks (extrema) that occur in the evaluation-value table generated.

Figure 1:
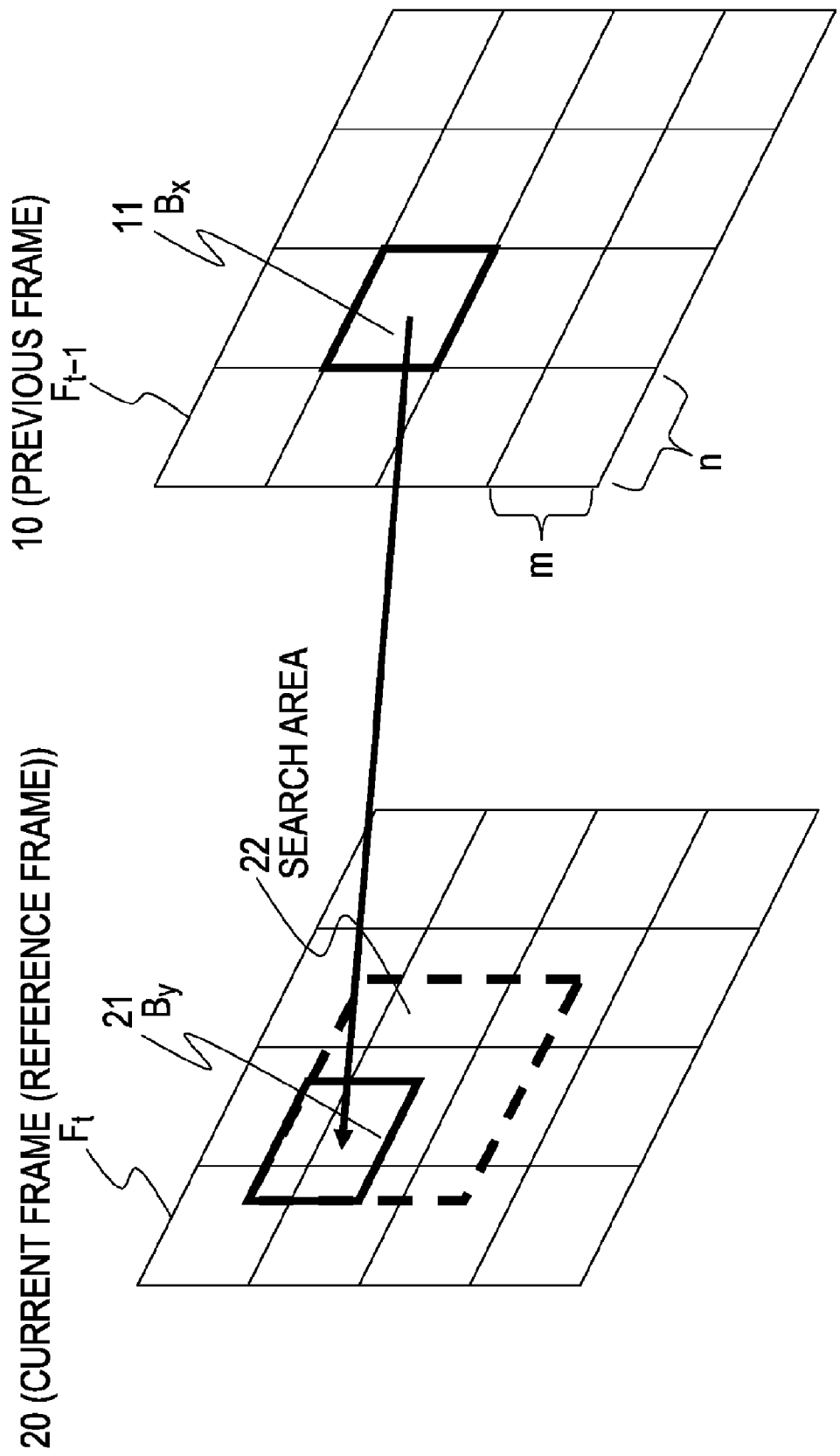
FIG. 1 is a diagram for explaining an overview of block matching.
Figure 2:
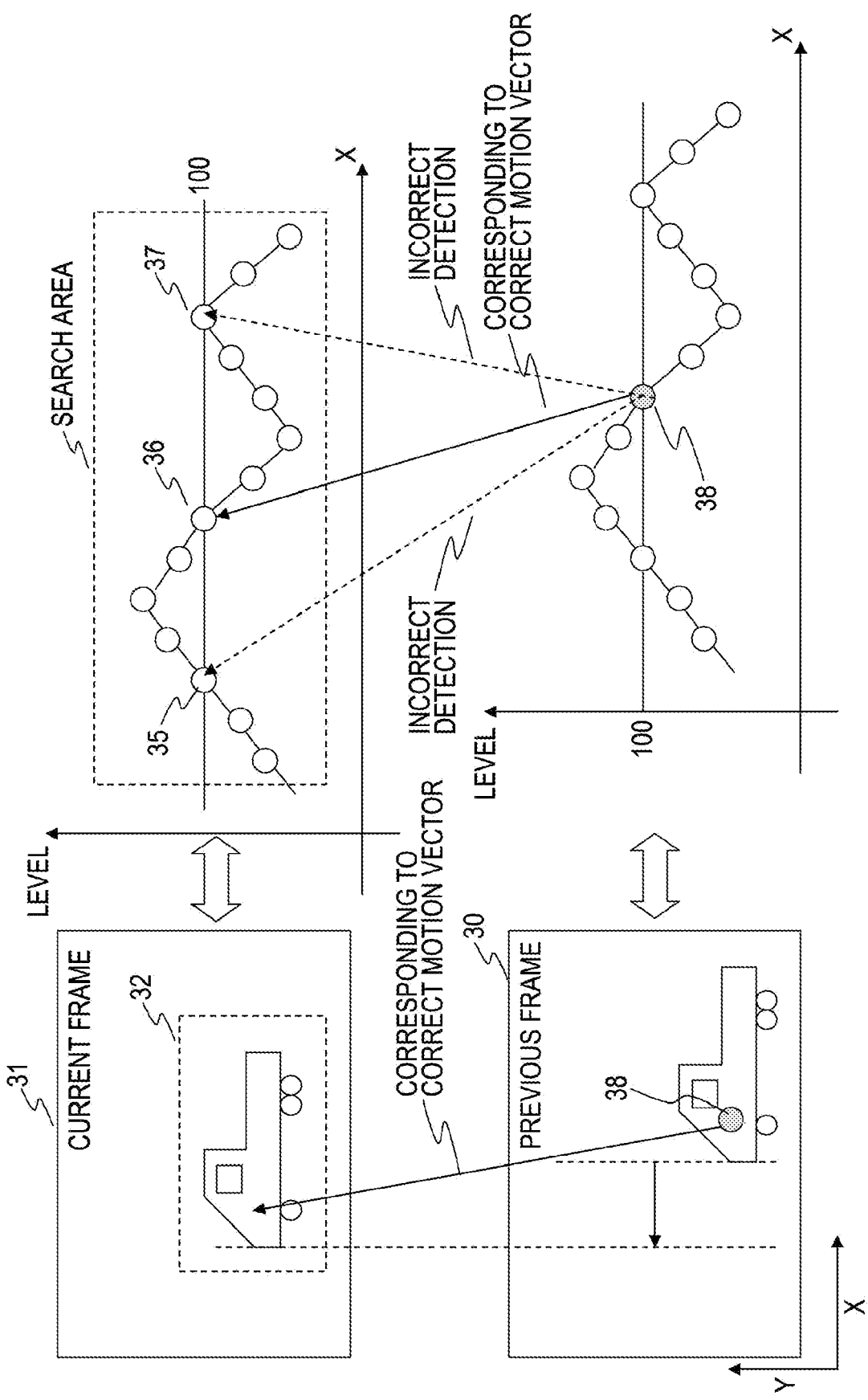
FIG. 2 is a diagram for explaining problems of a motion-vector detecting process based on representative-point matching.

However, as described earlier with reference to FIG. 2, when an evaluation-value table is generated by correlation checking based only on representative points, in some cases, an evaluation-value table having a peak corresponding to a correct vector is not generated due to incorrectly detected accumulated points.

Thus, according to the present invention, an evaluation-value table is generated considering the pixel levels in the proximity of representative points, i.e., spatial waveforms in the proximity of representative points. 1-bit data indicating the presence or absence of correlation, composed only of correlation information of a representative point output from the comparator 241, is translated in the calculator 260 into, for example, 8-bit data on the basis of an output from the weight calculator 250. The 8-bit data is output to the evaluation-value accumulator 271 so that an evaluation-value-table based on the 8-bit data is generated.

Now, processing executed by the flag-data calculator 220, the flag-correlation calculator 230, and the weight calculator 250 will be described.

(a) Flag-Data Calculator

The flag-data calculator 220 receives input of image data, and executes processing for translating relationship between all the input pixels and adjacent pixel data into flag data.

Figure 9:
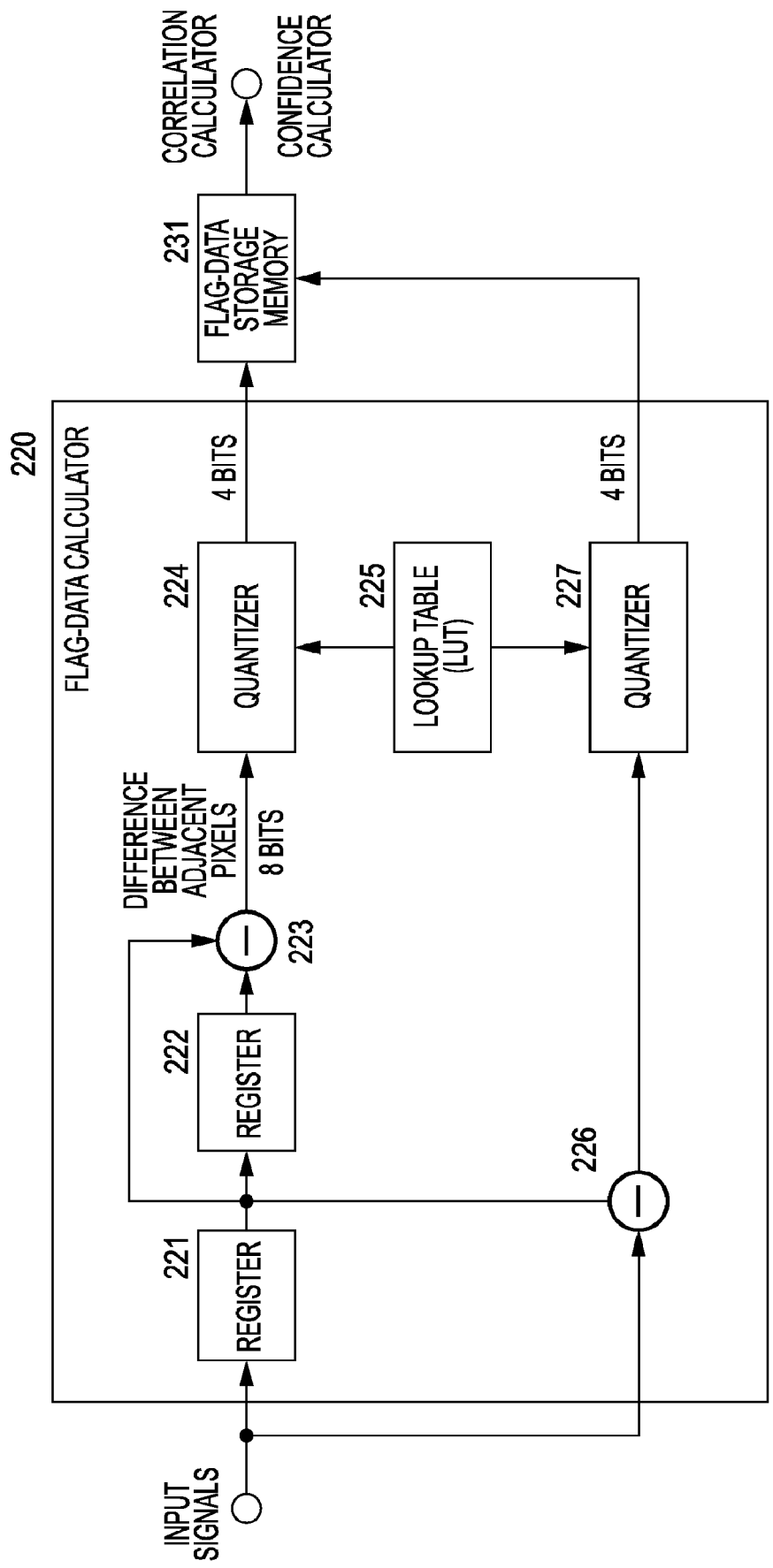
FIG. 9 is a diagram showing a detailed configuration of a flag-data calculator in the evaluation-value-table generator.

FIG. 9 shows details of the configuration of the flag-data calculator 220. Processing executed by the flag-data calculator 220 will be described with reference to an example where the values of differences with adjacent pixels are translated into flags, shown in FIG. 10.

Pixel signals as input signals are input in raster order and supplied to the register 221 and the difference calculator 226 shown in FIG. 9. The difference calculator 226 calculates the difference between the level of a pixel output from the register 221 and the level of a succeeding input pixel.

The output from the register 221 is stored in the register 222 and is also supplied to the difference calculator 223. The difference calculator 223 calculates the difference between the level of the preceding pixel from the register 222 and the level of the succeeding pixel stored in the register 221.

Figure 10:
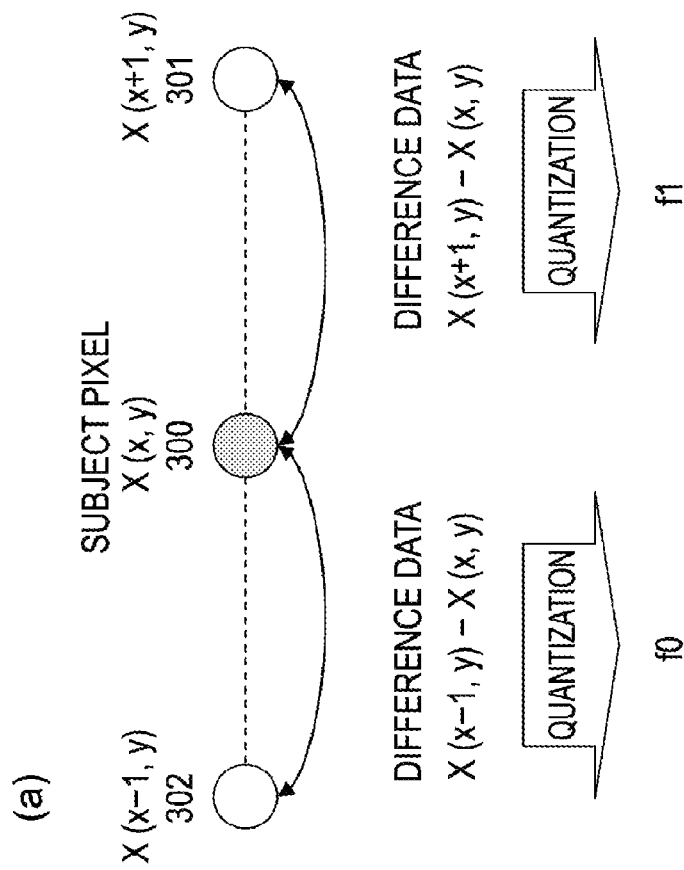
FIG. 10 is a diagram for explaining a specific example of processing executed by the flag-data calculator.

That is, in the example shown in FIG. 10($a$), in relation to a subject pixel (x, y) 300, the values of differences with the levels of the preceding and succeeding adjacent pixels (x+1, y) 302 and (x−1, y) 303 are calculated.

For example, when a pixel level is represented by 8-bit data of 0 to 255, these pieces of difference data are output respectively from the difference calculator 223 and 226 in the form of 8-bit difference data.

The pieces of 8-bit difference data output respectively from the difference calculators 223 and 226 are input to quantizers 224 and 227 and translated into pieces of 4-bit flag data on the basis of a translation table 225, and the pieces of 4-bit flag data are output to the flag-data storage memory 231.

The translation table 225 is composed of a table shown in FIG. 10($b$). The quantizers 224 and 227 translate pieces of difference data d input respectively from the difference calculators 223 and 226 into certain flag data with reference to the translation table 225 on the basis of the values of the difference data d. For example:

$-255 < d \leq -32 \rightarrow$ flag=0

$32 < d \leq -16 \rightarrow$ flag=1

:

$16 < d \leq 32 \rightarrow$ flag=14

$32 < d \leq 255 \rightarrow$ flag=15

The quantizers 224 and 227 generate pieces of 4-bit flag data (0 to 15) on the basis of the values of the pieces of 8-bit difference data d (0 to 255) input respectively from the difference calculators 223 and 226, and output the pieces of 4-bit flag data to the flag-data storage memory 231.

Generally, as a nature of image data, correlation with adjacent pixel data is high, so that even if the image data is represented by a small number of bits with an upper limit of the value of difference with an adjacent pixel, the quantization error in the entire image obtained by restoring original pixel data is presumably small. Thus, according to the scheme of this embodiment, the number of bits for representing each set of three pixels of subject-pixel data and adjacent-pixel data is 8 bits×3=24 bits, and difference information is reduced to 4-bit flag data.

In the flag-correlation calculator 230, which checks correlation on the basis of the flag data, correlation can be checked on the basis of the data reduced to 4 bits. Thus, the speed of processing is increased and the hardware scale is reduced.

The translation of pixel difference data into flag data is not limited to translation based on the translation table shown in FIG. 10($b$). For example, 8-bit difference data of adjacent pixel data may be reduced to 4 bits, or the higher 4 bits of 8-bit pixel value data may be used as flag information.

The scheme of translating differences between adjacent pixels into flags is an example of a method that allows efficient description of spatial waveforms by a small calculation circuit without requiring an extra line memory since input pixels are input in raster order. Furthermore, since difference data is translated into flags, advantageously, rough waveform information composed of three pixels is not lost.

(b) Flag-Correlation Calculator

Next, processing executed by the flag-correlation calculator 230, which receives input of flag data that is generated according to the above description from the flag-data calculator 220, will be described.

The flag-correlation calculator 230 stores flag data input from the flag-data calculator 220 in the flag-data storage memory 231. Flag data of a previous frame and flag data of a current frame, read from the flag-data storage memory 231, are supplied to the difference calculator 232.

The difference calculator 232 calculates a flag difference between the flag data of the previous frame and the flag data of the current frame, and outputs the flag difference to the absolute-value calculator 233.

The absolute-value calculator 233 receives input of the frame difference (result of calculating flag correlation) based on the flag data of the previous frame and the flag data of the current frame, input from the difference calculator 232, calculates the absolute value of the frame difference, and outputs the absolute value to the comparator 242.

The comparator 242 compares the absolute value of flag-data difference input from the flag-correlation calculator 230 with a predetermined threshold 2 (TH2), and outputs to the weight calculator 252 bit data indicating the presence of correlation when the absolute value of flag-data difference is less than the predetermined threshold 2 (TH2) or bit data indicating the absence of correlation when the absolute value of flag-data difference is greater than or equal to the predetermined threshold 2 (TH2).

(c) Weight-Calculation Processor

Next, processing executed by the weight calculation processor 250 will be described. The weight calculation processor 250 receives input of the values of flag-data difference calculated by the flag-correlation calculator 230 to the decoder 254, and calculates an activity of the image data.

The activity is an index whose value increases as the image data becomes more complex. More specifically, the activity is high in areas such as edge areas where the levels of pixel values such as luminance levels considerably vary within a small range, while the activity is low when the image data is composed of flat pixel values as in the case of an image of the sky. When the activity in a neighboring region of a representative point is high, it is easy to determine whether the representative point has moved, and human visual perception is significantly affected. When the area of an object with a high activity is small, according to the art that has hitherto been used, peaks in the evaluation-value table depend on the size, so that the levels of the peaks are low, which causes difficulty in extracting candidate vectors. As a result, in the case of a candidate vector not including a motion vector of an object with a high activity, it is difficult to determine a likely motion vector when determining a motion vector. Furthermore, due to the nature of image, when pixel data with a high activity moves, the level considerably changes when the amount of movement is not larger than sampling of image data. In spite of this nature, when it is determined that correlation based on pixel-level data is high, it can be expected that the confidence of the detected candidate motion vector is high.

Calculation of an activity will be described in detail with reference to FIG. 11. FIG. 11(a) shows the translation table 253 held by the weight calculation processor 250. This is a table for performing inverse translation of the translation table described earlier with reference to FIG. 10(B9, and it is used to calculate a pixel-value difference from flag data. When the pixel-value difference with an adjacent pixel is large, it is determined that the activity is high.

Figure 11:
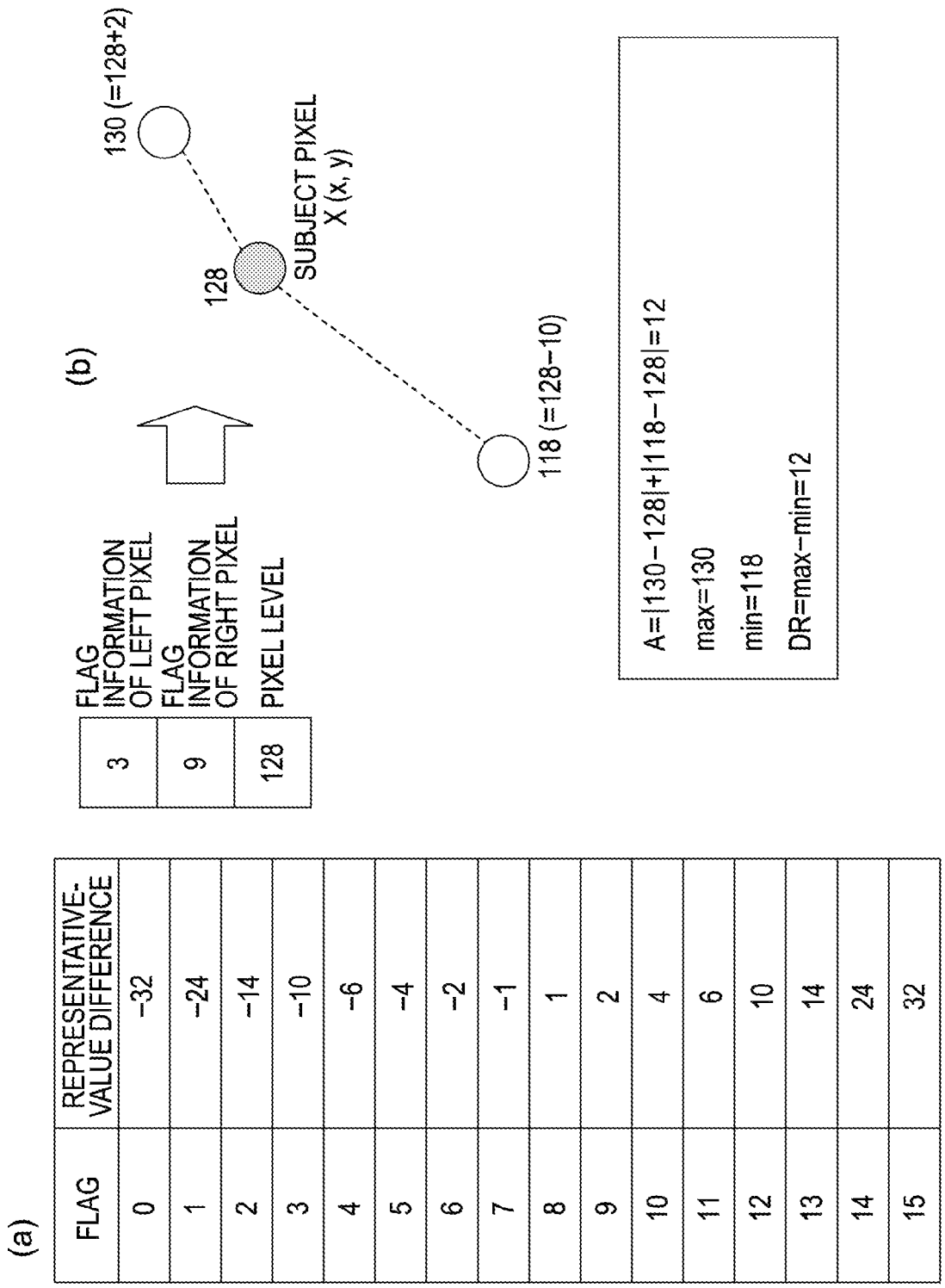
FIG. 11 is a flow diagram for explaining a specific example of processing executed by a weight calculation processor.

In the example shown in FIG. 11, [3] is input as flag-data information of a left pixel, and [9] is input as flag-data information of a right pixel. In this case, the decoder 254 obtains a corresponding representative-value difference from the translation table 253 shown in FIG. 11(a), and outputs the representative-value difference to the activity calculator 251.

Representative-point difference corresponding to [3] as flag-data information of the left pixel is [−10] Representative-point difference corresponding to [9] as flag-data information of the right pixel is [2]

The activity A in this case is:

$A=|-10|+|2|=12$

FIG. 11(b) shows a specific example setting of pixel values in a case where the above calculation is performed.

Pixel value of subject pixel=128
Pixel value of right adjacent pixel=130
Pixel value of left adjacent pixel=118

Under this setting, the activity calculated by the above calculation is:

$A=|130-128|+|118-128|=12$

This value is equal to the dynamic range (DR), which is the difference between the maximum pixel value (MAX)=130 and the minimum pixel value (MIN)=118 among these three pixels.

That is, the activity (A) calculated from flag data has a value corresponding to the dynamic range (DR).

Figure 12:
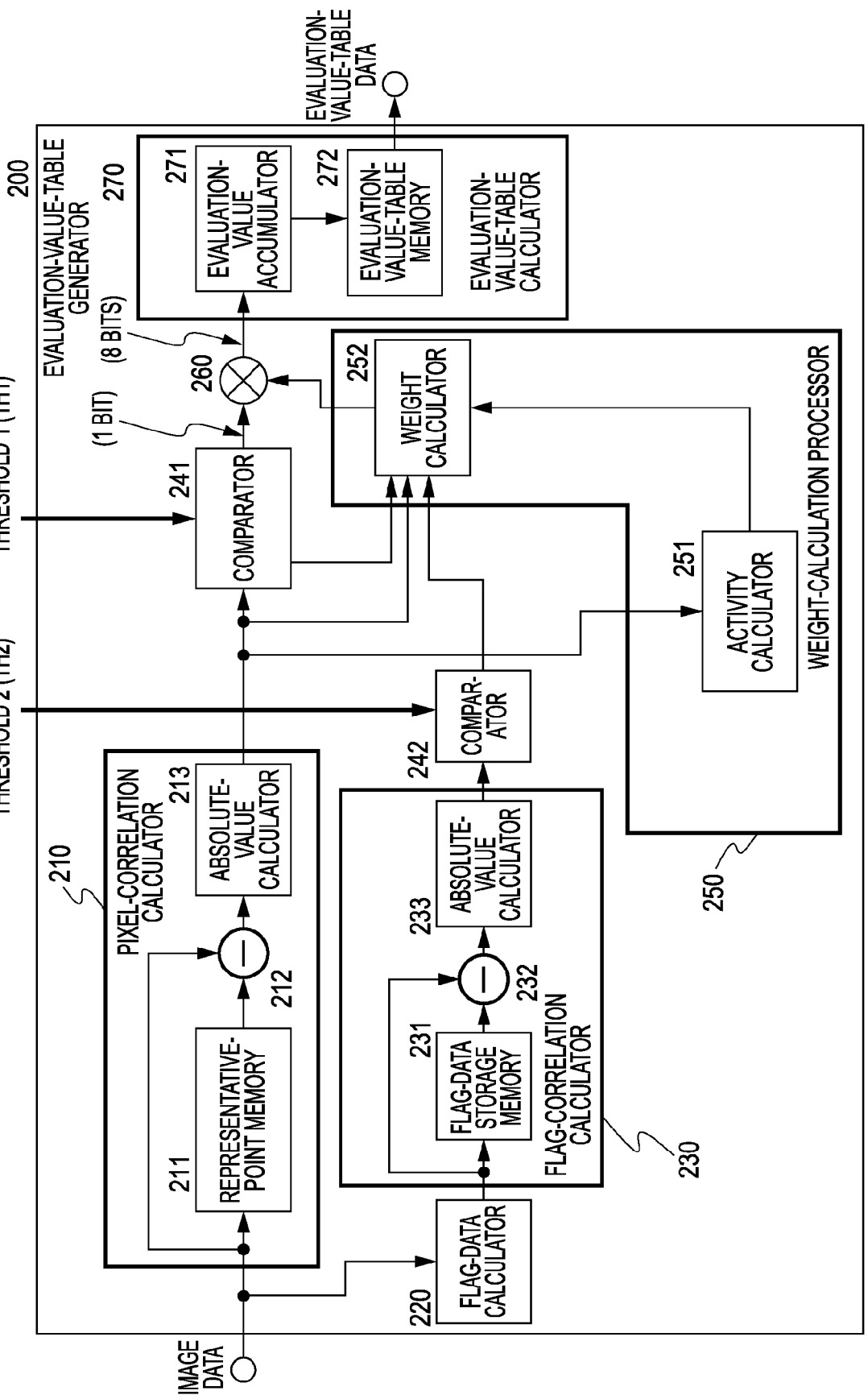
FIG. 12 is a diagram showing a second example of detailed configuration of the evaluation-value-table generator in the motion-vector detecting device according to the present invention.

In the example of processing described above, the weight calculation processor 250 receives input of flag data from the flag-correlation calculator 230, and calculates an activity on the basis of pixel-value difference data obtained through translation based on the translation table (refer to FIG. 11). Alternatively, for example, as shown in FIG. 12, the activity calculator 251 may receive frame-difference absolute-value data output from the pixel-correlation calculator 210 and calculate an activity A on the basis of the frame-difference absolute-value data.

The value of the activity A calculated by the activity calculator 251 on the basis of flag data or frame-difference absolute-value data is output to the weight calculator 252. The weight calculator 252 calculates a weight W on the basis of data indicating the presence or absence of correlation, input from the comparators 241 and 242 as results of comparison with the thresholds (TH1 and TH2), and calculates a confidence index α on the basis of the value of the activity A and the weight W.

On the basis of representative-point pixel data and correlation in search areas set for different frames, the comparator 241 compares the results of calculating pixel correlation calculated by the pixel-correlation calculator with the threshold (TH1). On the basis of correlation between flag data, the comparator 242 compares the results of calculation of flag correlation by the flag-correlation calculator with the threshold (TH2), and outputs the results of comparison.

As an example of correlation checking, letting pixel data of a representative point and flag data of the representative point be denoted by X, $X_{f0}$, and $X_{f1}$, and input pixel data and flag data of the input pixel by Y, $Y_{f0}$, and $Y_{f1}$, the comparator 241 checks whether the following expression is satisfied:

$|X-Y|<TH1$      (Expression 1), and the comparator 242 checks whether the following expressions are satisfied:

$$|Xf0-Yf0|<TH2 \quad \text{(Expression 2)}$$

$$|Xf1-Yf1|<TH2 \quad \text{(Expression 3)}$$

The results of the checking are input to the weight calculator 252.

Although the thresholds TH1 and TH2 are fixed in this example, alternatively, these thresholds may be varied by calculating the thresholds from image data.

The weight calculator 252 calculates the degree of correlation as a weight on the basis of the results of checking according to the above three expressions (Expressions 1 to 3). For example, when Expressions 1, 2, and 3 are all satisfied, it is possible to determine that correlation is high. On the other hand, when the condition of Expression 1 is satisfied but the conditions of Expressions 2 and 3 are not satisfied, it is possible to determine that correlation is low. Thus, it is possible to check the confidence of a candidate motion vector detected on the basis of the degree of correlation.

Furthermore, on the basis of a residual calculated from Expression 1, it is possible to calculate a degree of correlation of pixel level. For example, when the condition of Expression 1 is satisfied, a weight coefficient W as an index representing a degree of correlation can be expressed as:

$$W=(TH1-|X-Y|) \quad \text{(Expression 4)}$$

W=0 when Expressions 2 and 3 are not satisfied. Thus, it is considered that the confidence of the candidate motion vector detected is higher as the value of the weight coefficient W becomes larger. Furthermore, the degrees of correlation according to Expressions 2 and 3 may be reflected on the weight coefficient W. That is:

$$W_{a11}=(TH1-|X-Y|)+(TH2-|X_{f0}-Y_{f0}|)+(TH2-|X_{f1}-Y_{f1}) \quad \text{(Expression 5)}$$

$W_{a11}=0$ when Expressions 2 and 3 are not satisfied.

The weight calculator 252 calculates a confidence index a on the basis of the weight coefficient W calculated by one of the methods described above and the activity A described earlier. The confidence index α is calculated according to the following expression:

$$\alpha=A\times W \quad \text{(Expression 6)}$$

The weight calculator 252 outputs to the calculator 260 the confidence index α that has been calculated according to the above expression (Expression 6) on the basis of the weight coefficient W and the activity A, and multiplies the confidence index α with the result bit indicating the presence or absence of correlation based on the pixel of the representative point, output from the comparator 241. As a result, when the result bit indicating the presence or absence of correlation based on the pixel of the representative point output from the comparator 241 is [1], the value of the confidence index [α] is output to the evaluation-value-table calculator 270.

For example, when the threshold for checking correlation with representative-point data is TH1=5 and the upper limit of activity relative to two adjacent pixels on the left and right of a subject pixel is 6 bits, the range of the confidence is $0 \leq \alpha \leq 252$, so that a weight of about 8 bits can be added to the evaluation-value table compared with 1 bit in the art that has hitherto been used. Thus, a reliable evaluation-value table can be created.

Although the sum of the absolute values of differences with two pixels horizontally adjacent to the subject pixel is used as an activity in the embodiment described above, alternatively, for example, a dynamic range may be used.

The evaluation-value-table calculator 270 accumulates evaluation values corresponding to input confidence indices in the evaluation-value accumulator 271 to generate an evaluation-value table, and stores the evaluation-value table in the evaluation-value-table memory 272.

The evaluation-value accumulator 271 accumulates evaluation values corresponding to confidence indices input from the calculator 260. As a result, an evaluation-value table based on the confidence indices is created.

Figure 13:
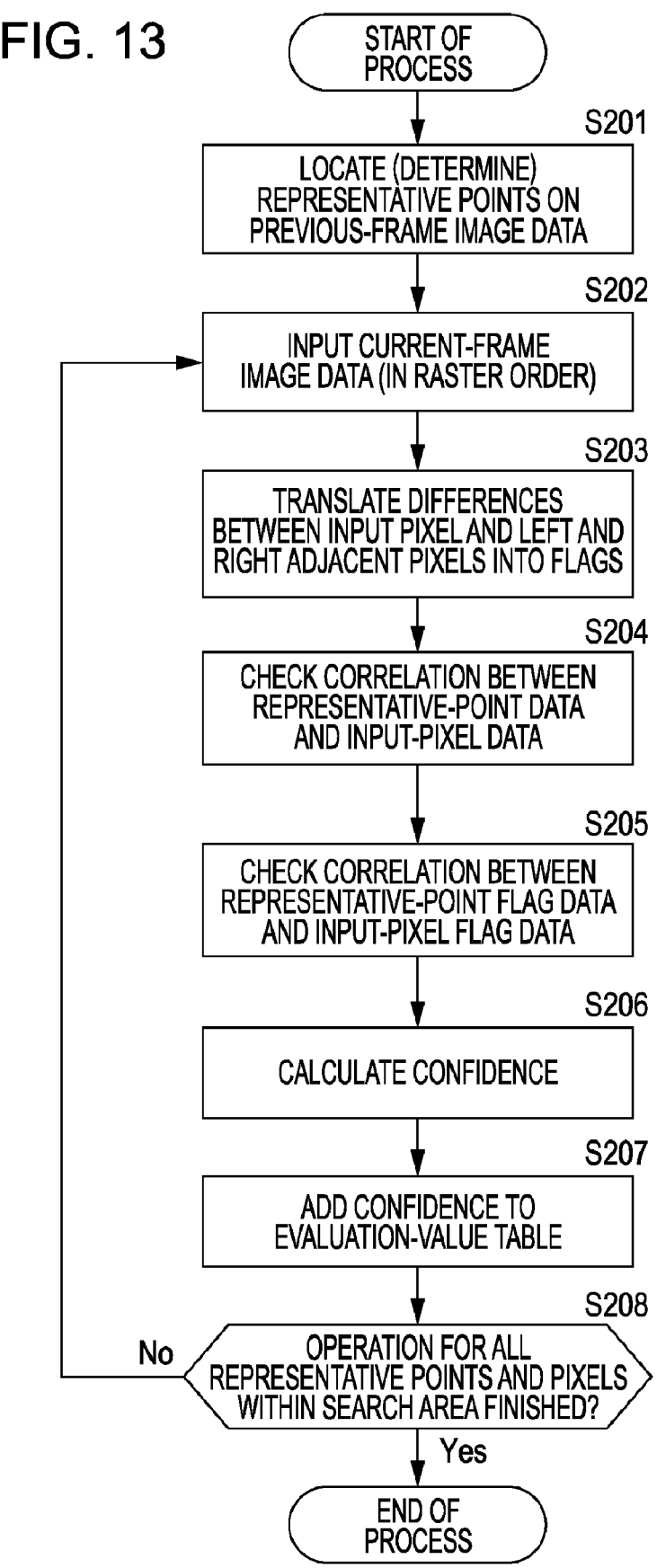
FIG. 13 is a diagram showing a flowchart for explaining a sequence of an evaluation-value-table generating process executed by the motion-vector detecting device according to the present invention.

The sequence of the evaluation-value-table generating process executed by the motion-vector detecting device according to the present invention described above will be described with reference to a flow shown in FIG. 13.

In step S201, a representative point is set (determined) in previous-frame image data. As described earlier, the representative point of each block is associated with a pixel value representing the block, for example:

a. Pixel value at the center of the block
b. Average of the pixel values of all the pixels in the block
c. Median of the pixel values of all the pixels in the block In step S202, current-frame data is input. The current-frame data is input, for example, in raster order. In step S203, the flag-data calculator 220 (refer to FIG. 8) executes processing for translating differences between an input pixel and left and right adjacent pixels into flags.

As described with reference to FIGS. 9 and 10, this processing translates, for example, 8-bit pixel-value difference data into 4-bit (0 to 15) flag data.

In step S204, correlation between representative-point data and input-pixel data is checked. This processing is executed by the pixel-correlation calculator 210 and the comparator 241 shown in FIG. 8. The representative-point data of the previous frame, read from the representative-point memory 211, and the image data of the current frame are supplied to the difference calculator 212, and a pixel value difference, e.g., a frame difference (result of calculation of correlation) between the pixel value of the representative point in the previous frame and each representative point set in the image data of the current frame, and outputs the frame difference to the absolute-value calculator 213, where the absolute value of the frame difference is calculated. The absolute value of the frame difference is input to the comparator 241 and compared with the predetermined threshold 1 (TH1). When the absolute value of the frame difference is less than the threshold 1 (TH1), it is determined that correlation exists, so that bit data representing the presence of correlation (e.g., [1]) is output from the comparator 241. When the absolute value of the frame difference is greater than or equal to the threshold 1 (TH1), it is determined that correlation does not exist, so that bit data indicating the absence of correlation (e.g., [0]) is output from the comparator 241.

In step S205, correlation between representative-point flag data and input-pixel flag data is checked. This processing is executed by the flag-correlation calculator 230 and the comparator 242 shown in FIG. 8.

The flag-correlation calculator 230 stores flag data input from the flag-data calculator 220 in the flag-data storage memory 231. Flag data of a previous frame, read from the flag-data storage memory 231, and flag data of a current frame are supplied to the difference calculator 232.

The difference calculator 232 calculates a flag difference between the flag data of the previous frame and flag data of the current frame, and outputs the flag difference to the absolute-value calculator 233.

The absolute-value calculator 233 receives input of the frame difference (result of calculation of flag correlation) based on the flag data of the previous frame and the flag data of the current frame, input from the difference calculator 232, calculates the absolute value of the frame difference, and outputs the absolute value of the frame difference to the comparator 242.

The comparator 242 compares the absolute value of the flag-data difference input from the flag-correlation calculator 230 with the predetermined threshold 2 (TH2), and outputs to the weight calculator 252 bit data indicating the presence of correlation when the absolute value of the flag-data difference is less than the predetermined threshold 2 (TH2) or bit data indicating the absence of correlation when the absolute value of the flag-data difference is greater than the predetermined threshold 2 (TH2).

In step S206, a confidence index α is calculated. The calculation of the confidence index α is executed in the weight calculator 250.

As described earlier, an activity A is calculated in the activity calculator 251 on the basis of flag data or frame-difference absolute-value data, a weight coefficient W is calculated on the basis of outputs from the comparators 241 and 242, and a confidence index α is calculated on the basis of the activity A and the weight coefficient W according to:

$$\alpha = A \times W$$

In step S207, the confidence index α is output as an accumulated point in the evaluation-value table. In step S208, it is checked whether correlation checking with all the representative points and pixels in the search area has been finished. When the correlation checking has not been finished, the processing in step S202 and subsequent steps is executed for an unprocessed pixel. When the processing has been finished for all the pixels, the process is exited.

[4. Details of Generation of Evaluation-Value Table with Correlation Information Between Representative Point and Neighboring Representative Point Taken into Consideration]

Next, generation of an evaluation-value table with correlation information between a representative point and a neighboring representative point will be described in detail.

First, an overview of generation of an evaluation-value table in this embodiment will be described with reference to FIGS. 14 and 15. In correlation detection based on representative-point matching that has hitherto been used, as shown in FIG. 14, for example, regarding a representative point 321 selected from a previous frame 320, comparison of pixel values is executed sequentially for the pixels in a search area 323 set in a current frame (input frame) 322 to calculate correlation and obtain evaluation values based on the presence or absence of correlation, and the evaluation values are used as accumulated points in the evaluation-value table.

Figure 14:
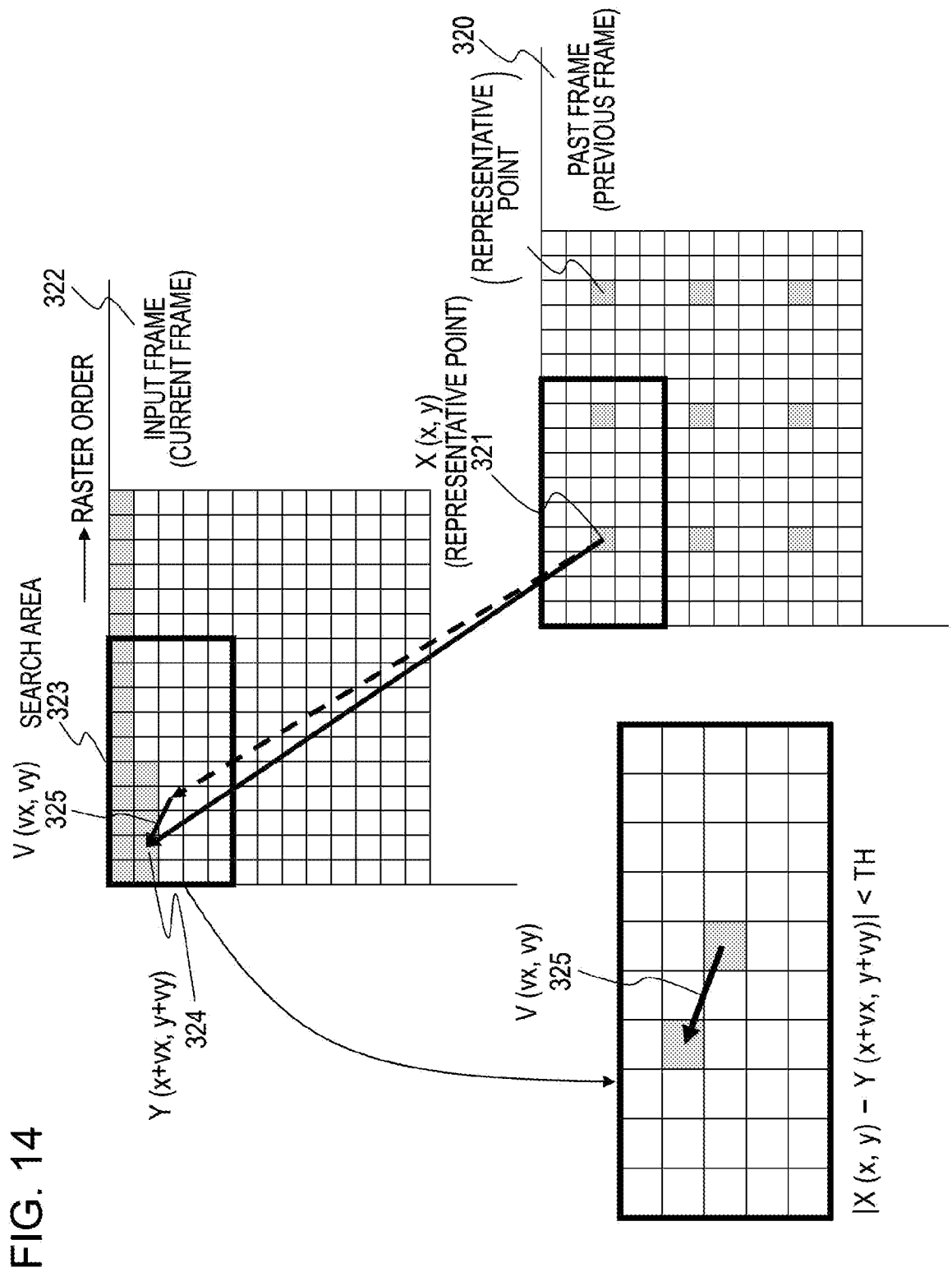
FIG. 14 is a diagram for explaining representative-point matching.

For example, in the example shown in FIG. 14, when a pixel 324 having high correlation with the representative point 321 is detected in the search area 323, a point corresponding to a vector V(Vx, Vy) is accumulated as an evaluation value in the evaluation-value table.

Letting the pixel value of the representative point 321 be denoted by X(x, y) and the pixel value of the pixel 324 by Y(x;Vx, y+vy), it is determined that correlation exists and an evaluation value is added when the following expression is satisfied:

$$|X(x, y) - Y(x, +Vx, y+vy)| < TH$$

Figure 15:
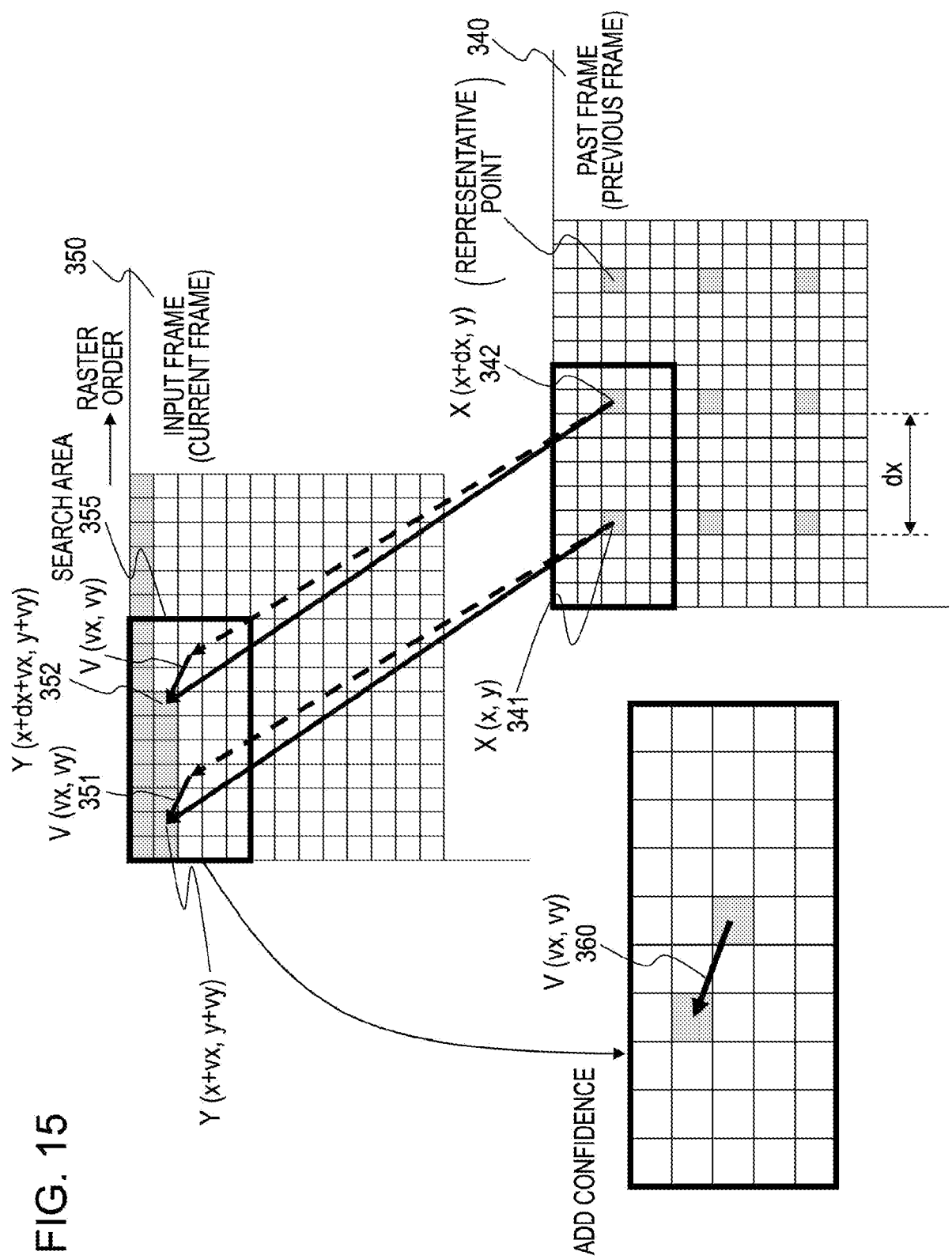
FIG. 15 is a diagram for explaining processing for executing similarity checking of neighboring representative points according to the present invention.

In calculation of evaluation values in this embodiment, as shown in FIG. 15, for example, regarding a representative point 341 selected from a previous frame 340, comparison of pixel values is executed sequentially for the pixels in a search area set in a current frame (input frame) 350 to calculate correlation of pixel values and detect vectors on the basis of the presence of absence of correlation, and additionally, comparison of pixel values is also executed for pixels in a search area 355 for a representative point 342 adjacent to the representative point 341 to calculate correlation of the pixel values and similarly detect vectors on the basis of the presence or absence of correlation, and sets an evaluation value with an increased weight when the motion vectors detected by correlation detection based on the plurality of representative points are similar.

More specifically, in calculating an evaluation value on the basis of correlation checking of the representative point 341 of the previous frame 340, when correlation checking regarding another representative point 342 in the neighboring region of the representative point 341 is executed and pixels 351 and 352 having high correlation are detected at position corresponding to the same vector V(vx, vy) for these two representative points 341 and 342, it is determined that the motion vector V(vx, vy) determined by the representative point 341 and the pixel 351 with high correlation has a high confidence, so that an evaluation value weighted by adding a confidence is output.

As described above, when the evaluation-value-table generator in this embodiment determines an evaluation value by checking correlation regarding a representative point, the evaluation-value-table generator checks similarity between a motion vector based on the correlation information of the representative point and motion vectors based on correlation information regarding a neighboring representative point, and sets a large evaluation value by adding confidence when similar motion vectors exist while setting a small evaluate value when similar motion vectors do not exist, thereby generating an evaluation-value table.

Figure 16:
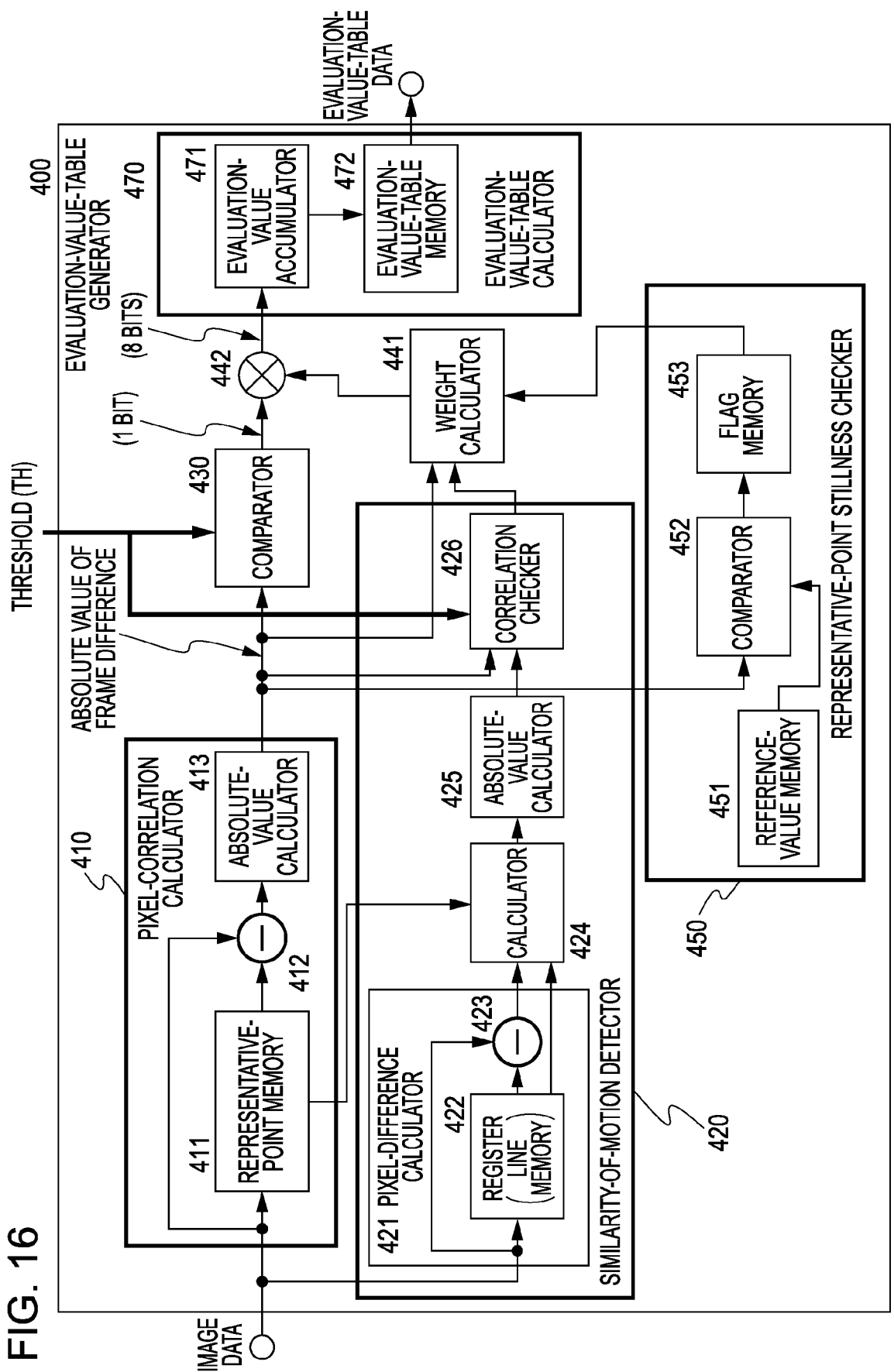
FIG. 16 is a diagram showing a detailed configuration of the evaluation-value-table generator in the motion-vector detecting device according to the present invention.

FIG. 16 shows the configuration of an evaluation-value-table generator 400 in this embodiment. As shown in FIG. 16, the evaluation-value-table generator 400 in this embodiment includes a pixel-correlation calculator 410, a similarity-of-motion detector 420, a comparator 430, a weight calculator 441, a calculator 442, a representative-point stillness checking detector 450, and an evaluation-value-table calculator 270.

The pixel-correlation calculator 410 includes a representative-point memory 411, a difference calculator 412 for calculating difference data of pixel values, and an absolute-value calculator 413 for calculating an absolute value of difference data. The similarity-of-motion detector 420 includes a pixel-difference calculator 421 having a register (line memory) 422 and a difference calculator 423, a calculator 424, an absolute-value calculator 425, and a correlation checker 426.

The representative-point stillness checking detector 450 includes a reference-value memory 451, a comparator 452, and a flag memory 453. In the evaluation-value-table calculator 470, an evaluation-value accumulator 471 accumulates evaluation values composed of, for example, 8-bit data, output from the calculator 442, thereby generating an evaluation-value table, and stores the evaluation-value table in an evaluation-value-table memory 472.

First, processing executed by the pixel-correlation calculator 410 will be described. The pixel-correlation calculator 410 executes representative-point matching.

Image data is input to the pixel-correlation calculator 410 via an input terminal, for example, on a frame-by-frame basis. The image data input to the pixel-correlation calculator 410 is supplied to the difference calculator 412 and the representative-point memory 411.

The image data stored in the representative-point memory 411 is data of predetermined representative points, generated from image data that is input, for example, on a frame-byframe basis. For example, one representative point is set, for example, in each block composed of m×n pixels, set by dividing the screen as described earlier with reference to FIGS. 3 and 4. The representative point is associated with pixel-value data representing the block, for example:

a. Pixel value at the center of the block
b. Average of pixel values of all the pixels in the block
c. Median of pixel values of all the pixels in the block More specifically, for example, image data (pixel-value data) at pixel positions spatially sampled at regular intervals is selected from an input frame image under timing control based on signals from the controller 104 (refer to FIG. 6), and the image data is stored in the representative-point memory 411 as representative-point data.

Representative-point data of a previous frame, read from the representative-point memory 411, and image data of a current frame are supplied to the difference calculator 412.

The difference calculator 411 calculates a difference between the pixel value of the representative point of the previous frame and the pixel value of a pixel in a search area associated with each representative point set in the image data of the current frame, e.g., a frame difference (result of calculation of correlation), and outputs the frame difference to the absolute-value calculator 413.

The absolute-value calculator 413 receives from the difference calculator 411 input of the frame difference (result of calculation of correlation) based on representative-point data of the previous frame and the image data of the current frame, and calculates the absolute value of the frame difference.

The absolute value of the frame difference is input to the comparator 430 and compared with a predetermined threshold 430. When the absolute value of the frame difference is less than the threshold (TH), it is determined that correlation exists, so that bit data indicating the presence of correlation (e.g., [1]) is output from the comparator 430. When the absolute value of the frame difference is greater than or equal to the threshold (TH), it is determined that correlation does not exist, so that bit data indicating the absence of correlation (e.g., [0]) is output from the comparator 430.

Hitherto, it has been the case to generate an evaluation-value table using values output from the comparator 430 directly as accumulated points. That is, it has been the case to generate an evaluation-value table is by accumulating results of calculation of correlation regarding all the representative points in one screen, and by extracting candidate vectors on the basis of peaks (extrema) that occur in the evaluation-value table generated.

As described with reference to FIG. 15, the evaluation-value-table generator in the motion-vector detecting device according to this embodiment, when determining an evaluation value by executing correlation checking regarding a representative point, checks similarity between motion vector based on correlation information of the representative point and motion vectors based on correlation information of a neighboring representative point, and sets a large evaluation value by adding confidence when similar motion vectors exist while setting an evaluation value with a small weight when similar motion vectors do not exist.

These processing steps are executed by the similarity-of-motion detector 420, the representative-point stillness checker 450, the weight calculator 441, and the calculator 442 shown in FIG. 16. Processing executed by these parts will be described below.

(a) Similarity-of-Motion Detector

Figure 17:
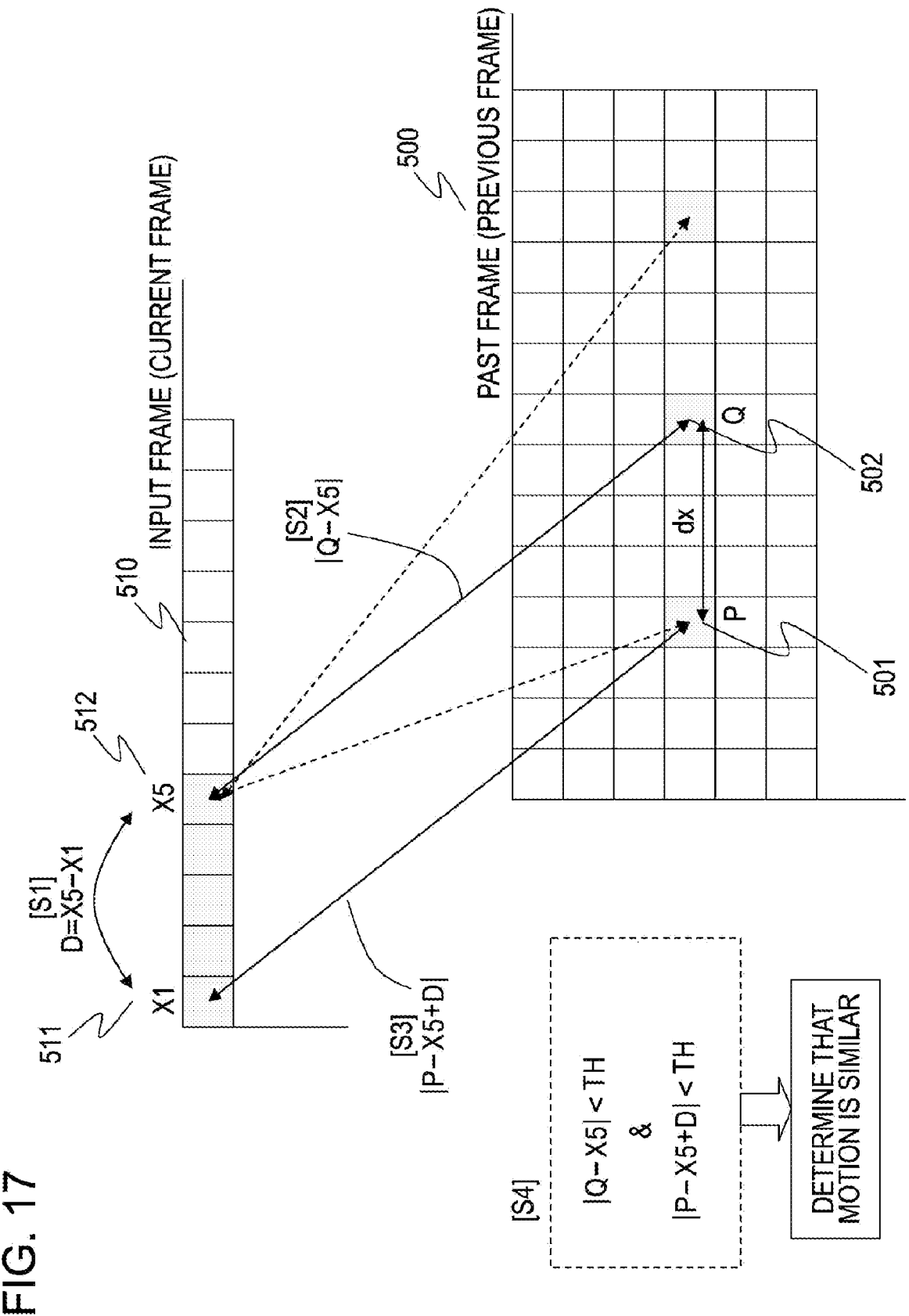
FIG. 17 is a diagram for explaining processing executed by a similarity-of-motion detector in the evaluation-value-table generator in the motion-vector detecting device according to the present invention.

First, processing executed by the similarity-of-motion detector 420 will be described in the context of a specific example of processing with reference to FIG. 17. The similarity-of-motion detector 420 receives input of image data, and stores input pixel data in the register (line memory) 422 in the pixel-difference calculator 421. An input frame 510 shown in FIG. 17 is stored in the register (line memory) 422. The difference calculator 423 calculates a pixel-value difference between the pixel data stored in the register (line memory) 422 and input pixel data. For example, a difference D=X5−X1 between a pixel value X1 of a pixel 511 and a pixel value X5 of a pixel 512, shown in FIG. 17, is calculated. This processing is executed in step 1 [S1] shown in FIG. 17. X1 and X5 denote the pixel values of the pixels 511 and 512, respectively.

The interval between the pixel 511 and the pixel 512 is chosen to be equal to the interval of representative points set in a previous frame 500.

The difference D is then input to the calculator 424, and a result of calculation by the calculator is input to the absolute-value calculator 425. The calculator 424 and the absolute-value calculator 425 execute calculation in step 2 [S2] and step 3 [S3] shown in FIG. 17 on the basis of the value input from the pixel-difference calculator 421 and the pixel value of the representative-point in the previous frame supplied from the representative-point memory 411.

More specifically, first, in step 2 [S2], an absolute value of difference $|Q-X5|$ between a pixel value Q of a representative-point pixel 502 in the previous frame 500, input from the representative-point memory 411 shown in FIG. 6, and a pixel 512 of an input frame 510 is calculated.

Then, in step 3 [S3], an absolute value of difference $|P-X5+D|$ between a pixel value P of a representative-point pixel 501 in the previous frame, input from the representative-point memory 411 shown in FIG. 6, and a pixel 511 in the input frame 510.

In FIG. 17, an example where similarity between the subject representative point 501 and the right neighboring representative point 502 is detected. In representative-point matching, correlation is checked between one input pixel and a plurality of representative points, so that $|Q-X5|$ and $|P-X1|$ are not calculated in parallel, and $|P-X5+D|$ is calculated instead of calculating $|P-X1|$. Thus, as in the calculation procedure S1 to S3 shown in FIG. 17, before performing representative-point matching, a difference D between an input pixel in the input frame and a pixel that is distant by the representative-point interval is calculated in advance.

Then, the correlation checker 426 executes processing in step 4 [S4] shown in FIG. 17, i.e., comparison between the predetermined threshold [TH] and the pixel differences calculated in steps 2 and 3 to check whether the following expressions are satisfied:

$$|Q-X5|<TH$$

$$|P-X5+D|<TH$$

When both $|Q-X5|<TH$ and $|P-X5+D|<TH$ are satisfied, it is determined that the same motion vector is set for the representative point and the neighboring representative point and that similarity of motion exists. Then, the similarity-of-motion detector 420 shown in FIG. 16 outputs the result of checking that similarity of motion exists, e.g., a bit [1], to the weight calculator 441.

When one of $|Q-X5|<TH$ and $|P-X5+D|<TH$ is not satisfied, it is determined that the same motion vector is not set for the representative point and the neighboring representative point and that similarity of motion does not exist. Then, the similarity-of-motion detector 420 shown in FIG. 16 outputs the result of checking that similarity of motion does not exist, e.g., a bit [0], to the weight calculator 441.

(b) Weight Calculator

Next, processing executed by the weight calculator 441 will be described. Considering a representative point on an object in an image as a subject pixel, when a motion vector obtained by correlation detection regarding a neighboring representative point is similar, the weight calculator 441 determines that the motion vector has a high confidence, and calculates a confidence index β based on the confidence and outputs the confidence index β to the calculator 442.

The calculator 442 receives input of the confidence index β, and also receives input of the output from the comparator 430, i.e., a bit [1] when correlation exists or a bit [0] when correlation does not exist as a result of checking the presence or absence of correlation on the basis of results of checking correlation between the representative point and the pixels in the search area as a result of representative-point matching executed by the pixel-correlation calculator 410.

When it is determined that correlation exists as a result of representative-point matching, the calculator 442 adds or multiplies the bit 1 with the confidence index calculated on the basis of the result of checking that similarity of motion exists regarding the neighboring representative point, input from the weight calculator, and outputs β×1 or β+1 to the evaluation-value accumulator 471 as a final evaluation value.

The weight calculator 441 calculates the confidence index β when the output from the similarity-of-motion detector 420 indicates a result of checking that similarity exists. The calculation of the confidence index β in the weight calculator 441 will be described in detail.

As shown in FIG. 18, when motion vectors of a subject representative point and a neighboring representative point are similar, if a spatial gradient between these representative points exists, i.e., when a large pixel-value difference exists between these representative points as shown in FIG. 18(a), a region having a luminance-level difference moves in the image, and the motion vector is considered to have a higher confidence. On the other hand, when a large pixel-value difference does not exist between the representative points as shown in FIG. 18(b), a region having little luminance-level difference moves, e.g., a background region or a sky region, and it is determined that the confidence of the motion vector is low even if similarity of motion is detected.

Figure 19:
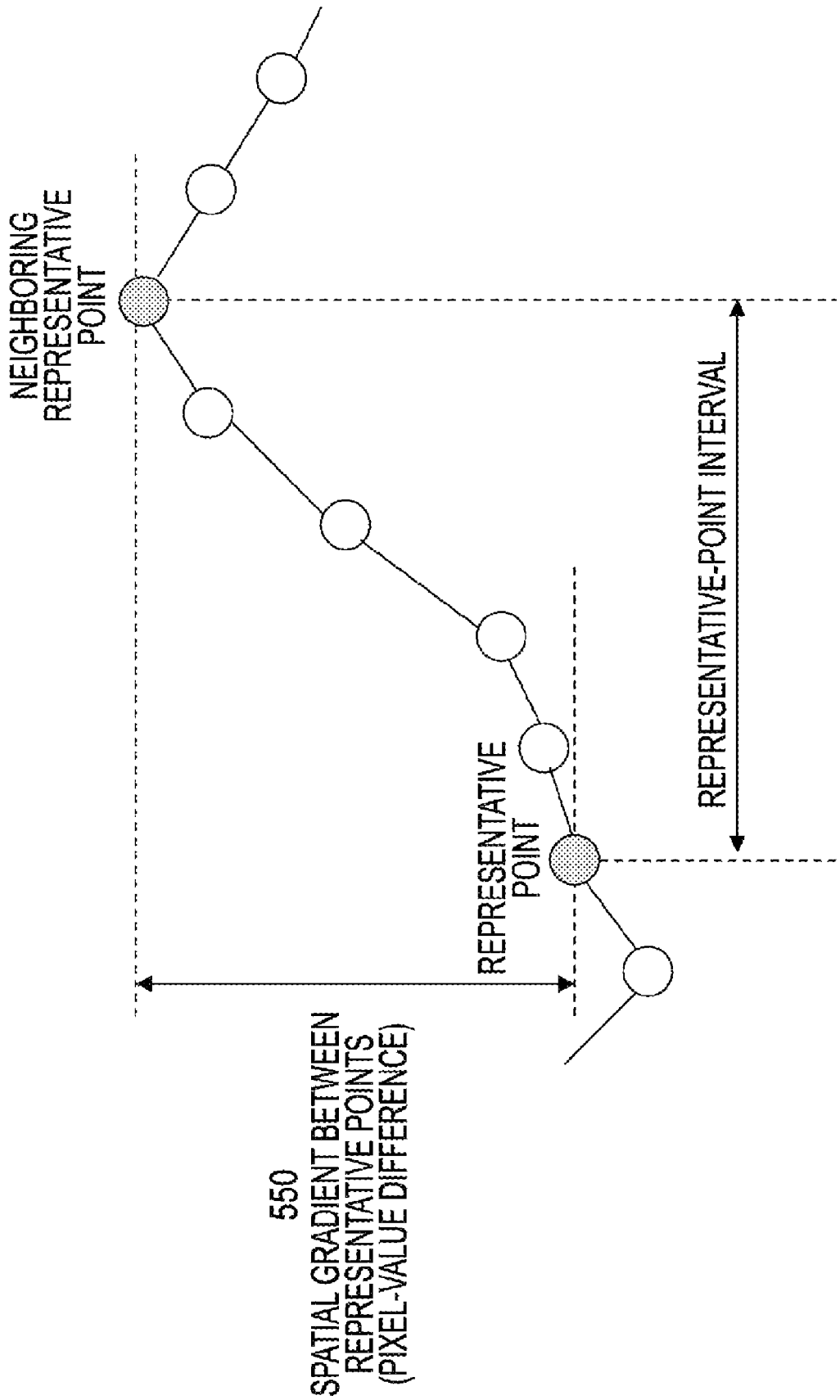
FIG. 19 is a diagram for explaining processing executed by the weight calculator in the evaluation-value-table generator in the motion-vector detecting device according to the present invention.

More specifically, as shown in FIG. 19, the weight calculator 441 calculates a confidence index β on the basis of a spatial gradient 550 between the representative points.

When a result of checking that similarity of motion exists between the representative points is input from the similarity-of-motion detector 420, the weight calculator 441 calculates the confidence β of the motion vector according to the following equation:

$$\beta = \sum_{n}^{N} |P_m - P_n| \qquad \text{[Eq. 4]}$$

Figure 20:
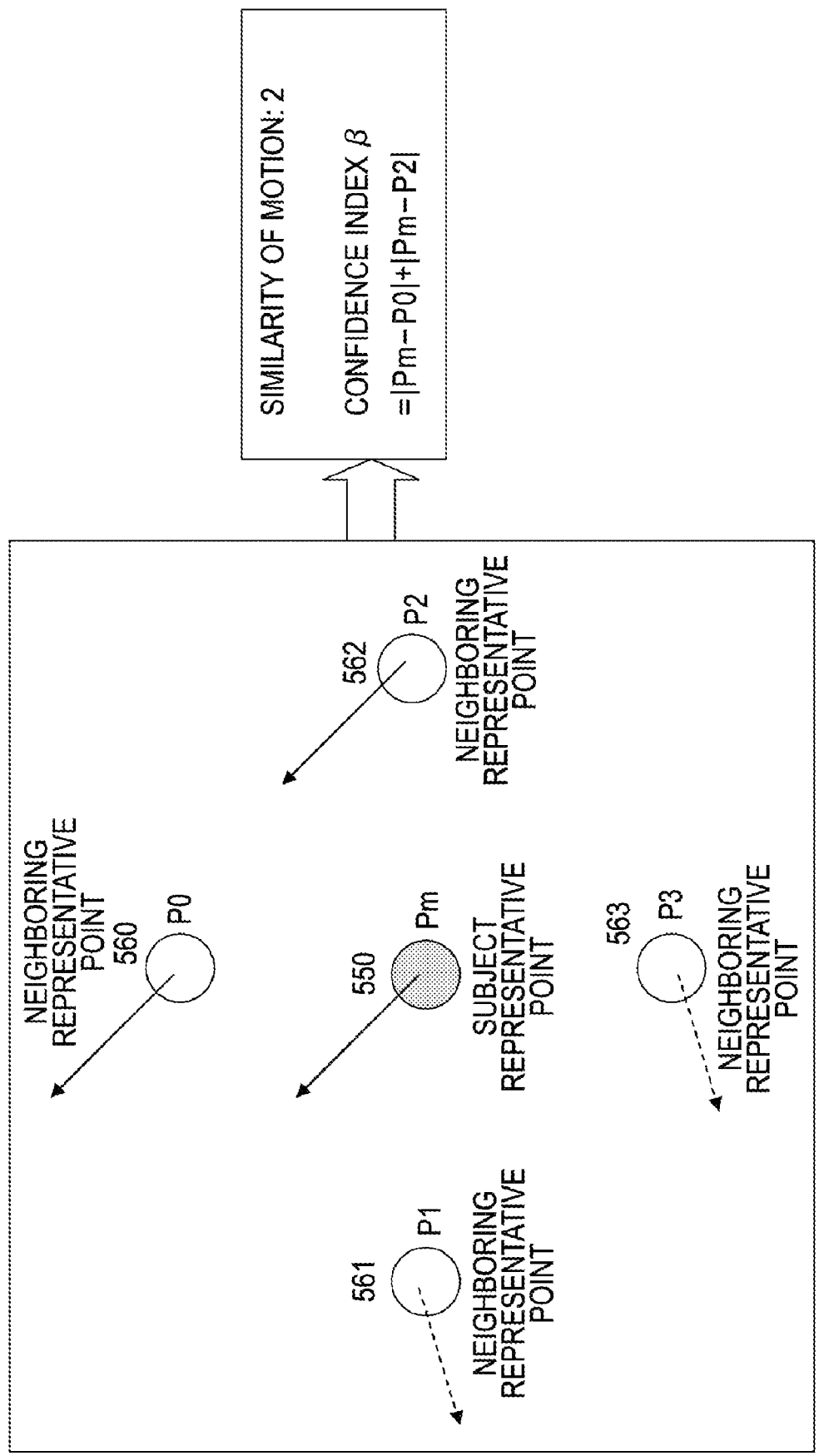
FIG. 20 is a diagram for explaining a specific example of a confidence index $\beta$ calculated by the weight calculator in the evaluation-value-table generator in the motion-vector detecting device according to the present invention.

FIG. 20 shows a specific example of the confidence index β calculated according to the above expression. FIG. 20 shows an example where four representative points around a subject representative point 550 are selected as neighboring representative points and similarity of motion of the individual neighboring representative points is detected by the similarity-of-motion detector 420.

Let it be supposed that the neighboring representative points 560 and 562 having similarity of motion with the subject representative point are detected as results of detection by the similarity-of-motion detector 420 and that the neighboring representative points 561 and 563 are determined as not having similarity of motion with the subject representative point 550.

The pixel values of the representative points are as follows:
Representative point 550→[Pm]
Representative point 560→[P0]
Representative point 561→[P1]
Representative point 562→[P2]
Representative point 562→[P3]

In this case, the confidence index β calculated according to the above expression is:

Confidence index β=|Pm−P0|+|Pm−P2|

When the positions of representative points are not fixed and can be varied on the basis of a certain parameter calculated from image data, it is desired that the confidence index is chosen in consideration of the distance from the subject representative point when a motion vector of a neighboring representative point matches. That is, it is determined that the confidence of similar motion vectors is higher as the distance between the representative points becomes shorter, and the confidence index is chosen to be higher as the distance between the representative points becomes shorter.

The confidence index β of a motion vector in a case where motion vectors of a subject representative point and a neighboring representative point are similar is calculated so that the value reflects at least one of the following parameters:

1. Number of instances of matching or similarity of motion of neighboring representative points
2. Spatial gradient with a representative point having matching or similar motion
3. Distance with a representative point having matching or similar motion The weight calculator 441 receives from the similarity-of-motion detector 420 input of the results of similarity checking of N neighboring representative points associated with a specific representative point, and furthermore, as shown in FIG. 16, obtains a spatial gradient (pixel-value difference information) between the representative points on the basis of an output from the pixel-correlation calculator 410, calculates the confidence index β according to the above equation, and outputs the confidence index β to the calculator 442.

However, when similarity of motion is applied to representative points in a still region, the confidence of the results of checking of candidate motion vector other than a (0, 0) vector detected from the still region is low, so that it is meaningless to add the results of checking to the evaluation-value table. Thus, considering that the confidence of candidate motion vectors detected from representative points in a region determined as a still region is low, the confidence index β is chosen to be 0 or a small value. Whether the pixel position of a representative point is in a still region is determined by the representative-point stillness checker 450.

(c) Representative-Point Stillness Checker

Next, processing executed by the representative-point stillness checker 450 will be described. The representative-point stillness checker 450 includes a reference-value memory 451, a comparator 452, and a flag memory 453.

The comparator 452 receives input of results of representative-point matching executed in the pixel-correlation calculator 410, and compares the results with a preset reference value stored in the reference-value memory 451 to determine whether the representative point is in a still region.

Figure 21:
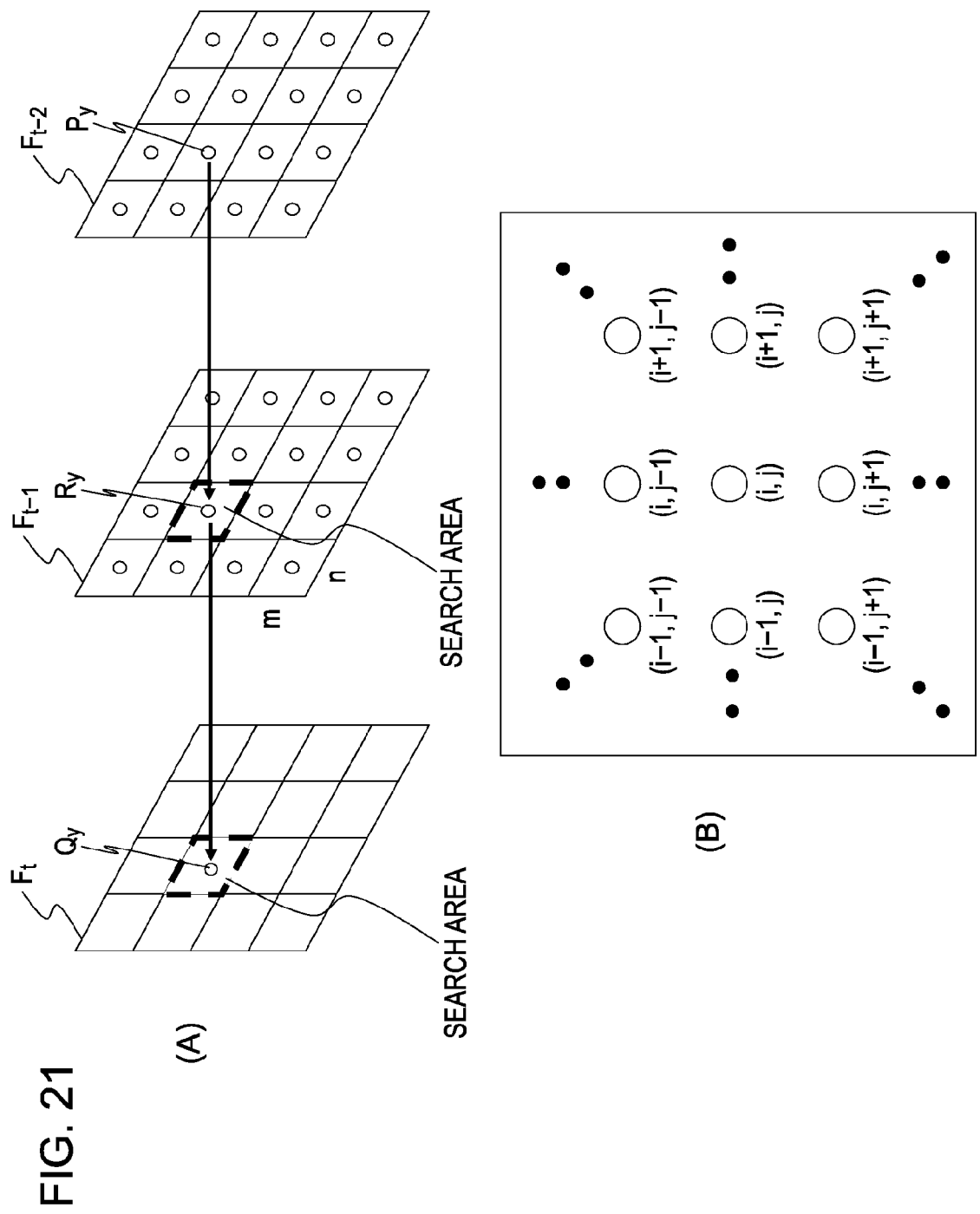
FIG. 21 is a diagram for explaining processing executed by a representative-point stillness checker in the evaluation-value-table generator in the motion-vector detecting device according to the present invention.

A specific example of stillness checking executed by the comparator 452 will be described with reference to FIG. 21. Stillness checking of a representative point Ry in a previous frame [F$_{t-1}$] will be described with reference to FIG. 21(A). The stillness checking of the representative point Ry in the previous frame [F$_{t-1}$] is carried out on the basis of a frame difference between the representative point Ry in the previous frame [F$_{t-1}$] and a point Py in a further previous frame [F$_{t-2}$] instead of a frame difference between the representative point Ry in the previous frame [F$_{t-1}$] and a point Qy in a current frame [F$_{t-1}$]. This is because although the stillness of the representative point Ry can be checked only at the time when data of Qy in the current frame is supplied when the frame difference between Ry and Qy is used, the result of stillness checking of the representative point existing in the previous frame [F$_{t-1}$] is obtained at the time when all the data of the previous frame [F$_{t-1}$] has been supplied when the frame difference between Ry and Py is used.

Furthermore, since the absolute value of the frame difference between the representative point Ry in the previous frame [F$_{t-1}$] and the point Py in the further previous frame [F$_{t-2}$] has been calculated by the pixel-correlation calculator 410 for the representative point Py in the frame [F$_{t-2}$], it is possible to use this value.

The comparator 452 receives input of the absolute value of the frame difference between the representative point Ry in the previous frame [F$_{t-1}$] and the point Py in the further previous frame [F$_{t-2}$], calculated by the pixel-correlation calculator 410. When the absolute value of the frame difference is less than the preset reference value stored in the reference-value memory 451, the comparator 452 assumes that the representative point Ry in the previous frame [F$_{t-1}$] is in a still region, and sets a stillness flag (0) in the flag memory 453.

On the other hand, when the absolute value of the frame difference between the representative point Ry in the previous frame [F$_{t-1}$] and the point Py in the further previous frame [F$_{t-2}$], calculated by the pixel-correlation calculator 410, is greater than or equal to the preset reference value stored in the reference-value memory 451, the comparator 452 assumes that the representative point Ry in the previous frame [F$_{t-1}$] is not in a still region, and sets a motion flag (1) in the flag memory 453. These flags are stored in the flag memory 453 under timing control by a controller (the controller 104 shown in FIG. 6).

Furthermore, at an appropriate timing under the control by the controller, a representative-point stillness checking flag is output from the flag memory 453 to the weight calculator 441. The weight calculator 441 checks whether the representative point is in a still region on the basis of the value of an input flag. When the representative point is in a still region, the weight calculator 441 determines that the confidence of a motion vector based on correlation, detected in association with the representative point, is low, and sets the confidence index β to be 0 or a small value. Alternatively, β may be set to be 0 when the calculation by the calculator 442 is addition while β may be set to be 1 when the calculation by the calculator 442 is multiplication.

When the representative point is not in a still region, a confidence index β calculated according to the equation given earlier is output to the calculator 442. The calculator 442 performs addition or multiplication of the confidence index β or otherwise calculates an output evaluation value in consideration of the confidence index β, and outputs the result to the evaluation-value accumulator 471.

The evaluation-value-table calculator 270 accumulates evaluation values reflecting input confidence indices β in the evaluation-value accumulator 271 to generate an evaluation-value table, and stores the evaluation-value table in the evaluation-value-table memory 272.

The evaluation-value accumulator 271 accumulates evaluation values reflecting confidence indices β input from the calculator 260. As a result, an evaluation-value table based on the confidence indices β is generated.

Figure 22:
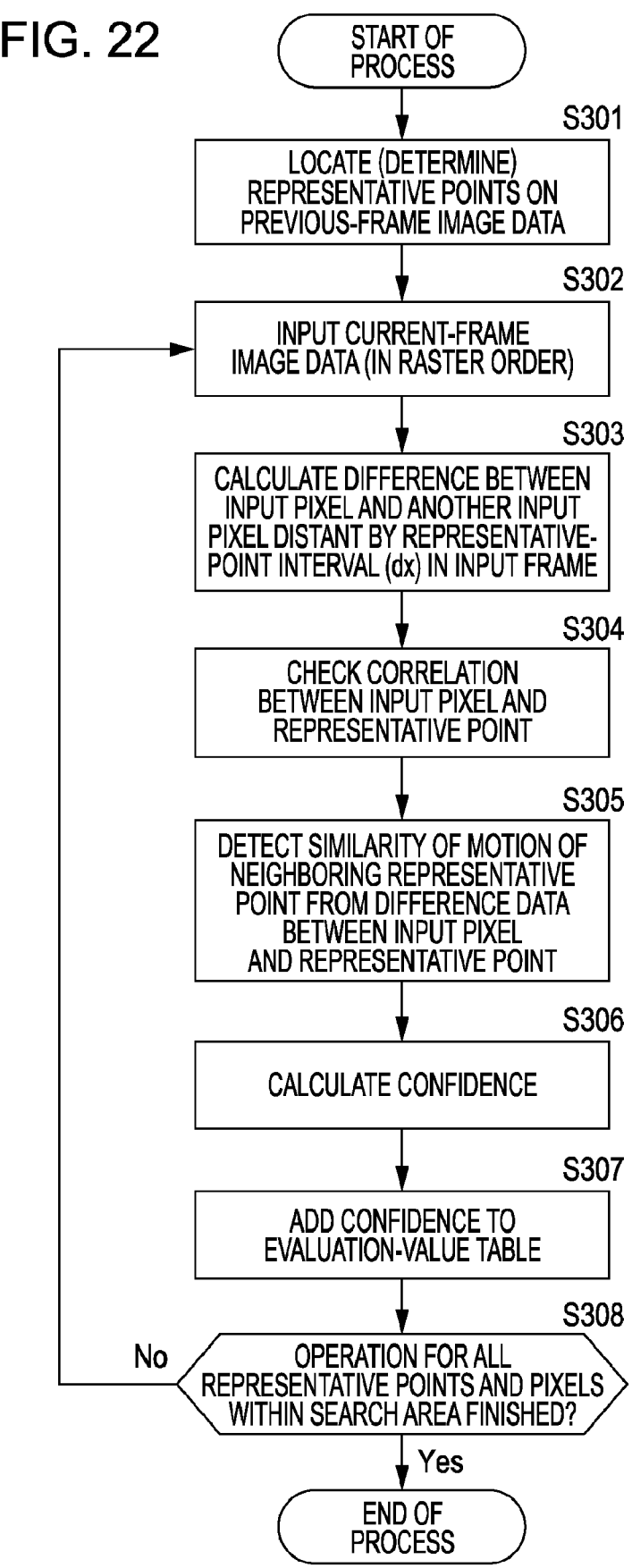
FIG. 22 is a diagram showing a flowchart for explaining a sequence of an evaluation-value-table generating process executed by the motion-vector detecting device according to the present invention.

The sequence of an evaluation-value-table generating process executed by the motion-vector detecting device according to the present invention described above will be described with reference to a flow shown in FIG. 22.

In step S301, representative points are set (determined) in previous-frame image data. As described earlier, the representative point of each block is associated with a pixel value representing the block, for example:
 a. Pixel value at the center of the block
 b. Average of the pixel values of all the pixels in the block
 c. Median of the pixel values of all the pixels in the block In step S302, current-frame data is input. The current-frame data is input, for example, in raster order. Step S303 is executed by the pixel-difference calculator 421, and the difference between an input pixel and another input pixel distant by the representative-point interval (dx) in the input frame is calculated. This processing corresponds to the processing in step S1 described with reference to FIG. 17, i.e., calculation of D=X5−X1.

In step S304, correlation between representative-point data and input-pixel data is checked. This processing is executed by the pixel-correlation calculator 410 and the comparator 430. Representative-point data of the previous frame, read from the representative-point memory 411, and image data of the current frame are supplied to the difference calculator 412, where the difference between the pixel value of each of the representative points in the previous frame and the pixel value in a search area associated with each of the representative points set in the image data of the current frame, e.g., a frame difference (result of calculation of correlation), is calculated. The frame difference is output to the absolute-value calculator 413, where the absolute value of the frame difference is calculated. The absolute value of the frame difference is input to the comparator 430, where the absolute value of the frame difference is compared with the predetermined threshold (TH). When the absolute value of the frame difference is less than the threshold (TH), it is determined that correlation exists, so that bit data indicating the presence of correlation (e.g., [1]) is output from the comparator 430. When the absolute value of the difference is greater than or equal to the threshold (TH), it is determined that correlation does not exist, so that bit data indicating the absence of correlation (e.g., [0]), is output from the comparator 430.

In step S305, similarity of motion of a neighboring representative point is detected from the difference data between the input pixel and the representative point. This processing is executed by the similarity-of-motion detector 420, and whether motion is similar between a subject representative point and a neighboring representative point, detected on the basis of correspondence with a pixel having a high correlation in the input frame corresponding to a subject representative point and a neighboring representative point in the previous frame, is determined. When it is determined that similarity of motion exists, the similarity-of-motion detector 420 outputs a result of checking indicating the presence of similarity to the weight calculator 441. The checking of the presence or absence of similarity is executed for a plurality of neighboring representative points of the subject representative points, and data of the results is output to the weight calculator 441.

In step S306, a confidence index β is calculated. The calculation of the confidence index β is executed by the weight calculator 441.

As described earlier, the confidence index β of a motion vector in a case where motion vectors of a subject representative point and an adjacent representative point are similar is defined as a value reflecting at least the following parameters:

1. Number of instances of matching or similarity of motion of neighboring representative points
2. Spatial gradient with a representative point having matching or similar motion
3. Distance with a representative point having matching or similar motion In step S307, the confidence index β is output as an accumulated point of the evaluation-value table. In step S308, it is checked whether correlation checking between all the representative points and pixels in search areas has been finished. When the correlation checking has not been finished, the processing in step S302 and subsequent steps is executed for an unprocessed pixel. When processing for all the pixels has been finished, the process is exited.

Alternatively, a confidence index K may be calculated by combining the confidence index α described earlier and the confidence index β according to the following equation:

$$K = \alpha + \beta$$

so that an evaluation value reflecting the confidence index K is added to the evaluation-value table. In this case, the evaluation-value-table generator is configured as a combination of the configuration shown in FIG. 8 and the configuration shown in FIG. 16.

In the art that has hitherto been used, it has been the case that the evaluation-value-table generator is configured to form an evaluation-value table by adding 1 bit (the presence or absence of correlation) obtained as a result of correlation checking based only on representative-point matching. In contrast, by using the confidence index α, the confidence index β, or the confidence index K=α+β as described above, it is possible to form an evaluation-value table that is based on more accurate evaluation values.

For example, when the confidence index K=α+β is used, assuming that the upper limit of the confidence α of matching calculated for each representative point is 7 bits, the number of representative points for which similar motion is referred to is two, i.e., the left and right representative points, and the upper limit of spatial gradient between representative points is 6 bits, the confidence β in a case where the same candidate motion vector is detected for the left and right neighboring representative points is 7 bits at maximum, so that the weight of the confidence index K of the motion vector detected can be calculated by a resolution of 8 bits. Thus, an evaluation-value table having a high confidence can be formed.

[5. Specific Example of Evaluation-Value Table]

An example of a frequency-distribution evaluation-value table that is generated when actual moving-picture data is processed using the motion-vector detecting device having the evaluation-value-table generator configured as described above will be described.

Figure 23:
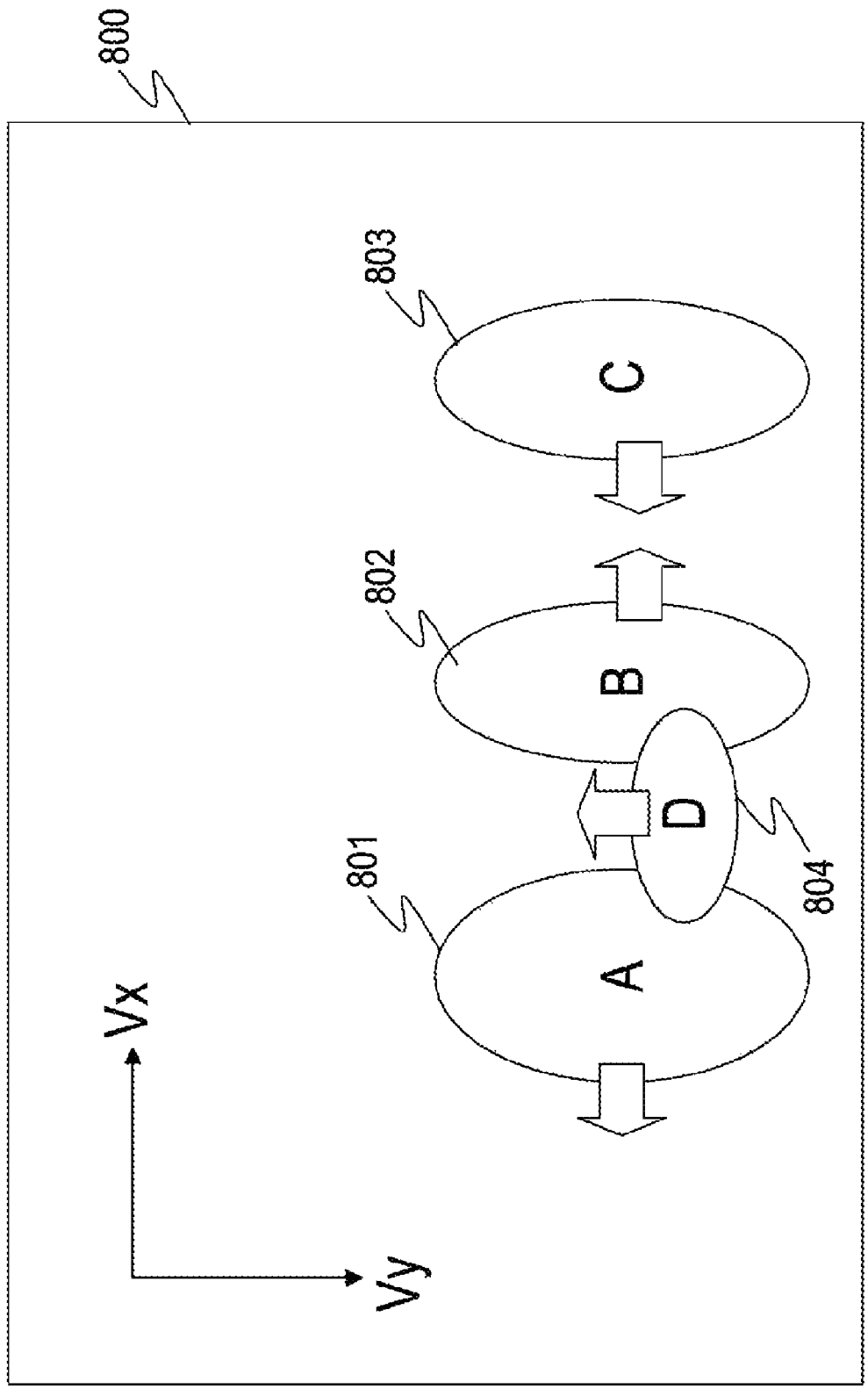
FIG. 23 is a diagram showing an example of moving-picture data for which the evaluation-value-table generating process is to be executed.

As a specific example, moving-picture data 800 in which a moving object (A) 801, a moving object (B) 802, a moving object (C) 803, and a moving object (D) 804 exist on a still background is used, as shown in FIG. 23.

The moving object (A) 801 and the moving object (C) 803 move horizontally leftward (−X direction), so that correct motion vectors associated with the pixels in the display areas of these objects are (Vx, Vy)=(−n, 0). That is, horizontally leftward motion vectors are to be set in these pixel areas. The moving object (B) 802 moves horizontally rightward (+X direction), so that correct motion vector associated with the pixels in the display area of this object is (Vx, Vy)=(n, 0). That is, a horizontally leftward vector is to be set in this pixel area.

The moving object (D) 804 moves vertically upward (+Y direction), so that a correct motion vector associated with the pixels in the display area of this object is (Vx, Vy)=(0, n). That is, a vertically upward vector is to be set in this pixel area.

Figure 24:
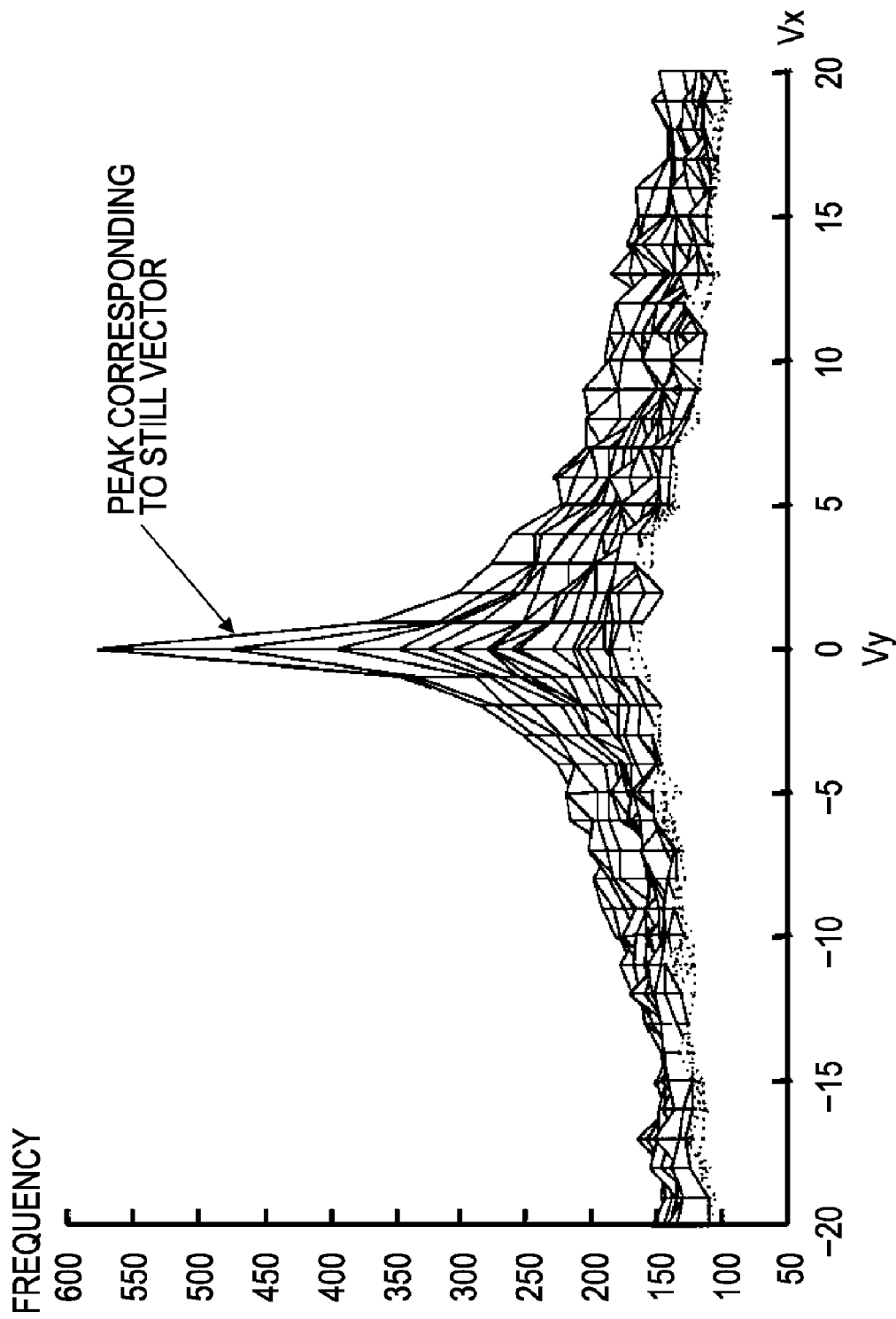
FIG. 24 is a diagram showing an example of an evaluation-value table generated by directly accumulating data output from a pixel-correlation calculator.

FIG. 24 shows an evaluation-value table generated by accumulating only correlation data of representative points using an art that has hitherto been used, for example, an evaluation-value-table generating process disclosed in Japanese Unexamined Patent Application Publication No. 2001-61152. In the evaluation-value table shown in FIG. 24, only peaks associated with motion vectors in vertical directions (−Y or +Y direction) are shown two-dimensionally.

That is, FIG. 24 shows two-dimensional data of an evaluation-value table generated by directly accumulating data output from the pixel-correlation calculator, in which only peaks with (Vy=0), i.e., peaks associated with still vectors of still pixels in the background region, appear.

Figure 25:
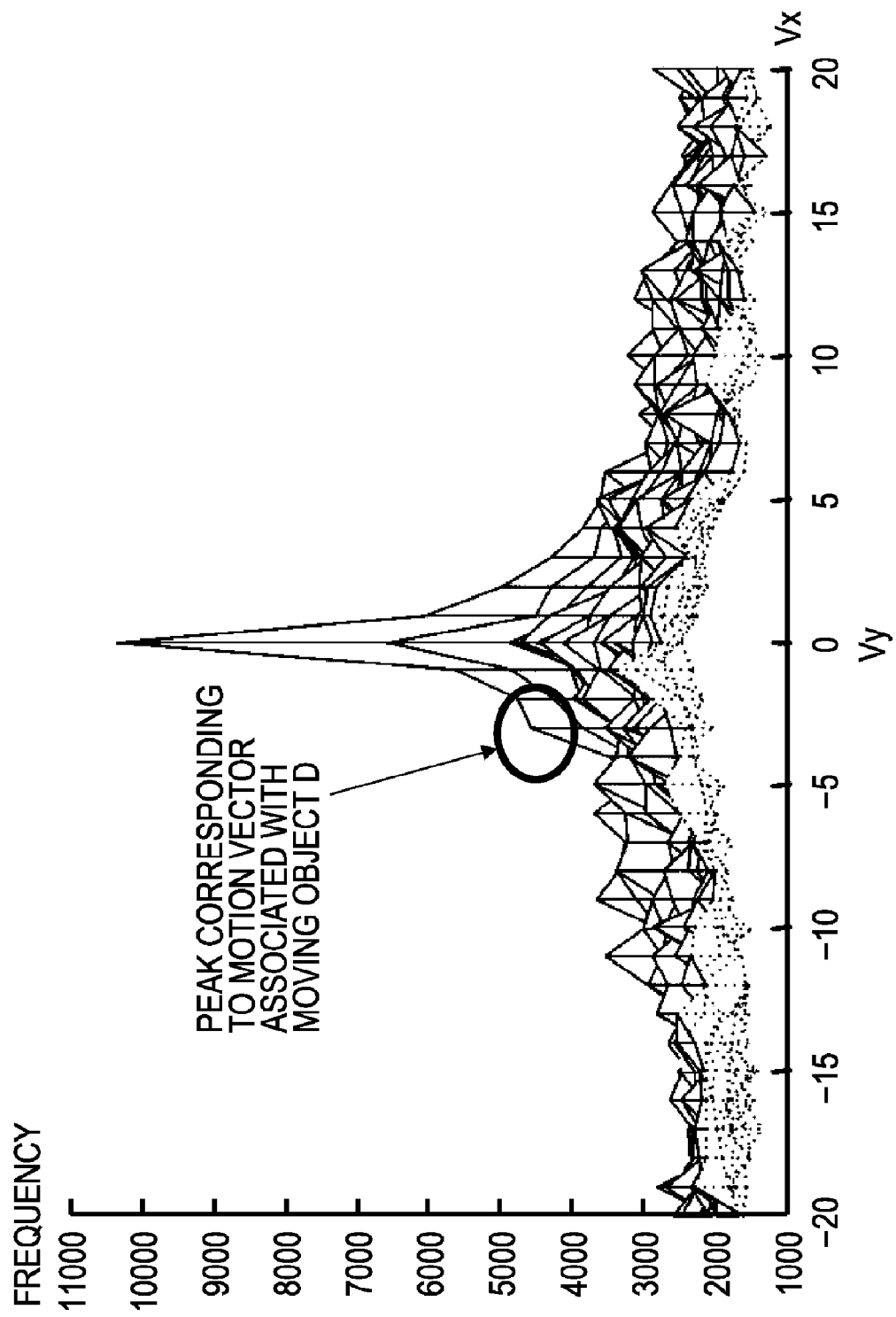
FIG. 25 is a diagram showing an example of an evaluation-value table generated through processing executed by the evaluation-value-table generator according to the present invention.

FIG. 25 shows two-dimensional data of an evaluation-value table generated on the basis of the confidence index α described earlier, i.e., the confidence index α that is based on the activity A and the weight coefficient W. In this table, as well as peaks associated with still pixels, peaks associated with the moving object D moving in the vertical direction (Y direction) appear.

As described above, in the evaluation-value table generated on the basis of the confidence index α that is based on the activity A and the weight coefficient W, peaks associated with movement of an object that occupies only a small area in a display area of image data can appear in the evaluation-value table. This serves to correctly extract candidate vectors and determine motion vectors.

Figure 26:
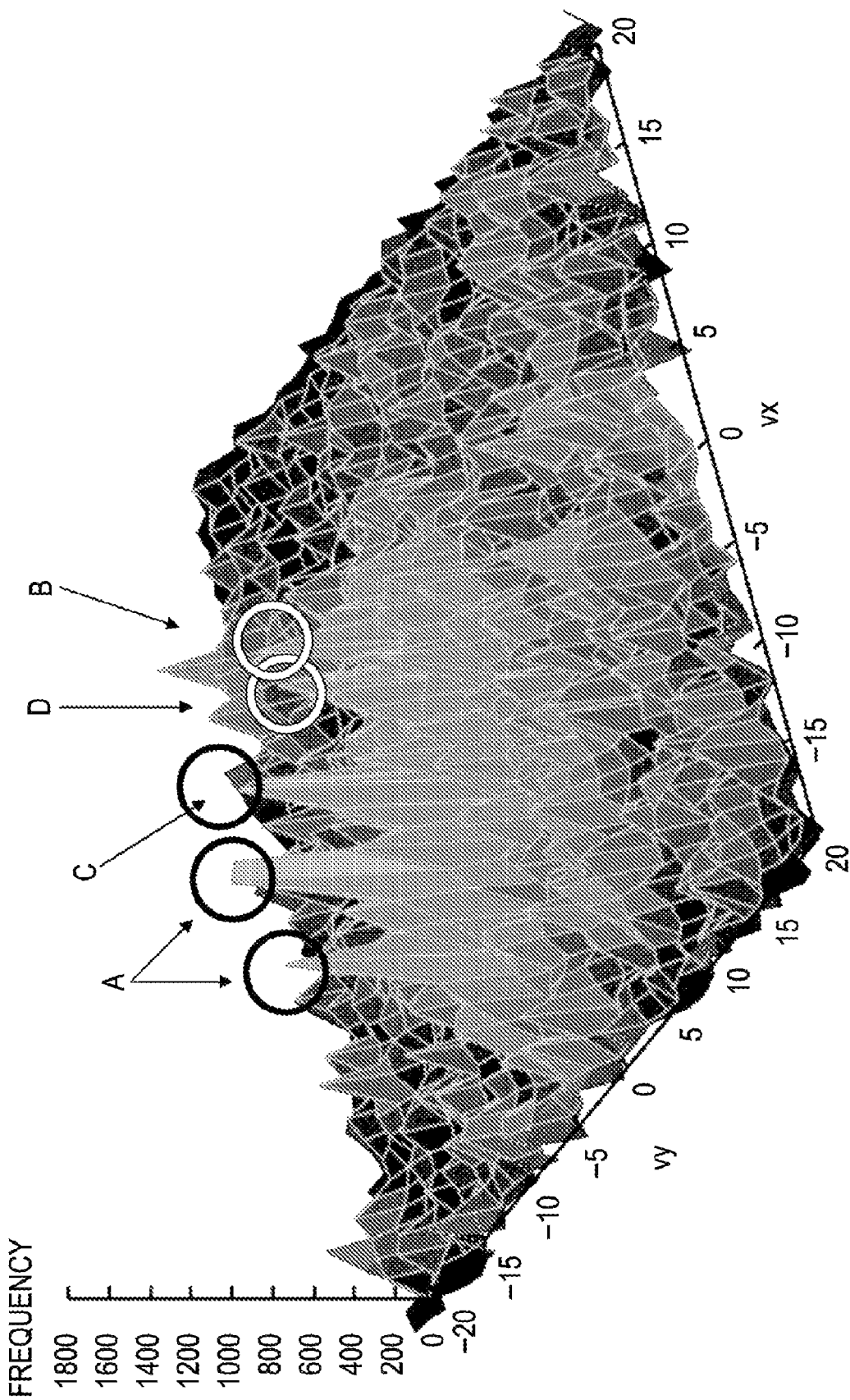
FIG. 26 is a diagram showing an example of an evaluation-value table generated through processing executed by the evaluation-value-table generator according to the present invention.

FIG. 26 shows three-dimensional data of an evaluation-value table generated on the basis of the confidence index β, i.e., the confidence index β that is calculated in consideration of detection of similarity of motion between a subject representative point and a neighboring representative point and a spatial gradient (pixel-value difference) between representative points. In this evaluation-value table, as well as peaks corresponding to still pixels, peaks respectively corresponding to the moving objects A, B, C, and D appear.

As described above, in the evaluation-value table generated on the basis of the confidence index β that is calculated in consideration of detection of similarity of motion between a subject representative point and a neighboring representative point and a spatial gradient (pixel-value difference) between representative points, peaks corresponding to movement of an object having a small activity A of the representative point in the display area of image data but occupying a large area can appear in the evaluation-value table. This serves to correctly extract candidate vectors and determine motion vectors.

[6. Details of Determination of Motion Vector on the Basis of Feature Pixels]

As described earlier with reference to FIG. 6, the motion-vector detecting device that employs representative-point matching includes the evaluation-value-table generator 101, the candidate-vector extractor 102, and the motion-vector determiner 103. The evaluation-value-table generator 101 generates an evaluation-value table on the basis of input image data, the candidate-vector extractor 102 extracts a plurality of candidate vectors from the evaluation-value table, and the motion-vector determiner 103 determines a motion vector for each pixel from the plurality of candidate vectors.

As described earlier, however, in order to improve the accuracy of determination of motion vectors by the motion-vector determiner 103, the block size used in block matching must be large. When the block size is large, it is needed to store a large number of pixel values included in a block in a memory. Furthermore, in the calculation of the sum of the absolute values of differences described earlier, it is needed to perform calculation based on a large number of pixel values included in a block. This causes the problems of an increase in hardware scale and a reduced efficiency of processing.

Thus, in an embodiment described below, instead of using block matching in the motion-vector determining process executed by the motion-vector determiner 103, the motion-vector determining process is executed on the basis of feature-pixel position information. This motion-vector determining process will be described below in detail.

Figure 27:
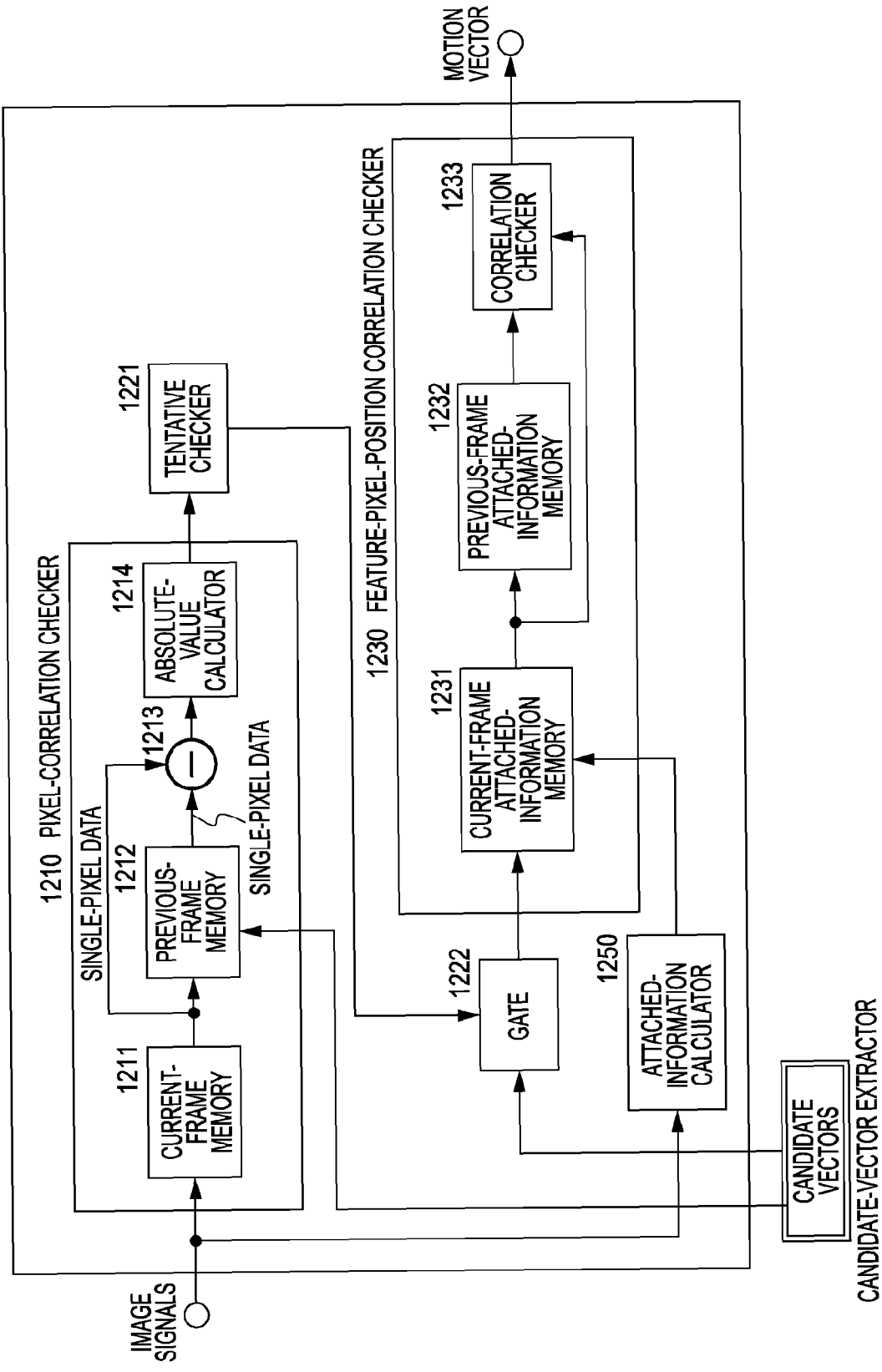
FIG. 27 is a diagram showing a detailed configuration of a motion-vector determiner in the motion-vector detecting device according to the present invention.

Now, two schemes of the motion-vector determining process based on feature-pixel position information will be described, namely:

(1) Motion-vector determining process based on two-point matching (2) Motion-vector determining process based on three-point matching (1) Motion-Vector Determining Process Based on Two-Point Matching First, the motion-vector determining process based on two-point matching will be described. FIG. 27 shows a detailed configuration of a motion-vector determiner in a motion-vector detecting device according to this embodiment. A motion-vector determiner 1200 shown in FIG. 27 corresponds to the motion-vector determiner 103 in the motion-vector detecting device shown in FIG. 6.

The motion-vector determiner 1200 shown in FIG. 27 receives input of information of a plurality of candidate vectors from the candidate-vector extractor 102 shown in FIG. 6, determined on the basis of the evaluation-value table described earlier, and determines a motion vector that is to be associated with each pixel.

As shown in FIG. 27, the motion-vector determiner 1200 in this embodiment includes a pixel-correlation checker 1210, a tentative checker 1221, a gate 1222, an attached-information calculator 1250, and a feature-pixel-position correlation checker 1230. The pixel-correlation checker 1210 includes a current-frame memory 1211, a previous-frame memory 1212, a pixel-value-difference calculator 1213, and an absolute-value calculator 1214. The feature-pixel-position correlation checker 1230 includes a current-frame attached-information memory 1231, a previous-frame attached-information memory 1232, and a correlation checker 1233. The attached-information calculator 1250 will be described in detail with reference to FIG. 29 and subsequent figures.

The pixel-correlation checker 1210 receives input of image signals. The input image is image data that is obtained, for example, by raster scanning. For example, the image data includes luminance signals in component signals of digital color video signals.

The image data is input on a frame-data basis. The image data is first stored in the current-frame memory 1211 and then stored in the previous-frame memory 1212. Thus, the pixel-correlation checker 1210 stores frame data of two successive frames in the memories.

Furthermore, the pixel-correlation checker 1210 receives input of candidate-vector information from the candidate-vector extractor 102 shown in FIG. 6, pixel position in the current frame specified by a plurality of candidate vectors on the basis of the candidate-vector information for each pixel of the previous frame, i.e., for each pixel with which a motion vector is to be determined (subject pixel), calculates the difference between the previous frame and each of the pixels in the current frame specified by the plurality of candidate vectors in the pixel-value-difference calculator 1213, calculates the absolute value of the difference in the absolute-value calculator 1214, and outputs the absolute value to the tentative checker 1221.

Figure 28:
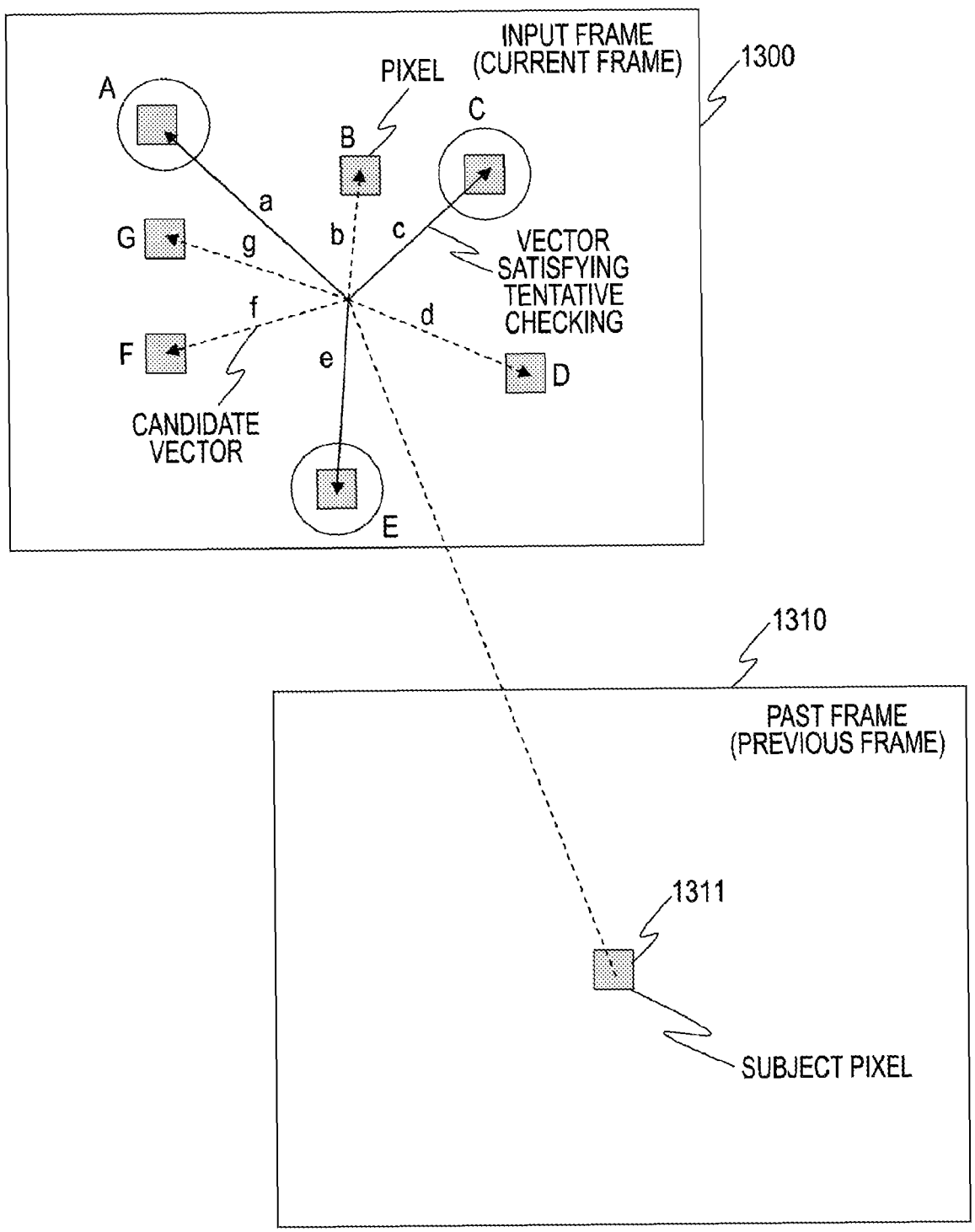
FIG. 28 is a diagram for explaining processing executed by a tentative checker in the motion-vector determiner.

The series of processing will be described with reference to FIG. 28. FIG. 28 shows input-frame (current-frame) image data 1300 and past-frame (previous-frame) image data 1310. These pieces of frame data are data stored in the current-frame memory 1211 and the previous-frame memory 1212.

The pixel-correlation checker 1210 receives input of candidate-vector information from the candidate-vector extractor 102 shown in FIG. 6, the candidate-vector information representing candidate vectors a to g shown in FIG. 28. These candidate vectors have been obtained by detection of peaks in the evaluation-value table described earlier.

The pixel-correlation checker 1210 determines pixel positions in the current frame specified by a plurality of candidate vectors on the basis of the candidate-vector information for each pixel in the previous frame, i.e., for each pixel with which a motion vector is to be determined (subject pixel). For example, for a subject pixel 1311 in past-frame (previous-frame) image data 1310 shown in FIG. 28, pixel positions A to G in the current frame specified by a plurality of candidate vectors are identified.

The pixel-value-difference calculator 1213 calculate the difference between the subject pixel 1311 of the past-frame (previous-frame) image data 1310 and the pixel value of each of the pixel positions A to G in the current frame specified by the candidate vectors. The absolute-value calculator 1214 calculates the absolute value of each of the differences, i.e., the absolute value of the pixel difference (MC residual), and outputs the absolute value to the tentative checker 1221.

The tentative checker 1221 receives input of the absolute values of the differences (MC residual) between the subject pixel and the individual pixels determined by the plurality of candidate vectors. For example, when the number of the candidate vectors is n, n absolute values of differences (MC residuals) [di] are input, where i=1 to n.

The selects a motion vector associated with the subject pixel 1311 from the n absolute values of differences (MC residuals) [di]. More specifically, the tentative checker 1221 selects a smallest MC residual from the n ((absolute values of differences (MC residuals) [di].

Letting the minimum value of the n MC residuals be denoted by dmin and the predetermined threshold by TH, a candidate vector specifying either a pixel satisfying di−dmin≦TH or a pixel satisfying dmin.

In the example shown in FIG. 28, for example, when A, C, and E are selected as pixels satisfying the above criterion among the pixels A to E, candidate-vector information of these selected pixels are output from the tentative checker 1221 to the gate 1222, so that only the selected candidate-vector information among the candidate-vector information input from the candidate-vector extractor 102 shown in FIG. 6 is input to the feature-pixel-position correlation checker 1230.

The feature-pixel-position correlation checker 1230 determines one motion vector associated with the pixel from the candidate vectors selected by the tentative checker 1221. The feature-pixel-position correlation checker 1230 checks correlation of pixel values on the basis of the feature-pixel-position information of an adjacent pixel of the subject pixel, input from the attached-information calculator 1250, and determines a motion vector from the candidate vectors selected by the tentative checker 1221.

A detailed configuration of the attached-information calculator 1250 will be described with reference to FIG. 29. As a feature pixel, the attached-information calculator 1250 extracts, for example, a pixel having a greatest absolute value of difference in pixel value with an adjacent pixel among pixels neighboring the subject pixel.

Figure 29:
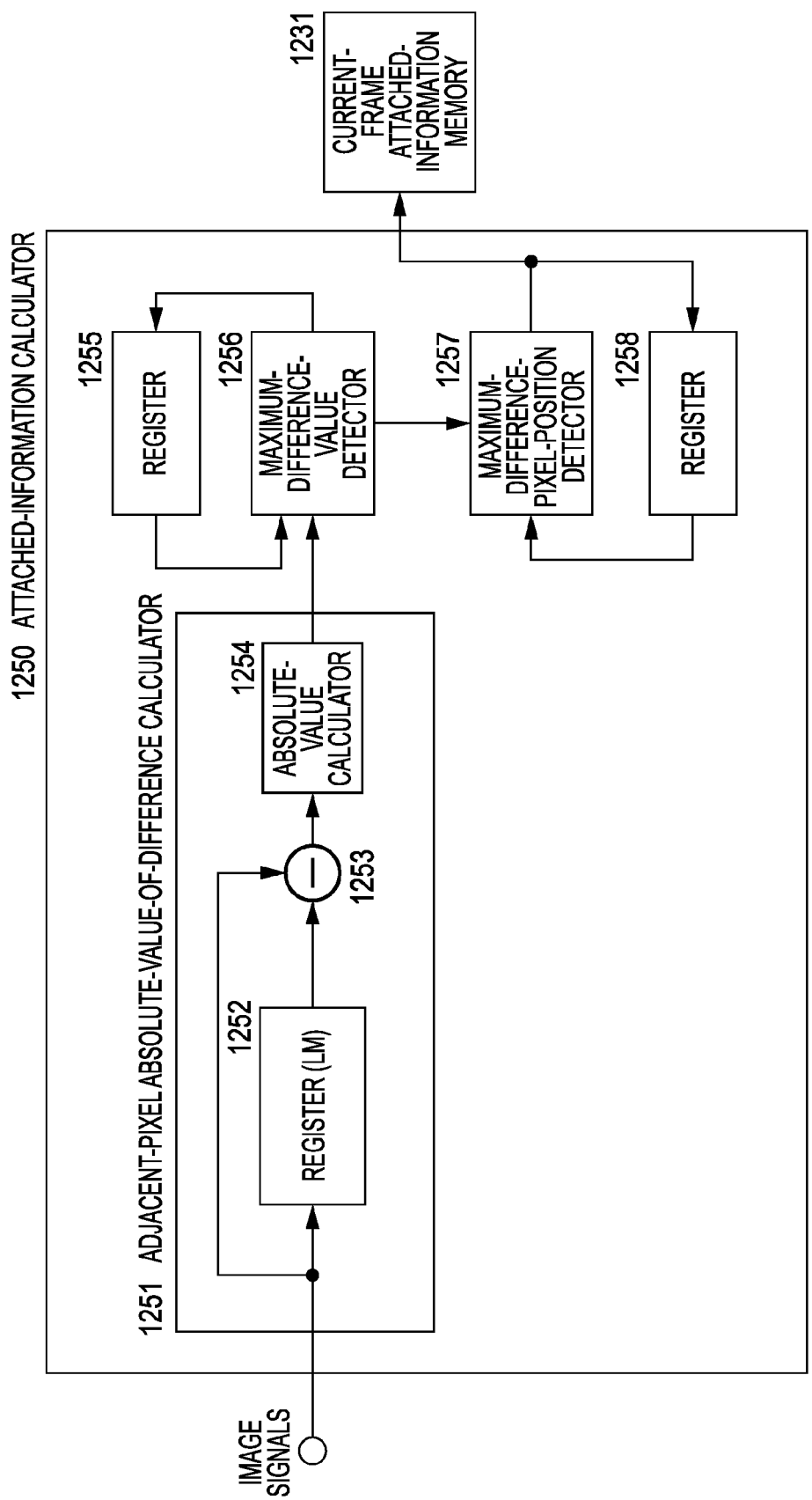
FIG. 29 is a diagram showing a detailed configuration of an attached-information calculator in the motion-vector determiner according to the present invention.

The attached-information calculator 1250 shown in FIG. 29 includes an adjacent-pixel absolute-value-of-difference calculator 1251 including a register 1252, a pixel-value-difference calculator 1253, and an absolute-value calculator 1254, a register 1255, a maximum-difference detector 1256, a maximum-difference pixel-position detector 1257, and a register 1258.

The adjacent-pixel absolute-value-of-difference calculator 1251 receives image signals for which motion vectors are to be detected, and stores image frame data in the register 1252. The pixel-value-difference calculator 1253 sequentially calculates the differences between adjacent pixels of the image data stored in the register 1252, and the absolute-value calculator 1254 sequentially calculates the absolute values of the differences between the adjacent pixels and outputs the absolute values to the maximum-difference detector 1256.

Figure 30:
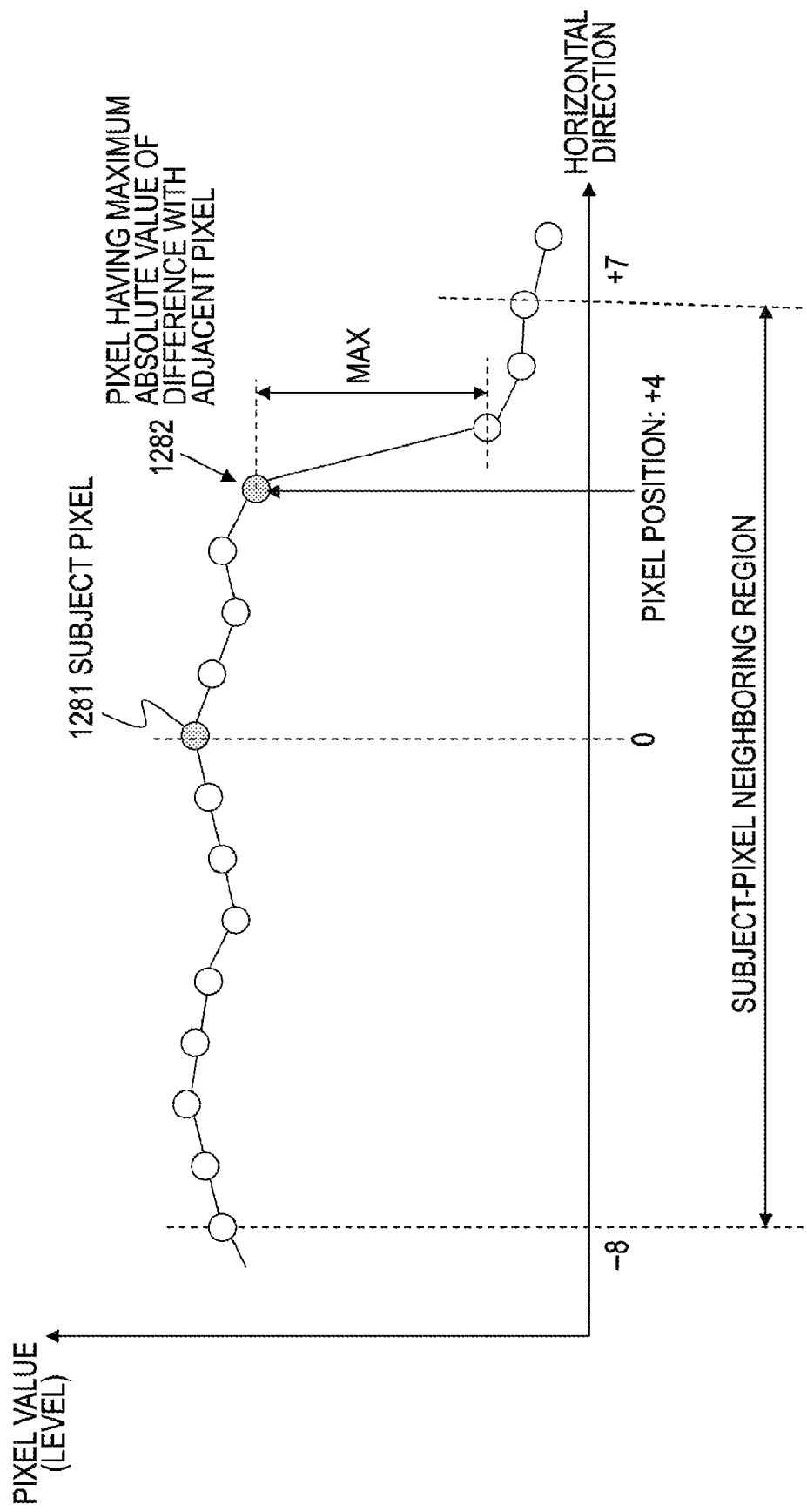
FIG. 30 is a diagram for explaining a feature pixel detected by the attached-information calculator.

With reference to FIG. 30, specific processing will be described. In the attached-information calculator 1250, the absolute values of the differences between adjacent pixels of the image data stored in the register 1252 are sequentially calculated to identify, for example, a pixel having a maximum absolute value of difference with an adjacent pixel among the pixels in a neighboring region of the subject pixel. The pixels in the neighboring region of the subject pixel refer to a predetermined pixel region, for example, a range of pixels horizontally preceding or succeeding the subject pixel by −8 to +7 pixels.

In the example shown in FIG. 30, in the neighboring region of a subject pixel 1281, a pixel 1282 having a maximum absolute value of difference with an adjacent pixel is identified.

Figure 31:
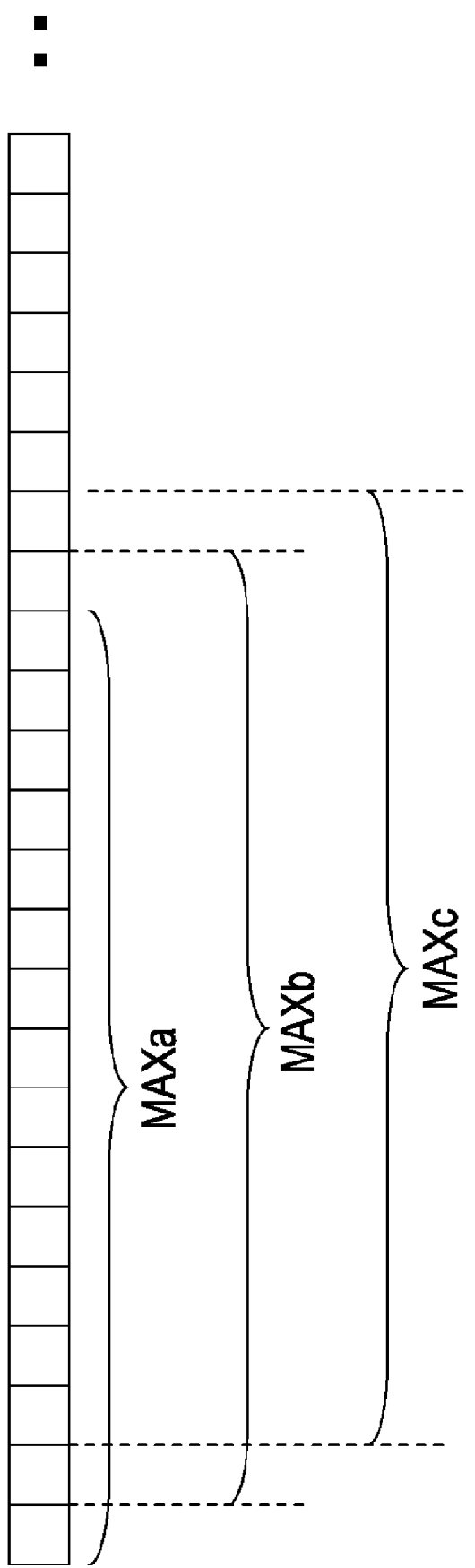
FIG. 31 is a diagram for explaining a feature-pixel detecting process executed by the attached-information calculator.

The maximum-difference detector 1256 shown in FIG. 29 performs comparison while storing the sequentially input absolute values of differences between adjacent pixels in the register 1255 to detect a pixel difference having a maximum absolute value of pixel-value difference for each set of 16 pixels of −8 to +7. That is, as shown in FIG. 31, for each of the 16 pixels, the maximum-difference detector 1256 sequentially detects pixel differences MAXa, MAXb, and MAXc having a maximum absolute value of pixel-value difference for individual sets of 16 pixels.

Information of the pixel having the maximum absolute value of pixel-value difference for each predetermined region (e.g., each set of 16 pixels), detected by the maximum-difference detector 1256, is input to the maximum-difference pixel-position detector 1257, where maximum-difference pixel-position information for each predetermined region (e.g., each set of 16 pixels) is detected, and the maximum-difference pixel-position information is stored in the register 1258.

In the example shown in FIG. 30, in the neighboring region of the subject pixel 1281, the pixel position of the pixel 1282 having the maximum absolute value of difference with an adjacent pixel is [+4] when the pixel position of the subject pixel is represented as 0.

The maximum-difference pixel-position information for each predetermined region (e.g., each set of 16 pixels), stored in the register 1258, is sequentially output to the current-frame attached-information storage memory 1231.

Referring back to FIG. 27, the description of processing executed by the motion-vector determiner 1200 will be continued. The feature-pixel-position information from the attached-information calculator 1250, described with reference to FIG. 29, is stored in the current-frame attached-information memory 1231 of the feature-pixel-position correlation checker 1230 shown in FIG. 27. In the current-frame attached-information memory 1231, maximum-difference pixel-position information for each predetermined region (e.g., each set of 16 pixels), extracted in association with a frame, is stored. The information in the current-frame attached-information memory 1231 is transferred to and stored in the previous-frame attached-information memory 1232 in the processing step for each frame.

Furthermore, the current-frame attached-information memory 1231 receives the output from the tentative checker 1221, i.e., selected candidate-vector information selected by the tentative checker 1221.

On the basis of feature pixels extracted in the neighboring region of the subject pixel, the correlation checker 1233 determines a single motion vector associated with the subject pixel from the selected candidate vectors selected by the tentative checker 1221.

Figure 32:
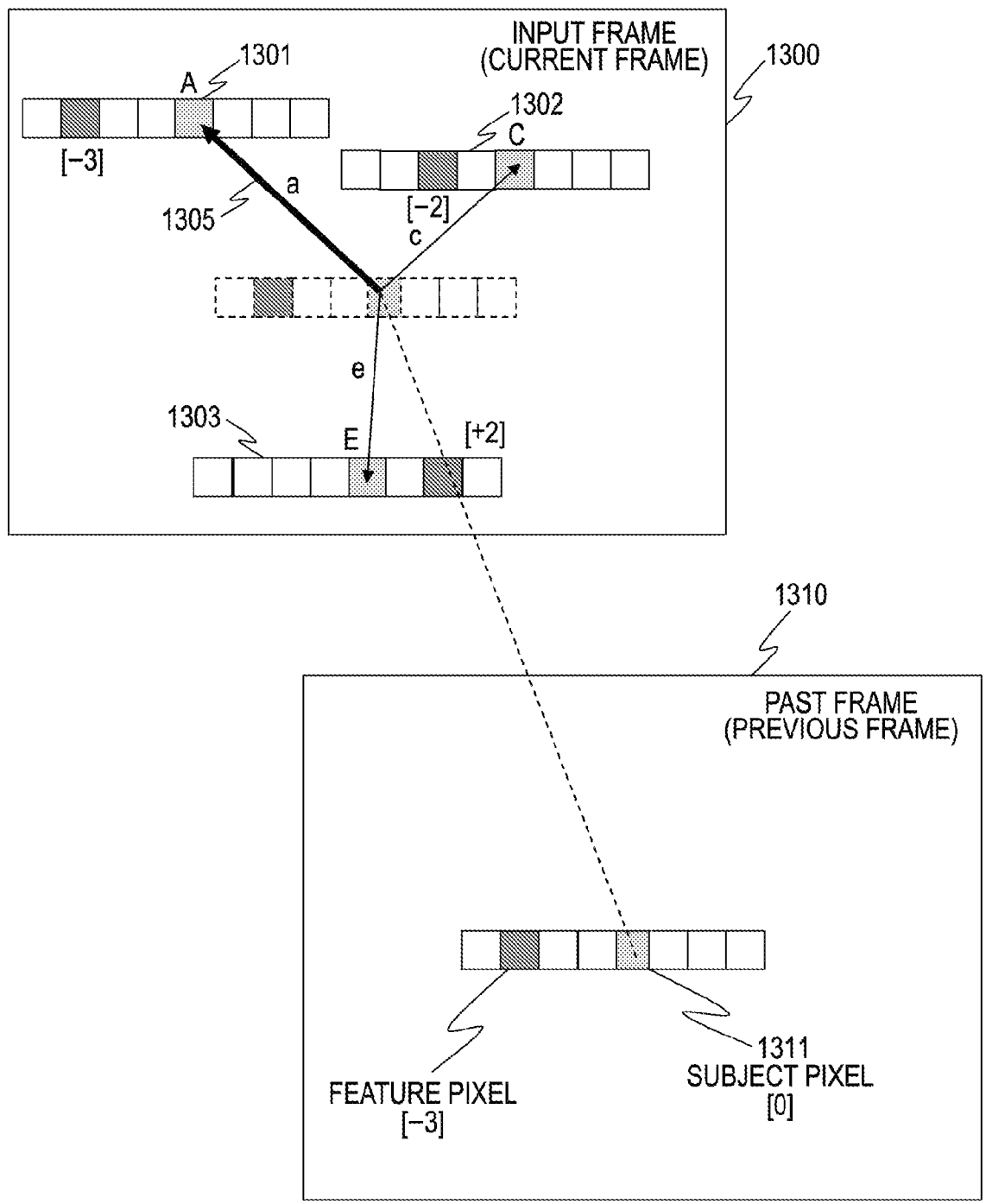
FIG. 32 is a diagram for explaining details of processing executed by the motion-vector determiner in the motion-vector detecting device according to the present invention.

The motion-vector determining process executed by the correlation checker 1233 will be described with reference to FIG. 32. FIG. 32 shows the input-frame (current-frame) image data 1301 and the past-frame (previous-frame) image data 1310, similarly to the case described earlier with reference to FIG. 28.

In the input-frame (current-frame) image data 1300, candidate vectors a, c, and e, selected by the candidate-vector selecting process by the tentative checker described earlier with reference to FIG. 28, are shown.

The correlation checker 1233 in the feature-pixel-position correlation checker 1230 determines a motion vector from the candidate vectors a, c, and e on the basis of feature-pixel-position data in the neighboring region of the subject pixel selected from the past-frame (previous-frame) image data 1310 the subject pixel 1311 with which a motion vector is to be associated.

In the example shown in FIG. 32, it is determined on the basis of information input from the attached-information calculator 1250 that the feature pixel position in the neighboring region of the subject pixel 1311 is [−3] when the pixel position of the subject pixel 1311 is represented as [0]. In FIG. 32, a pixel region of −4 to +3 with respect to the subject pixel is shown as a neighboring region.

The correlation checker 1233 checks correlation between the feature pixel position in the neighboring region of the subject pixel 1311 and the feature pixel positions in the neighboring regions of the corresponding pixel positions A, C, and E specified by the selected candidate vectors a, c, and e. In the example shown in the figure, in the neighboring region 1301 of the corresponding pixel position A specified by the selected candidate vector a, the feature pixel appears at the position of [−3] when the pixel position A is represented as [0]. This feature pixel is a feature pixel selected for each pixel region having a predetermined size, and having a maximum absolute value of difference with an adjacent pixel in the region defined as the neighboring region of the pixel position A.

In the neighboring region 1302 of the corresponding pixel position C specified by the selected candidate vector c, the feature pixel appears at the position of [−2] when the pixel position C is represented as [0]. In the neighboring region 1303 of the corresponding pixel position E specified by the selected candidate vector e, the feature pixel appears at the position of [+2] when the pixel position C is represented as [0].

The feature pixel in the neighboring region of the subject pixel 1311 appears at the position of [−3] when the subject pixel position is represented as [0]. This feature pixel position corresponds to the feature pixel position [−3] in the neighboring region 1301 of the pixel A specified by the candidate vector a, and does not correspond to the feature pixel positions [−2] and [+2] in the neighboring regions 1302 and 1303 of the pixels C and E specified by the other two candidate vectors c and e.

Thus, the candidate vector a is selected as a motion vector associated with the subject pixel 1311.

The correlation checker 1233 sequentially sets the pixels constituting a frame as a subject pixel, and checks correlation with feature pixel positions in neighboring regions similarly to the above for each subject pixel, thereby selecting and determining a motion vector associated with each of the pixels constituting the frame from the selected candidate vectors.

As described above, in the motion-vector determiner shown in FIG. 27, feature pixel positions are identified on the basis of the pixel values in the neighboring region of a subject pixel, correlation between a relative position of the feature pixel relative to the subject pixel position in the neighboring region of the subject pixel and the feature pixel position in the neighboring region of the pixel specified by each of the candidate vectors selected by the tentative checker 1221, and a candidate vector specifying a pixel at a feature pixel position having a highest correlation is determined as a motion vector associated with the subject pixel.

Figure 33:
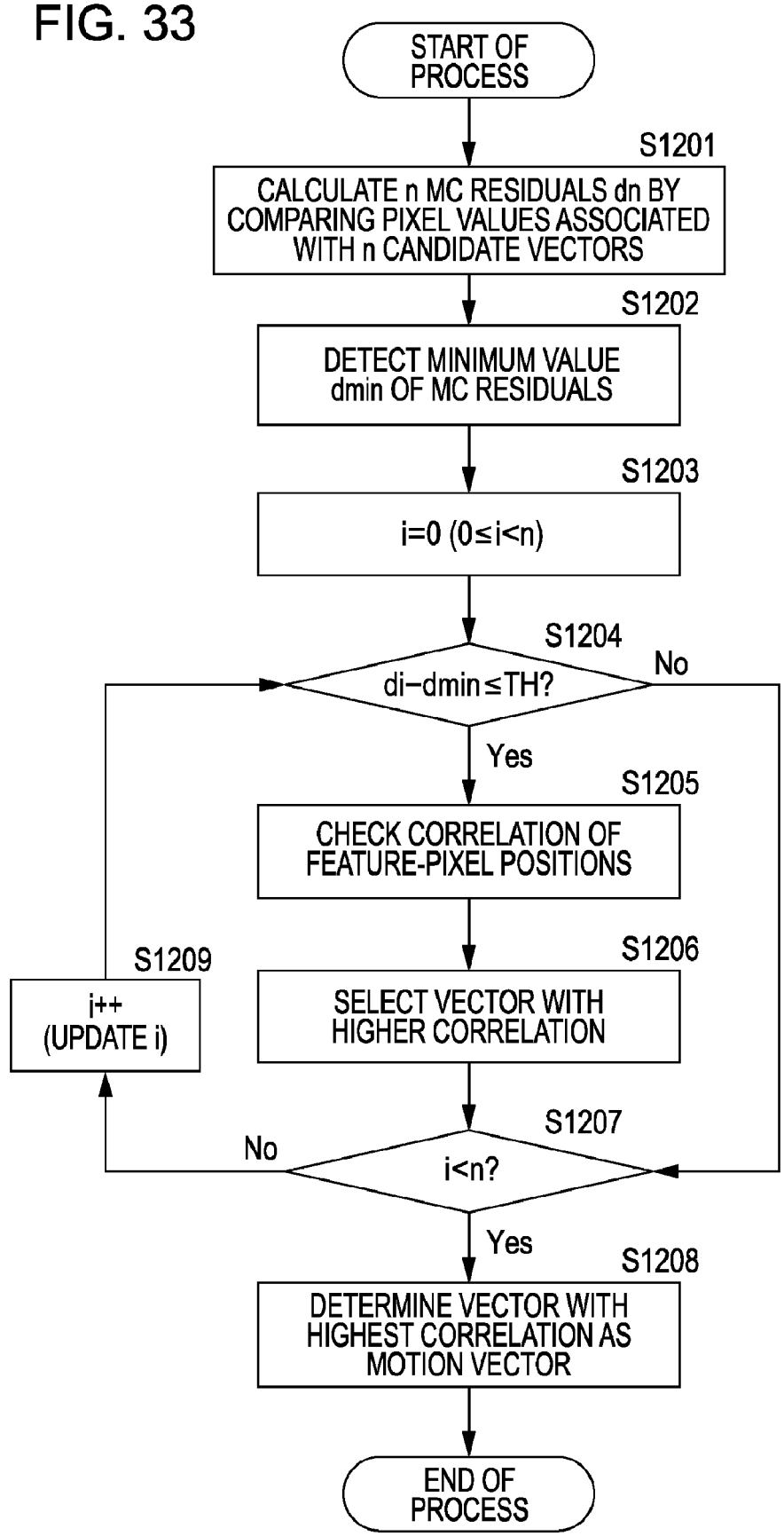
FIG. 33 is a flowchart for explaining a sequence of a motion-vector determining process executed by the motion-vector detecting device according to the present invention.

Now, the motion-vector determining process described above will be described with reference to a flowchart shown in FIG. 33.

Processing in individual steps of the flow shown in FIG. 33 will be described. FIG. 33 shows the flow of a motion-vector determining process of a single subject pixel. When motion vectors are determined for all the constituent pixels of a frame image, the constituent pixels of the frame image are sequentially chosen as a subject pixel, and the flow shown in FIG. 33 is executed for each subject pixel.

First, in the processing executed in step S1201, the absolute value of difference between a subject pixel and each of the pixels specified by n candidate vectors, i.e., an MC residual dn, is calculated. This processing is executed by the pixel-correlation checker 1210 in the motion-vector determiner 1200 shown in FIG. 27.

Steps S1202 to S1204 are executed by the tentative checker 1221. In step S1202, the tentative checker 1221 receives input of n absolute values of difference (MC residuals) [di], and detects a minimum value dmin among the n MC residuals.

In step S1203, initial setting is executed so that i=0 (0≦i<n). In step S1204, it is checked whether the following expression is satisfied, where TH denotes a predetermined threshold:

$$di-d\min \leq TH$$

The processing executed in step S1204 is tentative checking for selecting candidate vectors from the candidate vectors described earlier with reference to FIG. 28. When it is determined that di−dmin≦TH is not satisfied, it is determined that the relevant candidate vector is not a candidate vector that is to be selected. Then, the process skips correlation checking based on feature pixel positions in the neighboring region of the subject pixel in steps S1205 and S1206 and proceeds to step S1207.

When di−dmin≦TH is satisfied in the tentative checking executed in step S1204, the relevant candidate vector is selected as a selected candidate vector, and the process proceeds to step S1205. The processing in steps S1205 and S1206 is executed by the feature-pixel-position correlation checker 1230 of the motion-vector determiner 1200 shown in FIG. 27.

In step S1205, correlation of feature pixel positions is checked. In this processing, as described earlier with reference to FIG. 32, it is checked whether correlation between the feature pixel position in the neighboring region of the subject pixel and the feature pixel position in the neighboring region of each pixel selected as a selected candidate vector, i.e., correspondence of positions, exists.

In step S1206, a candidate vector with a higher correlation is selected. In step S1207, it is checked on the basis of the value of i whether all the candidate vectors have been checked. When the checking has not been finished, the process proceeds to step S1209, in which the value of i is updated (incremented by 1), and the processing in step S1204 and subsequent steps is repeated.

When the checking of all the candidate vectors has been finished, the process proceeds to step S1208. In step S1208, a candidate vector having a highest correlation among candidate vectors that have been selected at that time, i.e., a candidate vector having a highest correlation between the feature pixel position in the neighboring region of the subject pixel and the feature pixel position in the neighboring region of the pixel selected as a selected candidate vector, calculated in step S1205, is determined as a motion vector associated with the subject pixel under processing.

As described above, according to the motion-vector determining process based on two-point matching in this embodiment, when determining a motion vector from candidate vectors, instead of performing block matching, a subject pixel and information of a feature pixel position in the proximity thereof are used. Thus, calculation of correlation on the basis of a large number of pixel values corresponding to the block size, which is executed in block matching, is not needed, so that efficient processing can be achieved.

When input pixel data is input in the order of raster scanning, detection of a pixel position having a maximum absolute value of difference within a neighboring region restricted to the horizontal direction of a subject pixel or detection of a pixel position having a maximum absolute value of difference with an adjacent pixel, i.e., an attached-information calculating process by the attached-information calculator 1250, can be executed in parallel with the evaluation-value-table generating process executed by the evaluation-value-table generator 101 shown in FIG. 6, so that it is possible to finish calculation of attached information by the end of the evaluation-value-table generating process. Thus, a new processing period need not be set, so that the motion-vector detecting process can be executed without reducing the processing speed.

Although the above embodiment has been described in the context of an example where the neighboring region of a subject pixel is defined as 16 pixels −8 to +7 or 8 pixels −4 to +3 with the subject pixel position represented as [0], an arbitrary region can be defined as the neighboring region. Furthermore, considering that pixels are input in the order of raster scanning, by setting a neighboring region only in a range on the right side in the horizontal direction, it is possible to compare adjacent pixels on the basis of input pixel values in the order of raster scanning. Thus, the memory area for pixel values can be reduced, so that the hardware scale can be reduced further.

Figure 34:
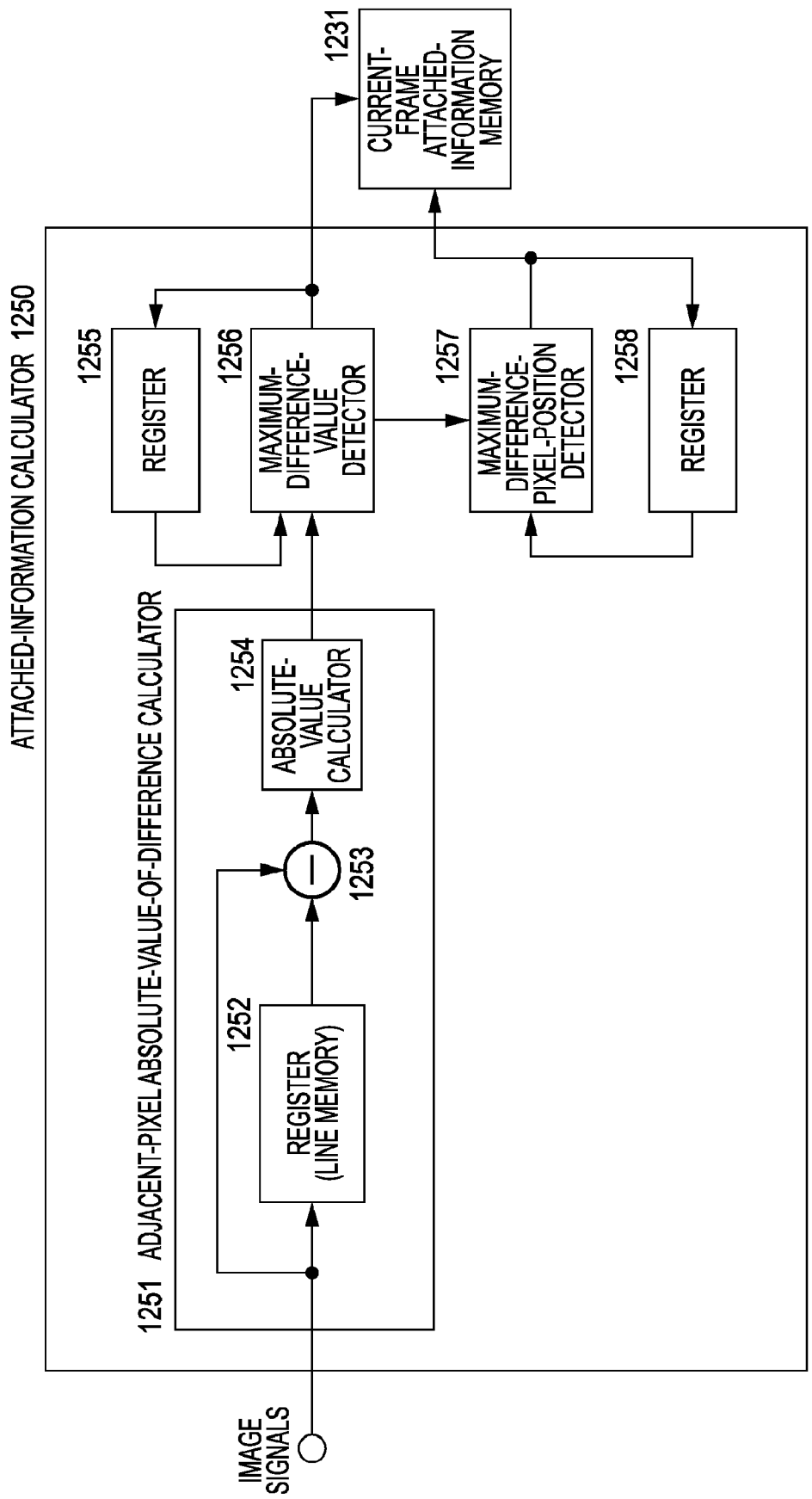
FIG. 34 is a diagram showing an example configuration of the attached-information calculator in the motion-vector determiner according to the present invention.

In the embodiment described above, a neighboring region of a pixel is set, the attached-information calculator 1250 calculates, as feature-pixel information, a pixel position having a maximum absolute value of difference with an adjacent pixel in the neighboring region, and the feature-pixel information is used for correlation checking. That is, the information used for correlation checking is:

(a) Position of Pixel Having Absolute Value of Difference with an Adjacent Pixel Instead of using only the information of the pixel position having a maximum absolute value of difference with an adjacent pixel, for example, the following information may be used as correlation-checking information:

(b) Position and Pixel Value of Pixel Having a Maximum Absolute Value of Difference with an Adjacent Pixel FIG. 34 shows an example configuration of the attached-information calculator 1250 in a case where (b) the position and pixel value of a pixel having a maximum absolute value of difference with an adjacent pixel are used as correlation-checking information.

The configuration of the attached-information calculator 1250 shown in FIG. 34 is substantially the same as the configuration of the attached-information calculator 1250 shown in FIG. 29, and it includes an adjacent-pixel absolute-value-of-difference calculator 1251 including a register 1252, a pixel-value-difference calculator 1253, and an absolute-value calculator 1254, a register 1255, a maximum-difference detector 1256, a maximum-difference pixel-position detector 1257, and a register 1258.

The adjacent-pixel absolute-value-of-difference calculator 1251 receives input of image signals for which motion vectors are to be detected, and stores image-frame data in the register 1252. The pixel-value-difference calculator 1253 sequentially calculates the differences between adjacent pixels of the image data stored in the register 1252. The absolute-value calculator 1254 sequentially calculates the absolute values of the differences between the adjacent pixels, and outputs the absolute values to the maximum-difference detector 1256.

The maximum-difference detector 1256 performs comparison while storing the sequentially input absolute values of the differences between the adjacent pixels in the register 1255, thereby detecting a pixel difference having a maximum absolute value of pixel-value difference in each predetermined region, for example, in each set of 16 pixels.

The information of the pixel having the maximum absolute pixel-value difference for each predetermined region (e.g., each set of 16 pixels), detected by the maximum-difference detector 1256, is input to the maximum-difference pixel-position detector 1257, where position information of the pixel having the maximum difference for each predetermined region (e.g., each set of 16 pixels) is detected, and the position information is stored in the register 1258.

The attached-information calculator 1250 described earlier with reference to FIG. 29 outputs only the position information stored in the register 1258 to the current-frame attached-information memory 1231, so that correlation is checked on the basis of the position information. The attached-information calculator 1250 shown in FIG. 34 outputs the pixel-value information of the pixel position having the maximum difference from the register 1255 to the current-frame attached-information memory 1231 as well as the position information representing the position of the pixel having the maximum difference, stored in the register 1258.

In the feature-pixel-position correlation checker 1230 shown in FIG. 27, correlation is checked using these two pieces of data, i.e., the position information and pixel-value information of the pixel having the maximum absolute value of difference with the adjacent pixel.

For example, even when all the selected candidate vectors have feature pixels at the same position as the pixel position detected in the neighboring region of the subject pixel in FIG. 32 described earlier, by further checking correlation of pixel values, it is possible to select a candidate vector with a highest degree of matching and to determine the candidate vector as a motion vector of the subject pixel.

By using not only position information but also pixel-value level information or pixel-value level-difference information as well as position information for correlation checking, it is possible to determine motion vectors more accurately.

The two-point matching described above is based on the assumption that an object moves with a certain area. For example, when a feature pixel is set at a position remote from a subject pixel, the possibility of being the same object is low. Thus, processing may be executed so that the distance with a feature pixel is reflected on correlation as well as the degree of matching of feature-pixel position. That is, the weight for a feature pixel at a position close to the subject pixel may be increased in correlation checking while decreasing the weight for a feature pixel at a position remote from the subject pixel in correlation checking.

(2) Motion-Vector Determining Process Based on Three-Point Matching

Figure 35:
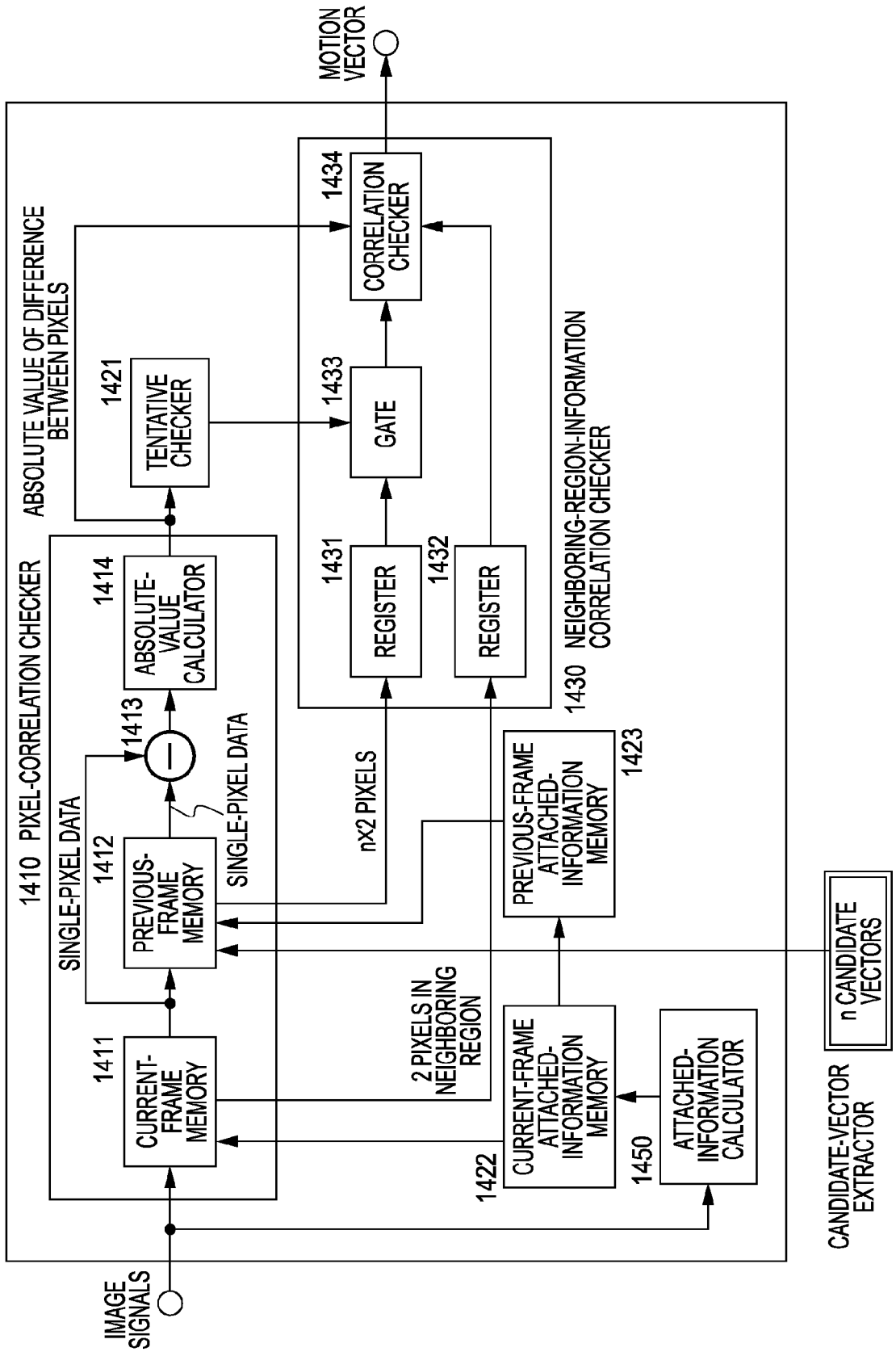
FIG. 35 is a diagram showing a detailed configuration (second embodiment) of the motion-vector determiner in the motion-vector detecting device according to the present invention.

Next, a motion-vector determining process based on three-point matching will be described. FIG. 35 shows a detailed configuration of a motion-vector determiner in a motion-vector detecting device according to this embodiment. A motion-vector determiner 400 shown in FIG. 35 corresponds to the motion-vector determiner 103 in the motion-vector detecting device shown in FIG. 6.

The motion-vector determiner 400 shown in FIG. 35 receives input of information of a plurality of candidate vectors determined on the basis of the evaluation-value table described earlier from the candidate-vector extractor 102 shown in FIG. 6, and determines a motion vector that is to be associated with each pixel.

As shown in FIG. 35, the motion-vector determiner 400 in this embodiment includes a pixel-correlation checker 1410, a tentative checker 1421, an attached-information calculator 1450, a current-frame attached-information memory 1422, a previous-frame attached-information memory 1423, and a neighboring-region-information correlation checker 1430. The pixel-correlation checker 1410 includes a current-frame memory 1411, a previous-frame memory 1412, a pixel-value-difference calculator 1413, and an absolute-value calculator 1414. The neighboring region-information correlation checker 1430 includes registers 1431 and 1432, a gate 1433, and a correlation checker 1434. The attached-information calculator 1450 will be described in detail with reference to FIG. 35.

The pixel-correlation checker 1410 receives input of image signals. The input image is, for example, image data obtained by raster scanning, as described earlier with reference to FIG. 6. For example, the image data includes luminance signals in components signals of digital color video signals.

The image data is input on a frame-data basis. The image data is first stored in the current-frame memory 1411 and then stored in the previous-frame memory 1412. Thus, the pixel-correlation checker 1410 holds data of two successive frames in the memories.

Furthermore, the pixel-correlation checker 1410 receives input of candidate-vector information from the candidate-vector extractor 102 shown in FIG. 6, identifies pixel positions in a current frame specified by a plurality of candidate vectors on the basis of the candidate-vector information for each pixel in a previous frame, i.e., for each pixel with which a motion vector is to be determined (subject pixel), calculates the difference between the subject pixel in the previous frame and each of the pixels in the current frame specified by the plurality of candidate vectors in the pixel-value-difference calculator 1413, calculates the absolute value of the difference in the absolute-value calculator 1414, and outputs the absolute value of the difference to the tentative checker 1421. The series of processing is the same as in the case of two-point matching described earlier.

The tentative checker 1421 receives input of the absolute values of the differences between the subject pixel and the individual pixels determined by the plurality of candidate vectors (MC residuals). For example, when the number of candidate vectors is n, n absolute values of differences (MC residuals) [di] are input, where i=1 to n.

The tentative checker 1421 narrows down a motion vector associated with the subject pixel from the n absolute values of differences (MC residuals) [di]. More specifically, the tentative checker 1421 selects small MC residuals from the n ((absolute values of differences (MC residuals) [di]. This processing is also the same as in the case of two-point matching described earlier. For example, letting a minimum value of the n MC residuals be denoted by dmin and a predetermined threshold by TH, candidate vectors specifying pixels satisfying either the following expressions or a pixel satisfying dmin are selected:

$$di - d\min \leq TH$$

In the example described earlier with reference to FIG. 28, for example, when A, C, and E are selected as pixels satisfying the above criterion among the pixels A to E, selected-candidate-vector information for these pixels are output from the tentative checker 1421 to the gate 1433, so that only the selected-candidate-vector information is input to the neighboring region-information correlation checker 1430 among the candidate-vector information input from the candidate-vector extractor 102 shown in FIG. 6.

Furthermore, in the pixel-correlation checker 1410 according to this embodiment, pixel information of two pixels in the neighboring region of the subject pixel is input from the current-frame memory 1411 of the pixel-correlation checker 1410 to the register 1432 of the neighboring region-information correlation checker 1430, and two pixels corresponding to n pixels specified by the candidate vectors, i.e., n×2 pixels, are input from the previous-frame memory of the pixel-correlation checker 1410 to the register 1431 of the neighboring region-information correlation checker 1430.

Which of the pixels in the neighboring region is to be output is determined by the current-frame attached-information memory 1422, the previous-frame attached-information memory 1423, and the output of the information of n candidate vectors.

To the current-frame attached information memory 1422 and the previous-frame attached-information memory 1423, results of calculation by the attached-information calculator 1450 are output.

A specific configuration of the attached-information calculator 1450 will be described with reference to FIG. 36. For example, the attached-information calculator 1450 extracts, as feature pixels among pixels in the proximity of a subject pixel, a pixel having a maximum pixel-value difference with the subject pixel and a pixel having a minimum pixel-value difference with the subject pixel.

Figure 36:
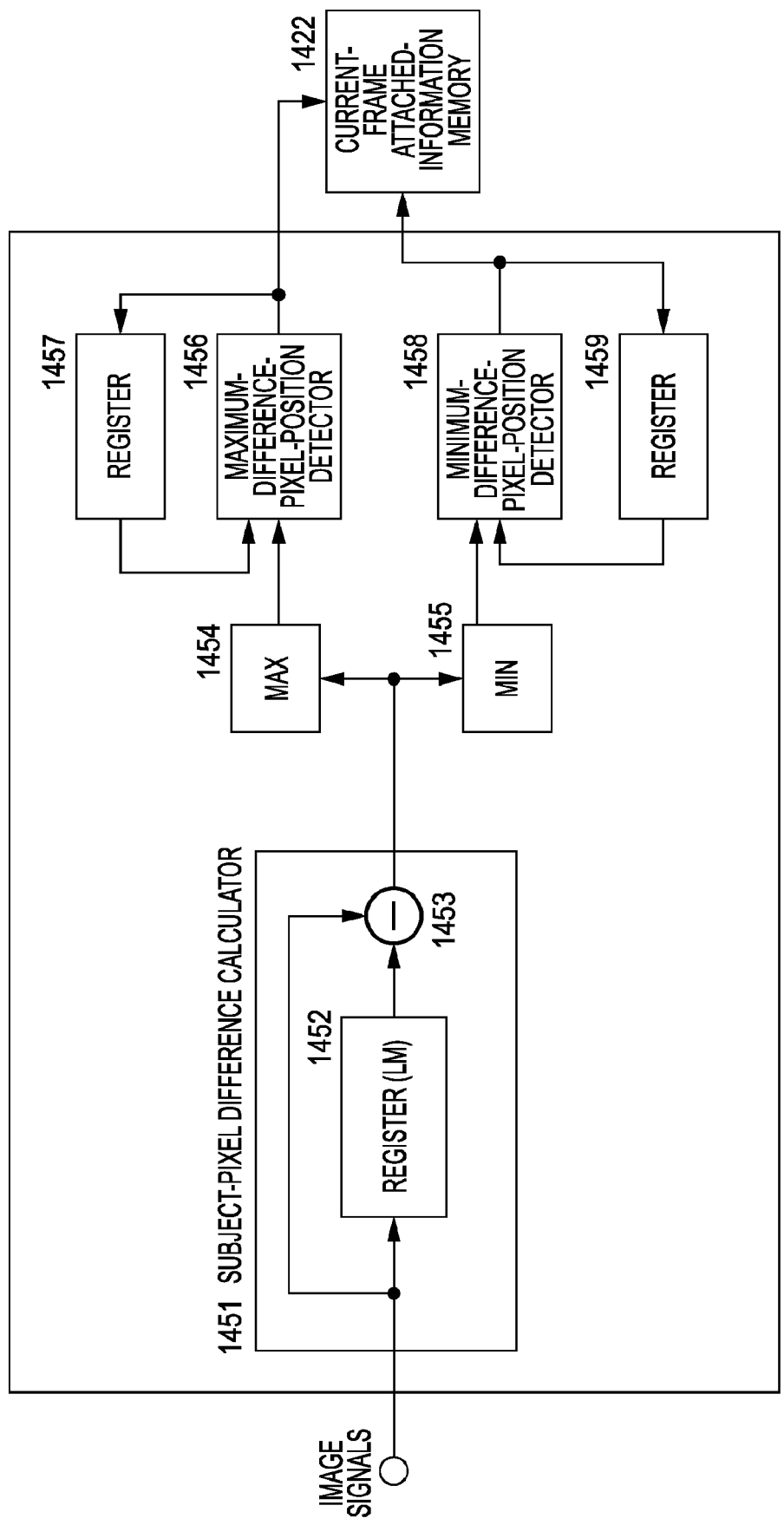
FIG. 36 is a diagram showing an example configuration of the attached-information calculator in the motion-vector determiner according to the present invention.

The attached-information calculator 1450 shown in FIG. 36 includes a subject-pixel difference calculator 1451 including a register 1452 and a pixel-value-difference calculator 1453, a maximum-difference pixel-information obtaining unit (MAX) 1454, a minimum-difference pixel-information obtaining unit (MIN) 1455, a maximum-difference pixel-position detector 1456, a register 1457, a minimum-difference pixel-position detector 1458, and a register 1459.

The subject-pixel difference calculator 1451 receives input of image signals for which motion vectors are to be detected, and stores image frame data in the register 1452. The pixel-value-difference calculator 1453 sequentially calculates the differences in neighboring regions of the image data stored in the register 1452, and stores information of the pixel having a maximum difference in the maximum-difference pixel-information obtaining unit (MAX) 1454 while storing information of the pixel having a minimum difference in the minimum-difference pixel-information obtaining unit (MIN) 1455. These pieces of pixel information include pixel-position information.

Specific processing will be described with reference to FIG. 37. In the attached-information calculator 1450, regarding the image data stored in the register 1452, the differences between the subject pixel and the adjacent pixel values of the subject pixel are sequentially calculated to obtain, for example, information of a pixel having a maximum difference with the subject pixel and information of a pixel having a minimum difference with the subject pixel among pixels in the neighboring region of the subject pixel. The pixels in the neighboring region of the subject pixel refer to a predefined pixel region, for example, a range of −8 to +7 pixels of the subject pixel in the horizontal direction or a block that is set in a two-dimensional domain.

Figure 37:
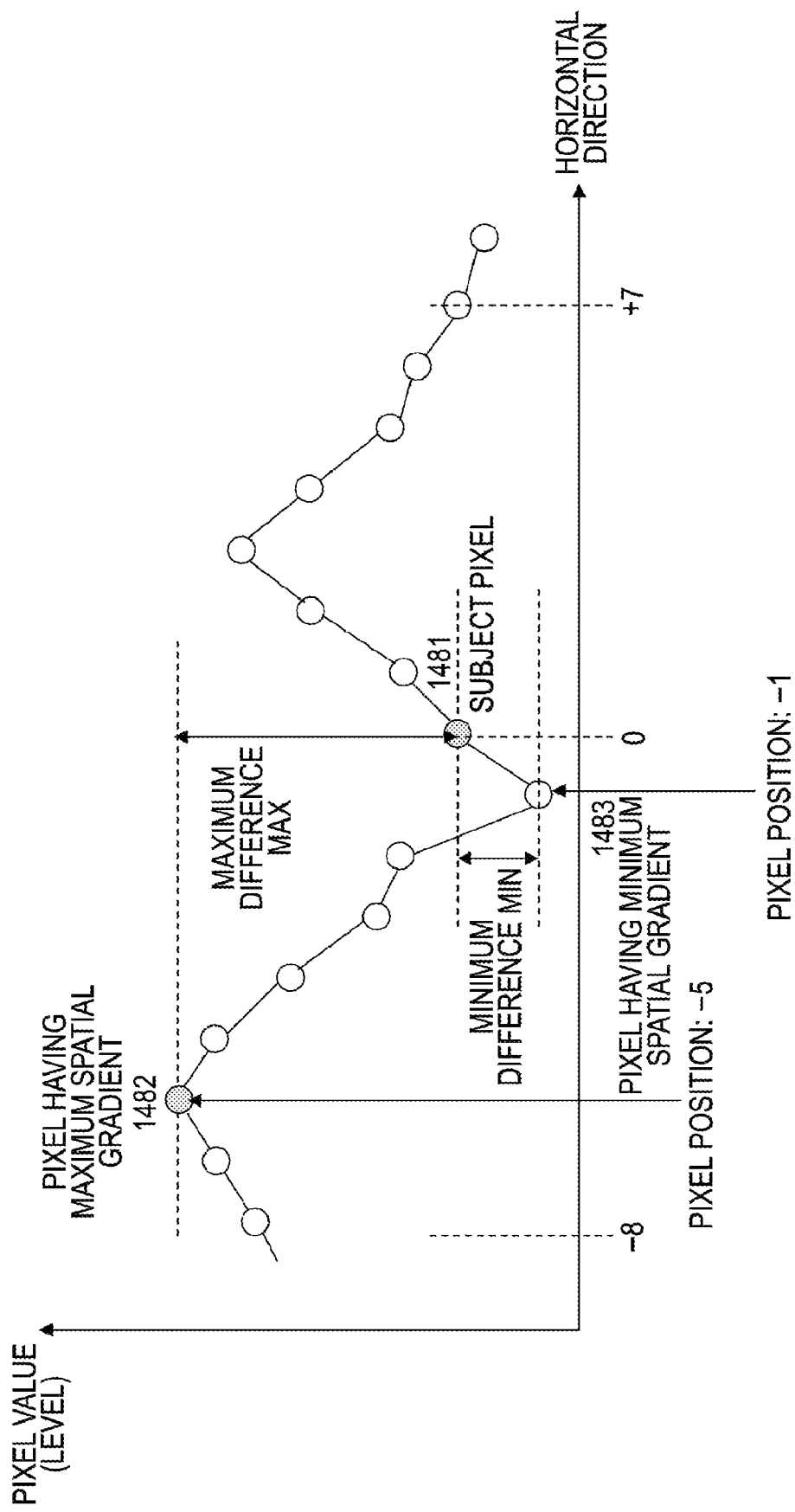
FIG. 37 is a diagram for explaining a feature pixel detected by the attached-information calculator.

In the example shown in FIG. 37, in a neighboring region of a subject pixel 1481, the pixel having a maximum difference with the subject pixel is a pixel 1482, i.e., the pixel at a pixel position [−5] when the pixel position of the subject pixel 1481 is represented as [0]. That is, a pixel having a maximum spatial gradient is selected and pixel information is obtained as a feature pixel. Furthermore, the pixel having a minimum difference with the subject pixel is a pixel 1483, i.e., the pixel at a pixel position [−1] when the pixel position of the subject pixel 1481 is represented as [0]. That is, a pixel having a minimum spatial gradient is selected and pixel information is obtained as a feature pixel.

The maximum-difference pixel-information obtaining unit (MAX) 1454 shown in FIG. 36 detects a pixel having a maximum difference with a subject pixel in each predetermined region, for example, in each set of 16 pixels from −8 to +7, on the basis of difference information of pixels sequentially input thereto. The minimum-difference pixel-information obtaining unit (MIN) 1455 detects a pixel having a minimum difference with a subject pixel in each predetermined region, on the basis of difference information of pixels sequentially input thereto.

Information of the pixel having a maximum pixel difference in each predetermined region, detected by the maximum-difference pixel-information obtaining unit (MAX) 1454, is input to the maximum-difference pixel-position detector 1456, where maximum-difference pixel-position information for each predetermined region (e.g., for each set of 16 pixels) is detected, and the maximum-difference pixel-position information is stored in the register 1457.

Information of the pixel having a minimum pixel difference in each predetermined region, detected by the minimum-difference pixel-information obtaining unit (MIN) 1455, is input to the minimum-difference pixel-position detector 1458, where minimum-difference pixel-position information for each predetermined region (e.g., for each set of 16 pixels) is detected, and the minimum-difference pixel-position information is stored in the register 1459.

For example, in the example shown in FIG. 37, in the neighboring region of the subject pixel 1481, the pixel position of the pixel 1482 having a maximum difference with the subject pixel is [−5] when the pixel position of the subject pixel is represented as 0. The pixel position of the pixel 1483 having a minimum difference with the subject pixel is [−1] when the pixel position of the subject pixel is represented as 0.

The maximum-difference pixel-position information for each predetermined region (e.g., for each set of 16 pixels), stored in the register 1457, and the minimum-difference pixel-position information for each predetermined region (e.g., for each set of 16 pixels), stored in the register 1459 are sequentially output to the current-frame attached-information storage memory 1422.

Referring back to FIG. 35, description of processing executed by the motion-vector determiner 400 will be continued. The feature-pixel position information from the attached-information calculator 1450, described with reference to FIG. 36, is input to the current-frame attached-information memory 1422 shown in FIG. 35. The attached information is transferred to the previous-frame attached-information memory 1423 upon processing of each frame.

The attached information in the current-frame memory, input to the current-frame attached information memory 1422, that is, two pieces of feature-pixel position information associated with the subject pixel, i.e., the pixel-position information having a maximum difference with the subject pixel and the pixel-position information having a minimum difference with the subject pixel, are output to the current-frame memory 1411 of the pixel-correlation checker 1410, and the pixel information of the two points is stored in the register 1432 of the neighboring-region-information checker 1430 on the basis of the output information. The pixel information includes pixel-position information.

Furthermore, the attached information in the previous-frame memory, input to the previous-frame attached information memory 1423, that is, the pixel-position information having a maximum difference with the subject pixel and the pixel-position information having a minimum difference with the subject pixel, are output to the previous-frame memory 1412 of the pixel-correlation checker 1410. The previous-frame memory 1412 also receives input of information of n candidate vectors from the candidate-vector extractor. Two feature pixels are identified from a neighboring region determined for each pixel specified by candidate-vector information, so that n×2 pieces of feature-pixel information are stored in the register 1431 of the neighboring-region-information checker 1430. The pixel information includes pixel-position information.

The n×2 pieces of feature-pixel information stored in the register 1431 are output to the correlation checker 1434 via the gate 1433. At the gate 1433, on the basis of selected candidate vectors selected from the n candidate vectors through tentative checking by the tentative checker 1421, only feature-pixel information in the neighboring region of pixels associated with the selected candidate vectors is output to the correlation checker 1434.

On the other hand, the feature-pixel information of the subject pixel is directly output to the correlation checker 1434. The correlation checker 1434 checks correlation of these feature pixels to determine a single motion vector from the selected candidate vectors.

Figure 38:
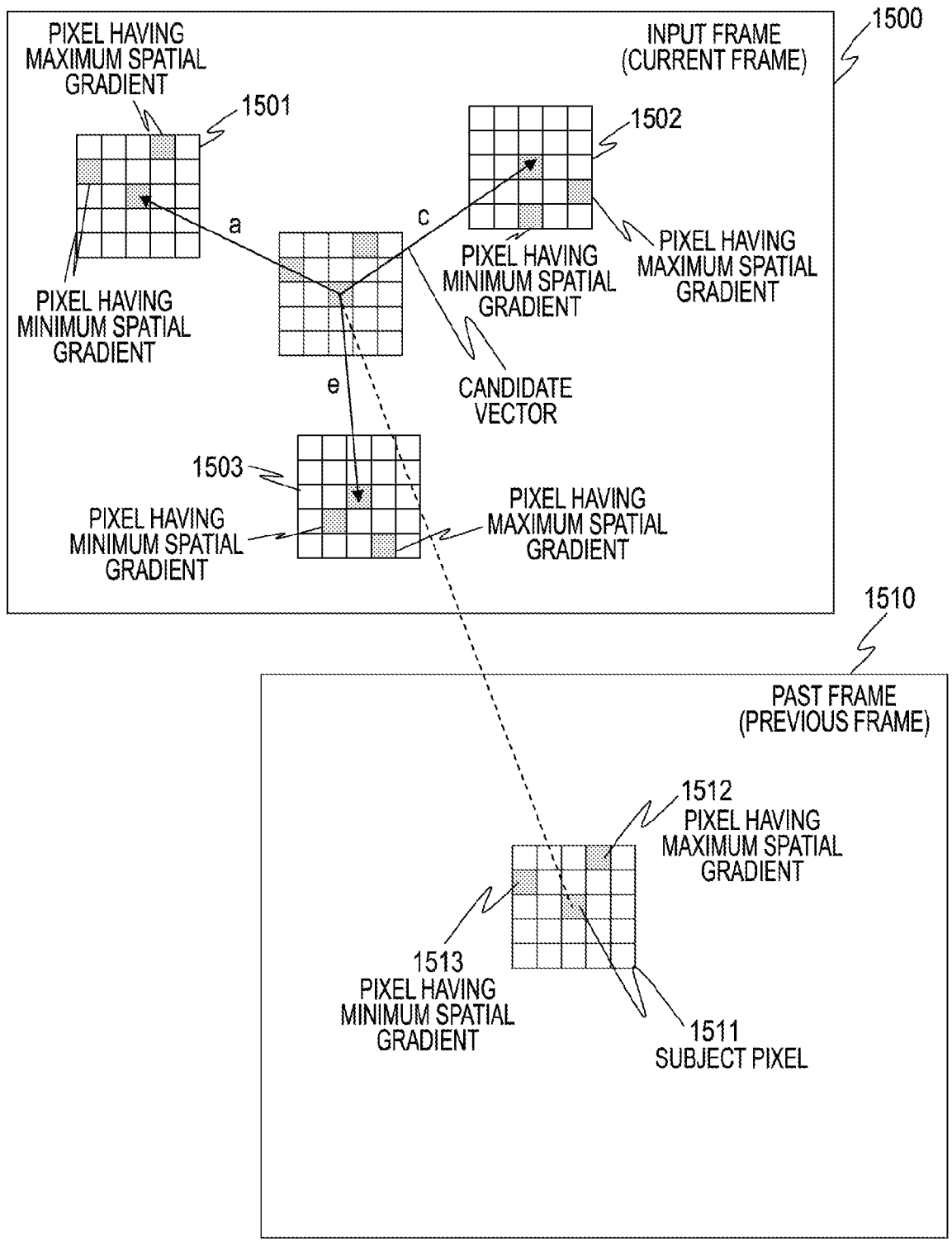
FIG. 38 is a diagram for explaining details of processing executed by the motion-vector determiner in the motion-vector detecting device according to the present invention.

A motion-vector determining process executed by the correlation checker 1434 will be described with reference to FIG. 38. FIG. 38 shows image data 1500 of an input frame (current frame) and image data 1510 of a past frame (previous frame), similarly to the case described earlier with reference to FIG. 28.

In the image data 1500 of the input frame (current frame), candidate vectors a, c, and e, selected by the candidate-vector selecting process executed by the tentative checker described earlier with reference to FIG. 28 are shown.

The correlation checker 1433 in the neighboring-region-information checker 1430 determines a motion vector from the candidate vectors a, c, and e on the basis of feature-pixel position data in the neighboring region of a subject pixel selected from the past-frame (previous-frame) image data 1510, i.e., a subject pixel 1511 with which a motion vector is to be associated.

In the example shown in FIG. 38, the neighboring region of the subject pixel 1511 is a two-dimensional bloc region. The setting of the neighboring region is arbitrary, and a horizontal one-dimensional region may be set, similarly to the case of two-point matching described earlier.

With respect to the pixel position of the subject pixel 1511 as the center, a maximum-spatial-gradient pixel 1512 at a pixel position having a maximum difference with the subject pixel and a minimum-spatial-gradient pixel 1513 at a pixel position having a minimum difference with the subject pixel are determined.

In the input frame (current frame) 1500, in each of the pixel regions that are set around pixels specified by the individual selected candidate vectors, i.e., in each of a pixel region 1501 that is set in relation to the selected candidate vector a, a pixel region 1502 that is set in relation to the selected candidate vector c, and a pixel region 1503 that is set in relation to the selected candidate vector e, a maximum-spatial-gradient pixel at a pixel position having a maximum difference with the center pixel and a minimum-spatial-gradient pixel at a pixel position having a minimum difference with the center pixel are determined.

The correlation checker 1433 checks correlation between the feature-pixel positions in the neighboring region of the subject pixel 1511 and the feature-pixel positions in the neighboring regions of pixel positions specified by the selected candidate vectors a, c, and e.

In the example shown in the figure, the neighboring region 1501 specified by the selected candidate vector 1 is at a position corresponding to the feature-pixel positions in the neighboring region of the subject pixel 1511. The neighboring regions 1502 and 1503 specified by the other two selected candidate vectors c and e are not located at positions corresponding to the feature-pixel positions in the neighboring region of the subject pixel 1511.

Thus, the candidate vector a is selected and determined as a motion vector associated with the subject pixel 1511.

The correlation checker 1433 sets pixels in the frame sequentially as a subject pixel and executes the processing for checking correlation of feature-pixel positions in the neighboring region for each subject pixel, similarly to the processing described above, thereby selecting and determining a motion vector associated with each pixel in the frame from the selected candidate vectors.

As described above, in the motion-vector determiner 400 shown in FIG. 35, two feature-pixel positions are identified on the basis of pixel values in the neighboring region of a subject pixel, correlation between the positions of the feature pixels relative to the subject pixel position in the neighboring region of the subject pixel and feature pixel positions in neighboring regions of pixels specified by candidate vectors selected by the tentative checker 1221 is checked, and a candidate vector specifying a pixel having a feature pixel position with a highest correlation is determined as a motion vector associated with the subject pixel.

Figure 39:
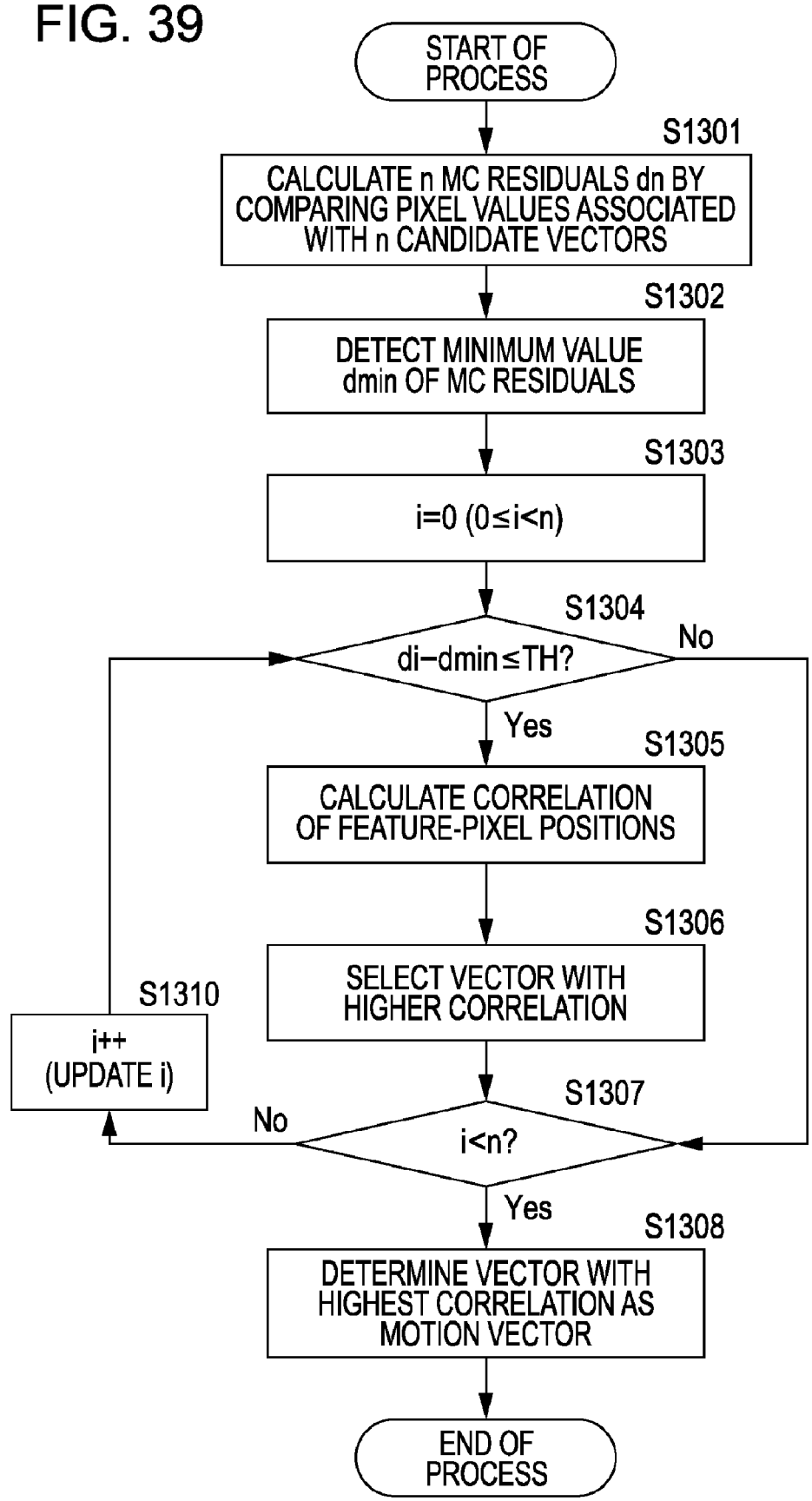
FIG. 39 is a flowchart for explaining a sequence of a motion-vector determining process executed by the motion-vector detecting device according to the present invention.

The sequence of the motion-vector determining process described above will be described with reference to a flowchart shown in FIG. 39. The flow shown in FIG. 39 relates to a process of determining a motion vector associated with a single subject pixel. When motion vectors are determined for all the pixels in a frame image, the pixels in the frame image are sequentially set as a subject pixel, and the flow shown in FIG. 39 is executed for each subject pixel.

First, processing executed in step S1301 is calculation of the absolute values of differences between a subject pixel and pixels specified by n candidate vectors, i.e., MC residuals dn. This processing is executed by the pixel-correlation checker 1410 of the motion-vector determiner shown in FIG. 35.

Steps S1302 to S1304 are executed by the tentative checker 1421. In step S1302, the tentative checker 1421 receives input of n absolute values of differences (MC residuals) [di] and detects a minimum value dmin of the n MC residuals.

In step S1303, initial setting is executed so that i=0 (0≦i<n). In step S1304, it is checked whether:

$$di - d\min \leq TH$$

where TH denotes a predetermined threshold.

The processing executed in step S1304 is tentative checking for narrowing down candidate vectors, described earlier with reference to FIG. 28. When it is determined that di−dmin≦TH is not satisfied, it is determined that the relevant candidate vector is not to be selected as a selected candidate vector. Then, correlation checking in steps S1305, S1306, and S1307 based on feature pixel positions in a neighboring region of a subject pixel is skipped, and the process proceeds to step S1308.

When di−dmin≦TH is satisfied in the tentative checking executed in step S1304, the relevant candidate vector is selected as a selected candidate vector, and the process proceeds to step S1305.

In step S1305, correlation of feature-pixel positions is checked. As described earlier with reference to FIG. 36, in this processing, it is checked whether correlation, i.e., correspondence of positions, exists between the positions of the two feature pixels in the neighboring region of the subject pixel and the positions of the two feature pixels in the neighboring region of the pixel selected as a selected candidate vector.

In step S1306, a candidate vector with a higher correlation is selected. In step S1307, it is checked on the basis of the value of i whether checking of all the candidate vectors has been finished. When the checking has not been finished, the process proceeds to step S1310, in which the value of i is updated (incremented by 1), and the processing in step S1304 and subsequent steps is repeated.

When the checking of all the candidate vectors has been finished, the process proceeds to step S1308, in which a candidate vector having a highest correlation among candidate vectors that have been selected, i.e., a candidate vector having a high correlation between the positions of the two feature pixels in the neighboring region of the subject pixel and the positions of the two feature pixels in the neighboring region of the pixel selected as a selected candidate vector, calculated in step S1305, is determined as a motion vector associated with the subject pixel under processing.

As described above, in the motion-vector determining process based on three-point matching in this embodiment, when determining a motion vector from candidate vectors, position information of a subject pixel and two feature pixels neighboring the subject pixel is used without performing block matching. Thus, calculation of correlation on the basis of a large number of pixel values in accordance with a block size used in block matching is not needed, so that efficient processing can be achieved.

In the embodiment described above, correlation is checked on the basis of position information using two feature pixel positions of a current frame and a previous frame. Alternatively, correlation may be checked on the basis of pixel values at feature pixel positions associated with a subject pixel. That is, block matching may be performed based on only three points using the pixel values of a subject pixel and two feature pixels in a neighboring region of the subject pixel. A sequence of this processing will be described with reference to FIG. 40.

Figure 40:
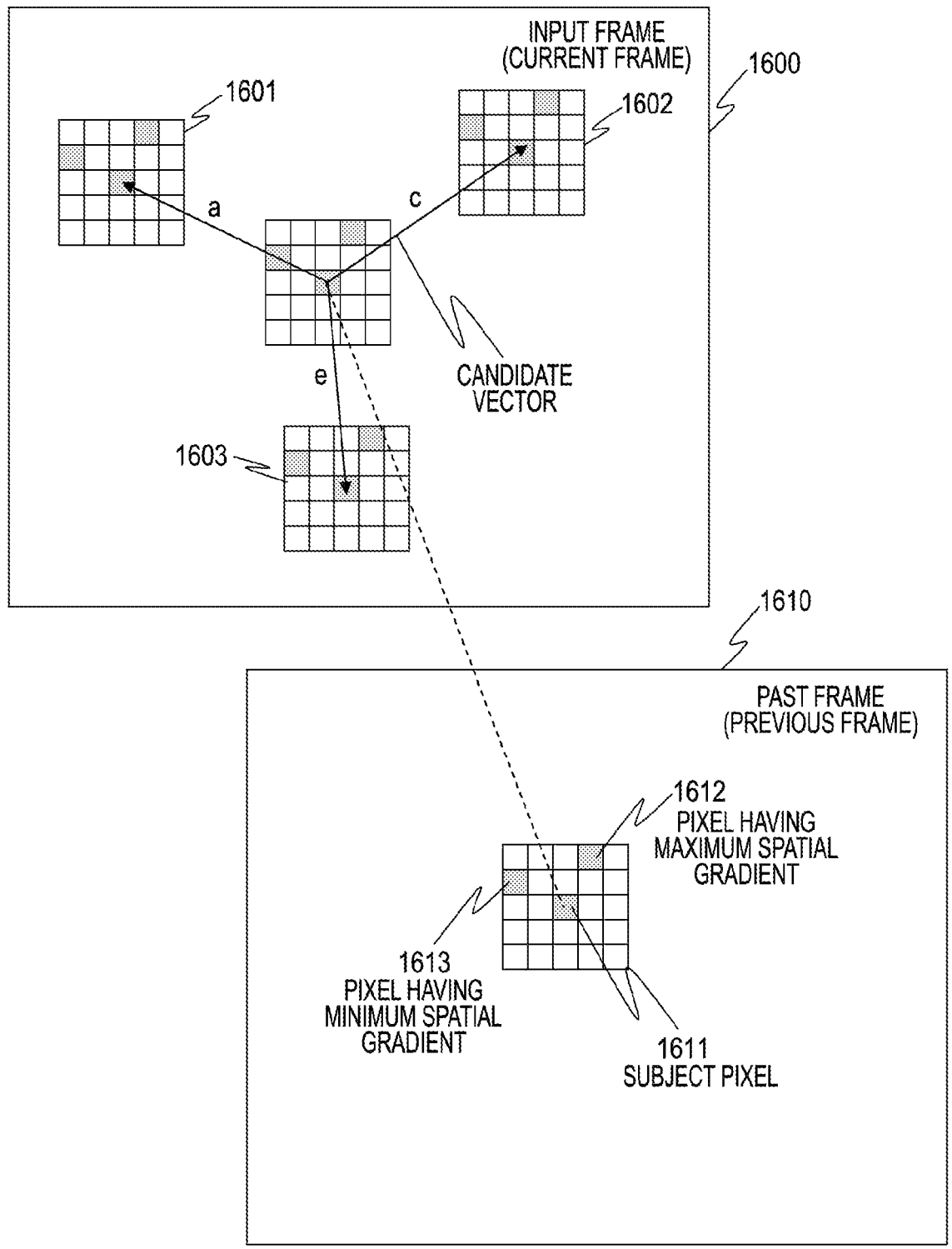
FIG. 40 is a diagram for explaining details of processing executed by the motion-vector determiner in the motion-vector detecting device according to the present invention.

FIG. 40 shows input-frame (current-frame) image data 1600 and past-frame (previous-frame) image data 1610, similarly to FIG. 38 described earlier.

In the input-frame (current-frame) image data 1600, candidate vectors a, c, and e selected through the candidate-vector selecting process by the tentative checker described earlier with reference to FIG. 28 are shown.

The correlation checker 1433 in the neighboring-region-information checker 1430 determines a motion vector from the candidate vectors a, c, and e on the basis of feature-pixel position data in the neighboring region of the subject pixel selected from the past-frame (previous-frame) image data 1510, i.e., the subject pixel 1511 as a pixel with which a motion vector is to be associated.

In the example shown in FIG. 40, the neighboring region of the subject pixel 1611 is a two-dimensional block region. The setting of the neighboring region is arbitrary, and a horizontal one-dimensional region may be set, similarly to the case of two-point matching described earlier.

With respect to the pixel position of the subject pixel 1611 as the center, a maximum-spatial-gradient pixel 1612 at a pixel position having a maximum difference with the subject pixel and a minimum-spatial-gradient pixel 1613 at a pixel position having a minimum difference with the subject pixel are determined.

In the input frame (current frame) 1600, in each of the pixel regions that are set around pixels specified by the individual selected candidate vectors, i.e., in each of a pixel region 1601 that is set in relation to the selected candidate vector a, a pixel region 1602 that is set in relation to the selected candidate vector c, and a pixel region 1603 that is set in relation to the selected candidate vector e, pixels corresponding to the positions of a maximum-spatial-gradient pixel 1612 and a minimum-spatial-gradient pixel 1613 in relation to the subject pixel 1611 detected in the past frame are picked up and output to the neighboring-region-information correlation checker 1430 shown in FIG. 35.

As shown in FIG. 40, pixels corresponding to the positions of a maximum-spatial-gradient pixel 1612 and a minimum-spatial-gradient pixel 1613 in relation to the subject pixel 1611 detected in the past frame are picked up from each of the pixel regions 1601, 1602, and 1603 specified by the selected candidate vectors a, c, and e, and correlation is checked.

That is, in the neighboring-region-information checker 1430 shown in FIG. 35, correlation of pixel values between these pixels is checked. More specifically, correlation between the pixel values of the pixels at the positions of the maximum-spatial-gradient pixel 1612 and the minimum-spatial-gradient pixel 1613 in relation to the subject pixel 1611 and the pixels at the corresponding positions in the pixel regions 1601, 1602, and 1603. As for the center pixel, correlation has been checked by the tentative checker 1421. Thus, results of matching based on only three points are obtained, and a selected candidate vector associated with data determined as having a highest correlation by the three-point matching is determined as a motion vector associated with the subject pixel.

Figure 41:
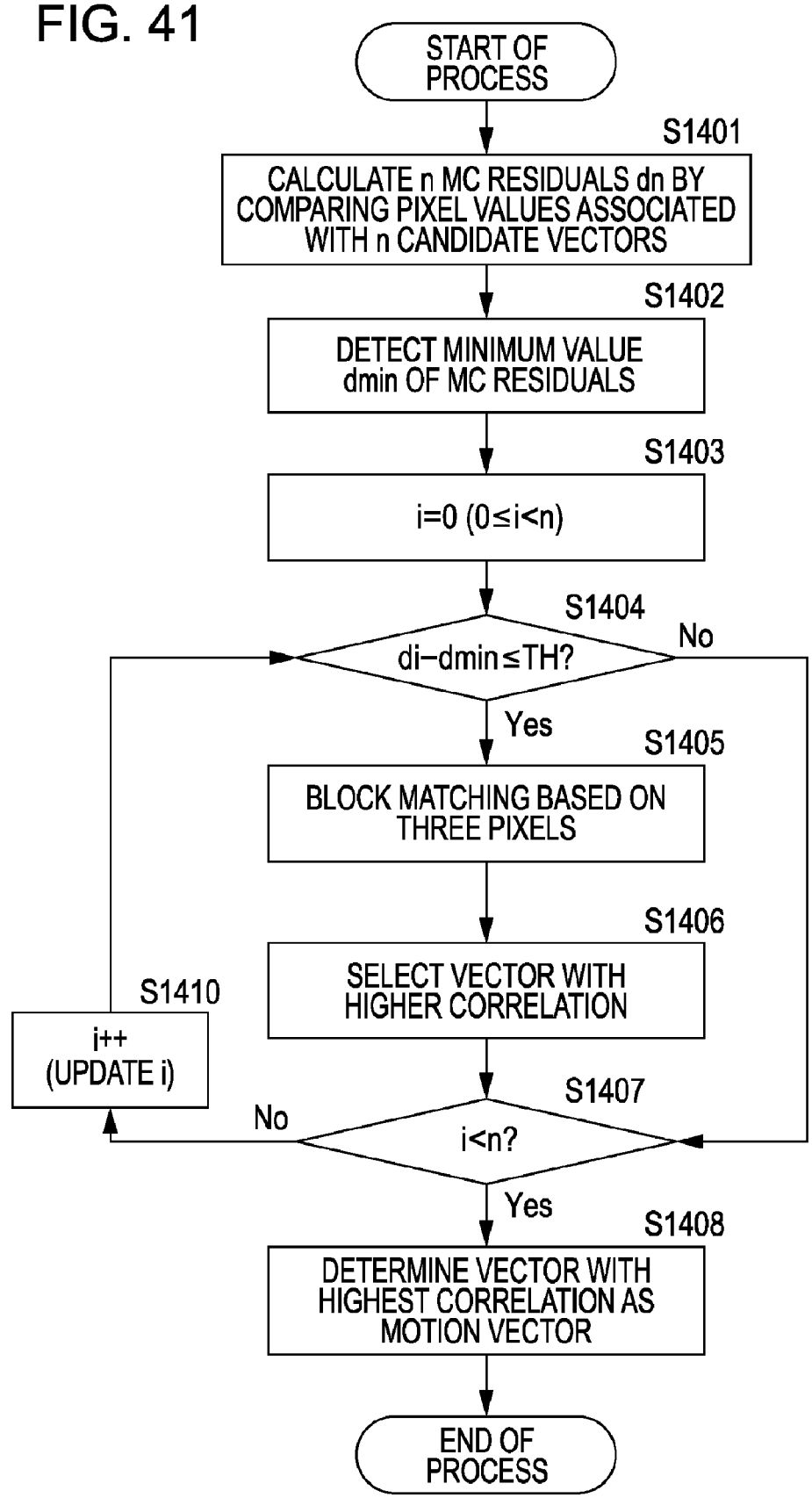
FIG. 41 is a flowchart for explaining a sequence of a motion-vector determining process executed by the motion-vector detecting device according to the present invention.

FIG. 41 shows a flow of the motion-vector determining process by the method described above. In the processing flow shown in FIG. 41, the processing in steps S1401 to S1404 corresponds to the processing in steps S1301 to S1304 in the processing flow described earlier with reference to FIG. 39, in which selected candidate vectors are extracted by the tentative checker.

In step S1405, block matching based on three pixels is performed. That is, as described with reference to FIG. 40, pixels corresponding to the positions of a maximum-spatial-gradient pixel and a minimum-spatial-gradient pixel in relation to a subject pixel detected in a past frame are picked up from each of the pixel regions specified by the selected candidate vectors, and correlation is checked. As for the center pixel, i.e., pixel correlation information associated with the subject pixel position, the result of checking by the tentative checker is referred to.

Correlation is checked by checking matching among these three points, and a vector having a highest correlation is determined as a motion vector associated with the subject pixel. Processing in steps S1406 to S1408 and S1410 corresponds to the processing in steps S1306 to S1308 and S1310 in the processing flow described earlier with reference to FIG. 39, so that description thereof will be omitted.

As described above, in the process of determining a motion vector from candidate vectors on the basis of three-point matching, without checking correlation using all the pixels in a neighboring region (block) of a subject pixel, position information or pixel-value information of a subject pixel and two neighboring feature pixels is used. Thus, calculation of correlation on the basis of a large number of pixel values in accordance with a block size used in block matching is not needed, so that efficient processing can be achieved.

It is possible to execute a process combining the two processes described above, i.e., the motion-vector determining process based on correlation checking using correlation information of feature pixel positions, described with reference to FIG. 39, and the motion-vector determining process based on correlation checking using correlation information of pixel values, described with reference to FIG. 41.

Figure 42:
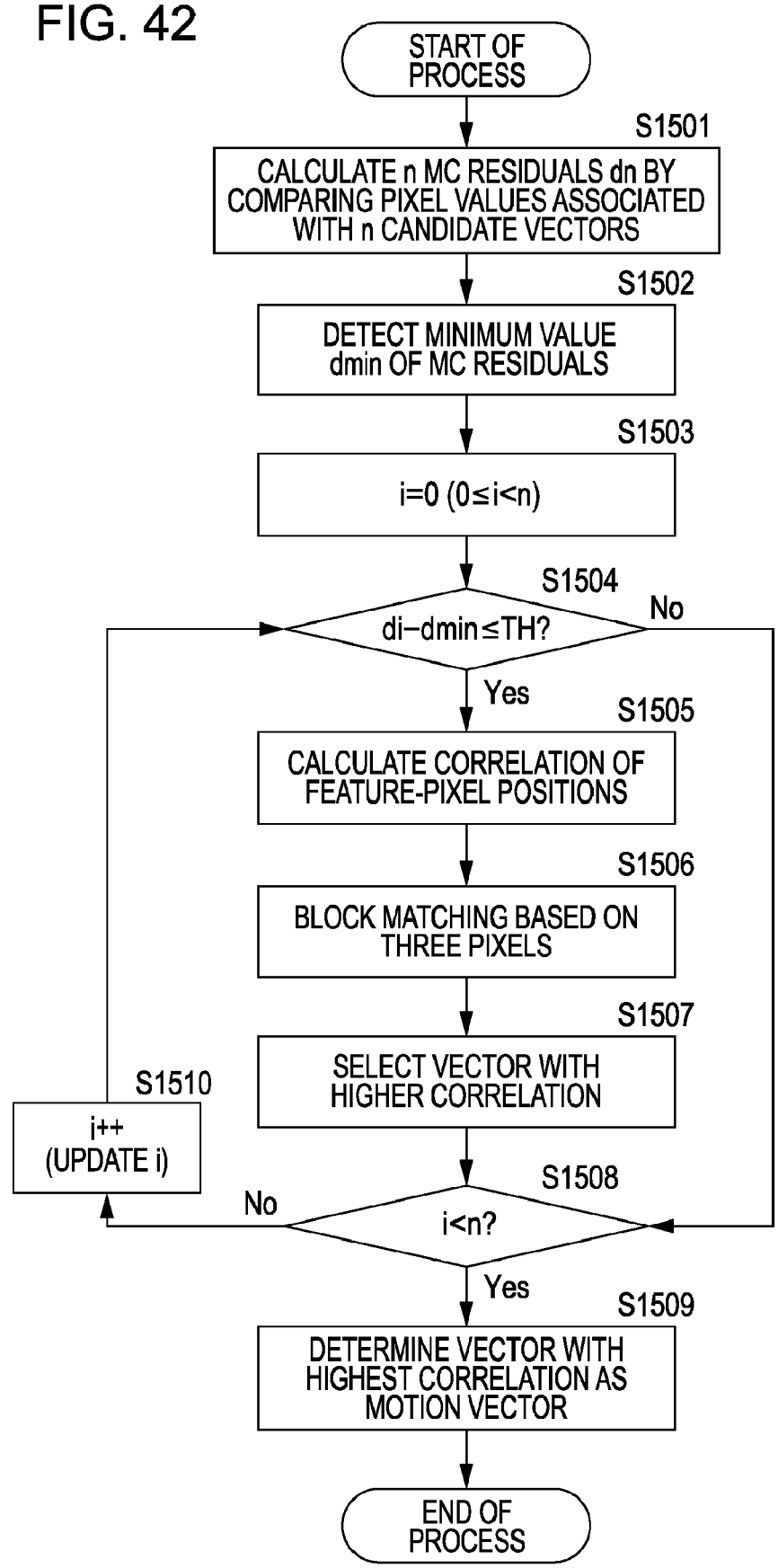
FIG. 42 is a flowchart for explaining a sequence of a motion-vector determining process executed by the motion-vector detecting device according to the present invention.

FIG. 42 shows a flow for explaining a processing sequence combining the motion-vector determining process based on correlation checking using correlation information of feature pixel positions and the motion-vector determining process based on correlation checking using correlation information of pixel values.

In the processing flow shown in FIG. 42, the processing in steps S1501 to S1504 corresponds to the processing in steps S1301 to S1304 in the processing flow described earlier with reference to FIG. 39, in which selected candidate vectors are extracted by the tentative checker.

In step S1505, correlation of feature-pixel positions is checked. As described earlier with reference to FIG. 36, in this processing, it is checked whether correlation, i.e., correspondence of positions, exists between the positions of the two feature pixels in the neighboring region of the subject pixel and the positions of the two feature pixels in the neighboring region of the pixel selected as a selected candidate vector.

Then, in step S1506, block matching based on three pixels is performed. That is, as described with reference to FIG. 40, pixels corresponding to the positions of a maximum-spatial-gradient pixel and a minimum-spatial-gradient pixel in relation to a subject pixel detected in a past frame are picked up from each of the pixel regions specified by the selected candidate vectors, and correlation is checked. As for the center pixel, i.e., pixel correlation information associated with the subject pixel position, the result of checking by the tentative checker is referred to.

In step S1507, a vector having a highest correlation is selected in consideration of both the correlation checking in step S1505 and the correlation checking in step S1506. The processing in steps S1508 to S1510 corresponds to the processing in steps S1307 to S1308 and S1301 in the processing flow described earlier with reference to FIG. 39, so that description thereof will be omitted.

As described above, in the process of determining a motion vector from candidate vectors on the basis of correlation of pixel positions and three-point matching, it is not need to check correlation using all the pixels in a neighboring region (block) of a subject pixel, and only an extremely small amount of pixel information is used. Thus, calculation of correlation on the basis of a large number of pixel values in accordance with a block size used in block matching is not needed, so that efficient processing can be achieved.

Although the present invention has been described with reference to specific embodiments, obviously, it is possible for those skilled in the art to make modifications or alternatives of the embodiments without departing from the spirit of the present invention. That is, the present invention has been described by way of examples, and the present invention should not be construed restrictively. The spirit of the present invention should be construed according to the claims.

The series of processes described in this specification can be executed by hardware, by software, or by combination of hardware and software. When the processes are executed by software, a program in which a processing sequence is recorded is installed and executed in a memory of a computer embedded in special hardware, or the program is installed and executed on a general-purpose computer that is capable of executing various processes.

For example, the programs can be recorded in advance on a hard disc or a read-only memory (ROM) that serves as a recording medium. Alternatively, the programs may be temporarily or permanently stored (recorded) on a removable recording medium such as a flexible disc, a compact disc read-only memory (CD-ROM), a magneto-optical (MO) disc, a digital versatile disc (DVD), a magnetic disc, or a semiconductor memory. Such a removable recording medium can be provided in the form of what is called package software.

Instead of installing the program on a computer from the removable recording medium described above, the program may be transferred by wireless to a computer from a downloading site or transferred by wire to a computer via a network such as a LAN (Local Area Network) or the Internet, so that the computer can receive the program transferred and install the program on an internal recording medium such as a hard disc.

The various processes described in this specification may be executed in parallel or individually as needed or in accordance with the processing ability of an apparatus that executes the processes, instead of being executed sequentially in the orders described. A system in this specification refers to a logical combination of a plurality of apparatuses, and is not limited to one in which constituent apparatuses exist within the same case.

INDUSTRIAL APPLICABILITY

As described above, according to features of the present invention, when generating an evaluation-value table on the basis of representative-point matching, correlation checking is executed in consideration of spatial waveforms of the levels of pixels neighboring a representative point as well as the representative point. Thus, a more accurate evaluation-value table can be generated, and a motion vector can be detected more correctly.

Furthermore, according to features of the present invention, a weight coefficient W is calculated on the basis of correlation information of a representative-point pixel and flag-correlation information based on flag data corresponding to pixel-value difference data between a subject pixel and a pixel in a neighboring region of the subject pixel, a confidence index $\alpha$ is generated as a value that is calculated on the basis of the weight coefficient W calculated and an activity A as an index of complexity of image data, and an evaluation value corresponding to the confidence index $\alpha$ is accumulated to generate an evaluation-value table. Accordingly, an evaluation-value table based on evaluation values that are weighted in consideration of pixel-value differences between representative points and pixels neighboring the representative point can be generated. Thus, a more accurate evaluation-value table can be generated, and a motion vector can be detected more correctly.

Furthermore, according to features of the present invention, flag data corresponding to pixel-value difference data between a subject pixel and a pixel in a neighboring region of the subject pixel is calculated so that the flag data has a less number of bits than pixel-value difference data, so that flag correlation can be calculated by processing data having a small number of bits. Thus, an accurate evaluation-value table can be generated without reducing the processing speed, and a motion vector can be detected more correctly. Accordingly, by applying the present invention to, for example an image processing apparatus that executes encoding of moving-picture data or the like, a motion vector can be detected efficiently, and reduction in the apparatus size can also be achieved.

Furthermore, according to features of the present invention, when generating an evaluation-value table on the basis of representative-point matching, similarity of motion between a representative point and a pixel neighboring the representative point is checked. When similarity of motion exists, it is determined that the confidence of the result of correlation checking is high. Then, a confidence index $\beta$ is calculated, and an evaluation value based on the confidence index $\beta$ is accumulated to generate an evaluation-value table. Thus, a more accurate evaluation-value table can be generated, and a motion vector can be detected more correctly.

Furthermore, according to features of the present invention, similarity of motion between a representative point and a representative point neighboring the representative point is checked. On condition that it is determined that similarity of motion exists, a confidence index $\beta$ is generated in consideration of pixel-value difference between the representative point and the neighboring representative point, and an evaluation value corresponding to the confidence index $\beta$ is accumulated to generate an evaluation-value table. The confidence index $\beta$ is calculated in consideration of the following parameters:

(a) Number of instances of matching or similarity of motion of neighboring representative points (b) Spatial gradient with a representative point having matching or similar motion (c) Distance between representative points with matching or similar motion and an evaluation value based on the confidence index $\beta$ is accumulated to generate an evaluation-value table. Thus, a more accurate evaluation-value table can be generated, and a motion vector can be detected more correctly.

Furthermore, according to features of the present invention, in addition to the confidence index $\beta$, a weight coefficient W is calculated on the basis of flag-correlation information based on flag data corresponding to pixel-value difference data between a subject pixel and a pixel in a neighboring region of the subject pixel, and a confidence index $\alpha$ is generated as a value that is calculated on the basis of the weight coefficient W calculated and an activity A as an index of complexity of image data, and an evaluation value corresponding to a confidence index $K=\alpha+\beta$ with the confidence index $\alpha$ and the confidence index $\beta$ is accumulated to generate an evaluation-value table. Thus, an evaluation-value table based on evaluation values with pixel-value differences between representative points and neighboring representative points also considered can be generated. Thus, a more accurate evaluation-value table can be generated, and a motion vector can be detected more correctly. Accordingly, by applying the present invention to, for example an image processing apparatus that executes encoding of moving-picture data or the like, a motion vector can be detected efficiently, and reduction in the apparatus size can also be achieved.

Furthermore, according to features of the present invention, in a process of detecting a motion vector from moving-picture data, when selecting and determining a motion vector associated with each pixel from a plurality of candidate vectors, a feature pixel is extracted from a neighboring region of a subject pixel with which a motion vector is to be associated, and correlation is checked on the basis of position information or pixel-value information of the feature pixel to determine a motion vector. Thus, block matching need not be employed, so that the amount of calculation of evaluation values for calculating correlation, such as calculation of the sum of absolute values of differences, can be reduced. Therefore, the efficiency of processing is improved, and the size of a memory for holding pixel values can be reduced, so that reduction in hardware scale can be achieved. Accordingly, by applying the present invention to, for example an image processing apparatus that executes encoding of moving-picture data or the like, a motion vector can be detected more correctly.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A motion-vector detecting device for detecting a motion vector from moving-picture data, the motion-vector detecting device comprising:
   an evaluation-value-table generator that generates an evaluation-value table on the basis of pixel-value correlation information between different frames on a temporal axis; and
   a motion-vector determiner that detects a motion vector for a pixel in a frame of moving-picture data on the basis of the evaluation-value table and that associates the motion vector with the pixel;
   wherein the evaluation-value-table generator includes:
   a pixel-correlation calculator that calculates correlation information between the different frames on the temporal axis on the basis of representative-point matching based on a representative point selected from one of the frames;

a weight calculator that generates a confidence index of motion using at least one of a result of calculation by the pixel-correlation calculator and a result of calculation based on a pixel-value difference between a subject pixel and a pixel neighboring the subject pixel; and an evaluation-value-table calculator that generates an evaluation-value table by accumulating the evaluation value corresponding to the confidence index calculated by the weight calculator.

2. The motion-vector detecting device according to claim 1, further comprising a similarity-of-motion detector that detects similarity of motion between the representative point corresponding to the subject pixel and a representative point neighboring the representative point, wherein the weight calculator generates a confidence index of motion on the basis of a determination that similarity of motion exists between the representative point and the neighboring representative point as a result of detection by the similarity-of-motion detector, in consideration of a pixel-value difference between the representative point and the neighboring representative point.

3. The motion-vector detecting device according to claim 2, wherein the weight calculator is configured to calculate the confidence index β according to the following equation on condition that a determination that similarity of motion exists between representative points has been input from the similarity-of-motion detector:

$$\beta = \sum_{n}^{N} |P_m - P_n| \qquad [\text{Eq. 1}]$$

on the basis of a luminance level Pm of a subject representative point and luminance levels Pn of N neighboring representative points determined as having similarity of motion.

4. The motion-vector detecting device according to claim 2, wherein the motion-vector detecting device further includes a calculator that receives input of the result of checking of the presence or absence of correlation based on representative-point matching from the pixel-correlation calculator and input of the confidence index from the weight calculator, and wherein the calculator is configured to add or multiply the result of checking of the presence or absence of correlation based on representative-point matching, input from the pixel-correlation calculator, with the confidence index to calculate a final evaluation value, and to output the final evaluation value to the evaluation-value-table calculator.

5. The motion-vector detecting device according to claim 2, wherein the weight calculator is configured to calculate the confidence index so that the confidence index reflects at least one of the following parameters:
(a) Number of instances of matching or similarity of motion of neighboring representative points
(b) Spatial gradient with a representative point having matching or similar motion
(c) Distance between representative points with matching or similar motion on condition that a determination that similarity of motion exists between representative points has been input from the similarity-of-motion detector.

6. The motion-vector detecting device according to claim 2, wherein the evaluation-value-table generator further includes a representative-point stillness checker that checks whether the representative point is in a still region, and wherein the weight calculator is configured to set the confidence index to be 0 or a reduced value when it is determined by the representative-point stillness checker that the representative point is in a still region.

7. The motion-vector detecting device according to claim 2, wherein the evaluation-value-table generator further includes:
a flag-data calculator that generates flag data corresponding to pixel-value difference data between a subject pixel and a pixel in a neighboring region of the subject pixel; and
a correlation calculator that calculates flag-data correlation information between frames on the basis of the flag data;

wherein the weight calculator is configured to calculate a weight coefficient W using at least one of the pixel-correlation information based on a result of calculation by the pixel-correlation calculator and the flag-correlation information based on a result of calculation by the flag-correlation calculator, and to generate a confidence index as a value calculated on the basis of the weight coefficient W, wherein the weight calculator is configured to calculate a new confidence index K on the basis of the confidence index generated in consideration of the pixel-value difference between the representative point and the neighboring representative point and the confidence index calculated as a value based on the weight coefficient W, and wherein the evaluation-value-table calculator, is configured to generate an evaluation-value table by accumulating an evaluation value corresponding to the new confidence index K calculated by the weight calculator.

8. The motion-vector detecting device according to claim 1, further comprising:
a flag-data calculator that generates flag data corresponding to pixel-value difference data between the subject pixel and a pixel neighboring the subject pixel; and
a flag-correlation calculator that calculates flag-data correlation information between frames on the basis of the flag data;

wherein the weight calculator generates a weight coefficient W using at least one of the pixel-correlation information based on a result of calculation by the pixel-correlation calculator and the flag-correlation information based on a result of calculation by the flag-correlation calculator, and to generate a confidence index as a value calculated on the basis of the weight coefficient W.

9. The motion-vector detecting device according to claim 8, wherein the flag-data calculator is configured to calculate flag data corresponding to pixel-value difference data between the subject pixel and the pixel in the neighboring region of the subject pixel so that the flag data has a less number of bits than the pixel-value difference data.

10. The motion-vector detecting device according to claim 8, wherein the weight calculator is configured to calculate a weight coefficient W as a weight coefficient that is calculated from the pixel-correlation information based on the result of calculation by the pixel-correlation calculator and the flag-correlation information based on the result of calculation by the flag-correlation calculator, the weight coefficient W being a value W that is calculated on the basis of a magnitude of a difference between X and Y, a magnitude of a difference between $X_{f0}$ and $Y_{f0}$, and a magnitude of a difference between $X_{f1}$ and $Y_{f1}$, where X denotes a pixel value of a representative-point pixel, $X_{f0}$ and $X_{f1}$ denote flag data based on difference data between X and pixel values of two pixels adjacent to the representative-point pixel, Y denotes a pixel value of a correlation-checking target pixel, and $Y_{f0}$ and $Y_{f1}$ denote flag data based on difference data between Y and pixel values of two pixels adjacent to the pixel.

11. The motion-vector detecting device according to claim 1,
wherein the weight calculator is configured to determine a weight coefficient W as a weight coefficient calculated from the pixel-correlation information based on the result of calculation by the pixel-correlation calculator, the weight coefficient W being a value W that is calculated on the basis of at least differences between a pixel value of a representative-point pixel and pixel values of correlation-checking target pixels including the subject pixel and the pixel neighboring the subject pixel.

12. The motion-vector detecting device according, to claim 1,
wherein the weight calculator is configured to calculate an activity A as an index of complexity of image data, and
wherein the weight calculator is configured to calculate a confidence index on the basis of the calculated activity A and a weight coefficient W that is calculated on the basis of at least magnitudes of differences between a pixel value of a representative-point pixel and pixel values of correlation-checking target pixels including the subject pixel and the pixel neighboring the subject pixel.

13. The motion-vector detecting device according to claim 1,
wherein the motion-vector detecting device further includes a candidate-vector extractor that extracts one or more candidate vectors on the basis of the evaluation-value table, and
wherein the motion-vector determiner is configured to select a motion vector that is to be associated with each pixel in the frame of the moving-picture data from the candidate vectors and to associate the motion vector with the pixel.

14. The motion-vector detecting device according to claim 13,
wherein the motion-vector determiner is configured to extract a feature pixel from a neighboring region of a subject pixel with which a motion vector is to be associated, and to determine a motion vector associated with the subject pixel on the basis of correlation checking based on the feature pixel.

15. The motion-vector detecting device according to claim 14,
wherein the motion-vector determiner includes a tentative checker that selects only candidate vectors with high correlations from the candidate vectors by checking correlation between a pixel value of the subject pixel with which a motion vector is to be associated and pixel values of pixels specified by the candidate vectors, and
wherein the correlation checking based on the feature pixel is executed only regarding the selected candidate vectors selected by the tentative checker.

16. The motion-vector detecting device according to claim 14,
wherein the motion-vector determiner is configured to extract a feature pixel from the neighboring region of the subject pixel with which a motion vector is to be associated, and to determine a motion vector associated with the subject pixel on the basis of correlation checking based on position information of the feature pixel.

17. The motion-vector detecting device according to claim 14,
wherein the motion-vector determiner is configured to extract a feature pixel from the neighboring region of the subject pixel with which a motion vector is to be associated, and to determine a motion vector associated with the subject pixel on the basis of correlation checking based on pixel-value information of the feature pixel.

18. The motion-vector detecting device according to claim 14,
wherein the motion-vector determiner is configured to extract, as a feature pixel, a pixel having a maximum absolute value of pixel-value difference with an adjacent pixel from the neighboring region of the subject pixel with which a motion vector is to be associated, and to determine a motion vector associated with the subject pixel on the basis of correlation checking based on position information of the feature pixel.

19. The motion-vector detecting device according to claim 14,
wherein the motion-vector determiner is configured to extract, as a feature pixel, a pixel having a maximum absolute value of pixel-value difference with the subject pixel with which a motion vector is to be associated from the neighboring region of the subject pixel, and to determine a motion vector associated with the subject pixel on the basis of correlation checking based on pixel-value information of the feature pixel.

20. The motion-vector detecting device according to claim 14,
wherein the motion-vector determiner is configured to extract a plurality of feature pixels from the neighboring region of the subject pixel with which a motion vector is to be associated, and to determine a motion vector associated with the subject pixel on the basis of correlation checking based on the plurality of feature pixels.

21. The motion-vector detecting device according to claim 20,
wherein the motion-vector determiner is configured to extract, as feature pixels, two pixels having maximum and minimum pixel-value differences with the subject pixel with which a motion vector is to be associated from the neighboring region of the subject pixel, and to determine a motion vector associated with the subject pixel on the basis of correlation checking based on the two feature pixels.

22. The motion-vector detecting device according to claim 21,
wherein the motion-vector determiner is configured to determine a motion vector associated with the subject pixel on the basis of correlation checking based on position information of the two feature pixels.

23. The motion-vector detecting device according to claim 20,
wherein the motion-vector determiner is configured to extract, as feature pixels, two pixels having maximum and minimum pixel-value differences with the subject pixel with which a motion vector is to be associated from the neighboring region of the subject pixel, and to determine a motion vector associated with the subject pixel on the basis of correlation checking based on three pixels including the two feature pixels and the subject pixel.

24. The motion-vector detecting device according to claim 20,
wherein the motion-vector determiner is configured to extract two feature pixels from the neighboring region of the subject pixel with which a motion vector is to be associated, and to determine a motion vector associated with the subject pixel on the basis of correlation checking based on pixel values of three pixels including the two feature pixels and the subject pixel.

25. A motion-vector detecting method for detecting a motion vector from moving-picture data, the motion-vector detecting method comprising:
generating, by a motion-vector detecting device, an evaluation-value table on the basis of pixel-value correlation information between different frames on a temporal axis; and
detecting, by the motion-vector detecting device, a motion vector for a pixel in a frame of moving-picture data on the basis of the evaluation-value table and associating the motion vector with the pixel;
wherein generating the evaluation-value-table includes:
calculating correlation information between the different frames on the temporal axis on the basis of representative-point matching based on a representative point selected from one of the frames;
generating a confidence index of motion using at least one of a result of calculating the correlation information and a result of calculation based on a pixel-value difference between a subject pixel and a pixel neighboring the subject pixel; and
generating an evaluation-value table by accumulating an evaluation value corresponding to the confidence index calculated.

26. A non-transitory computer readable storage medium storing a computer program for detecting a motion vector from moving-picture data, the computer program causing an apparatus to:
generate an evaluation-value table on the basis of pixel-value correlation information between different frames on a temporal axis; and
detect a motion vector for a pixel in a frame of moving-picture data on the basis of the evaluation-value table and associating the motion vector with the pixel;
wherein generating the evaluation-value-table includes:
calculating correlation information between the different frames on the temporal axis on the basis of representative-point matching based on a representative point selected from one of the frames;
generating a confidence index of motion using at least one of a result of calculating the correlation information and a result of calculation based on a pixel-value difference between a subject pixel and a pixel neighboring the subject pixel; and
generating an evaluation-value table by accumulating an evaluation value corresponding to the confidence index calculated.

\* \* \* \* \*

UNITED STATES PATENT AND TRADEMARK OFFICE
CERTIFICATE OF CORRECTION

PATENT NO. : 8,064,522 B2
APPLICATION NO. : 11/467777
DATED : November 22, 2011
INVENTOR(S) : Kondo et al.

Page 1 of 1

It is certified that error appears in the above-identified patent and that said Letters Patent is hereby corrected as shown below:

On the title page, replace "(22) Filed: Aug. 28, 2006" with:

(22) PCT Filed:      Feb. 22, 2005

(86) PCT No.:        PCT/JP05/002786
    §371 (c)(1),
    (2), (4) Date:   Aug. 28, 2006

(87) PCT Pub. No.:   WO05/084036
    PCT Pub. Date:   Sep. 9, 2005

Signed and Sealed this
First Day of May, 2012

David J. Kappos
*Director of the United States Patent and Trademark Office*